US007809791B2

(12) United States Patent
Schwartz et al.

(10) Patent No.: US 7,809,791 B2
(45) Date of Patent: *Oct. 5, 2010

(54) INFORMATION AGGREGATION, PROCESSING AND DISTRIBUTION SYSTEM

(75) Inventors: Michael I. Schwartz, Denver, CO (US); Richard G. Tolley, Greenwood Village, CO (US); Kevin E. Flesher, Broomfield, CO (US); Keith B. Franklin, Highlands Ranch, CO (US); William D. Scott, Parker, CO (US); Charles W. Auten, Parker, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/249,718

(22) Filed: Oct. 10, 2008

(65) Prior Publication Data

US 2009/0094674 A1 Apr. 9, 2009

Related U.S. Application Data

(62) Division of application No. 10/459,388, filed on Jun. 10, 2003, now Pat. No. 7,437,408.

(51) Int. Cl.
*G06F 15/16* (2006.01)
(52) U.S. Cl. .................. 709/204; 709/203; 709/205; 709/219; 709/223; 719/315
(58) Field of Classification Search .......... 709/203, 709/204, 205, 219, 223; 719/315
See application file for complete search history.

(56) References Cited

U.S. PATENT DOCUMENTS 5,617,539 A   4/1997  Ludwig et al.

| 5,710,899 A | 1/1998 | Eick |
| 5,848,425 A | 12/1998 | Lowry et al. |
| 6,034,697 A | 3/2000 | Becker |
| 6,073,142 A | 6/2000 | Geiger et al. |

(Continued)

FOREIGN PATENT DOCUMENTS

WO    00/75779 A2    12/2000

OTHER PUBLICATIONS

Abrams, et al.; "A Higher Level of Computer Security Through Active Policies;" Computers & Security; 1995; pp. 147-157; vol. 14, No. 2; Elsevier Science Publishers; Amsterdam.

(Continued)

*Primary Examiner*—Jinsong Hu
(74) *Attorney, Agent, or Firm*—Marsh Fischmann & Breyfogle LLP

(57) ABSTRACT

A utility is provided for managing exchanges of information within a context involving multiple users, for example, multi-user network collaboration. The invention enables automatic enforcement of a policy regarding sensitive information. The policy may be negotiated among the users and expressed as multiple rule sets that govern access to a use of sensitive information. The utility also logs activities involving sensitive information to ensure compliance with the policy. These logs can be audited by a third party or automatically processed for audit compliance by the utility. In this manner, an environment of trust is created which encourages fruitful collaboration.

12 Claims, 56 Drawing Sheets

U.S. PATENT DOCUMENTS

| | | | |
|---|---|---|---|
| 6,100,901 | A | 8/2000 | Mohda et al. |
| 6,178,382 | B1 | 1/2001 | Roederer et al. |
| 6,195,653 | B1 | 2/2001 | Bleizeffer et al. |
| 6,336,134 | B1 | 1/2002 | Varma |
| 6,424,980 | B1 | 7/2002 | Iizuka et al. |
| 6,430,556 | B1 | 8/2002 | Goldberg et al. |
| 6,430,558 | B1 | 8/2002 | Delano |
| 6,496,190 | B1 | 12/2002 | Driemeyer et al. |
| 6,505,246 | B1 | 1/2003 | Land et al. |
| 6,535,909 | B1 * | 3/2003 | Rust ........................... 709/204 |
| 6,745,388 | B1 * | 6/2004 | Gupta et al. ................ 719/315 |
| 6,917,962 | B1 * | 7/2005 | Cannata et al. ............ 709/204 |
| 6,965,751 | B2 * | 11/2005 | Koga et al. .................. 434/350 |

OTHER PUBLICATIONS

Brodsky, et al.; "Secure Databases: Constraints, Inference Channels and Monitoring Disclosures;" Knowledge and Data Engineering, IEEE Transactions; Nov. 2002; pp. 900-919; vol. 12, No. 6.

Delgado, et al; "Intelligent Collaborative Information Retrieval;" Progress in Artificial Intelligence—Iberamia; Ibero-American Conference on Al Proceedings; Oct. 1998; pp. 170-181.

Rodrigues, et al.; "A Command and Control Support System Using CORBA;" Distributed Computing Systems; Apr. 2001; pp. 735-738; 21st International Conference.

* cited by examiner

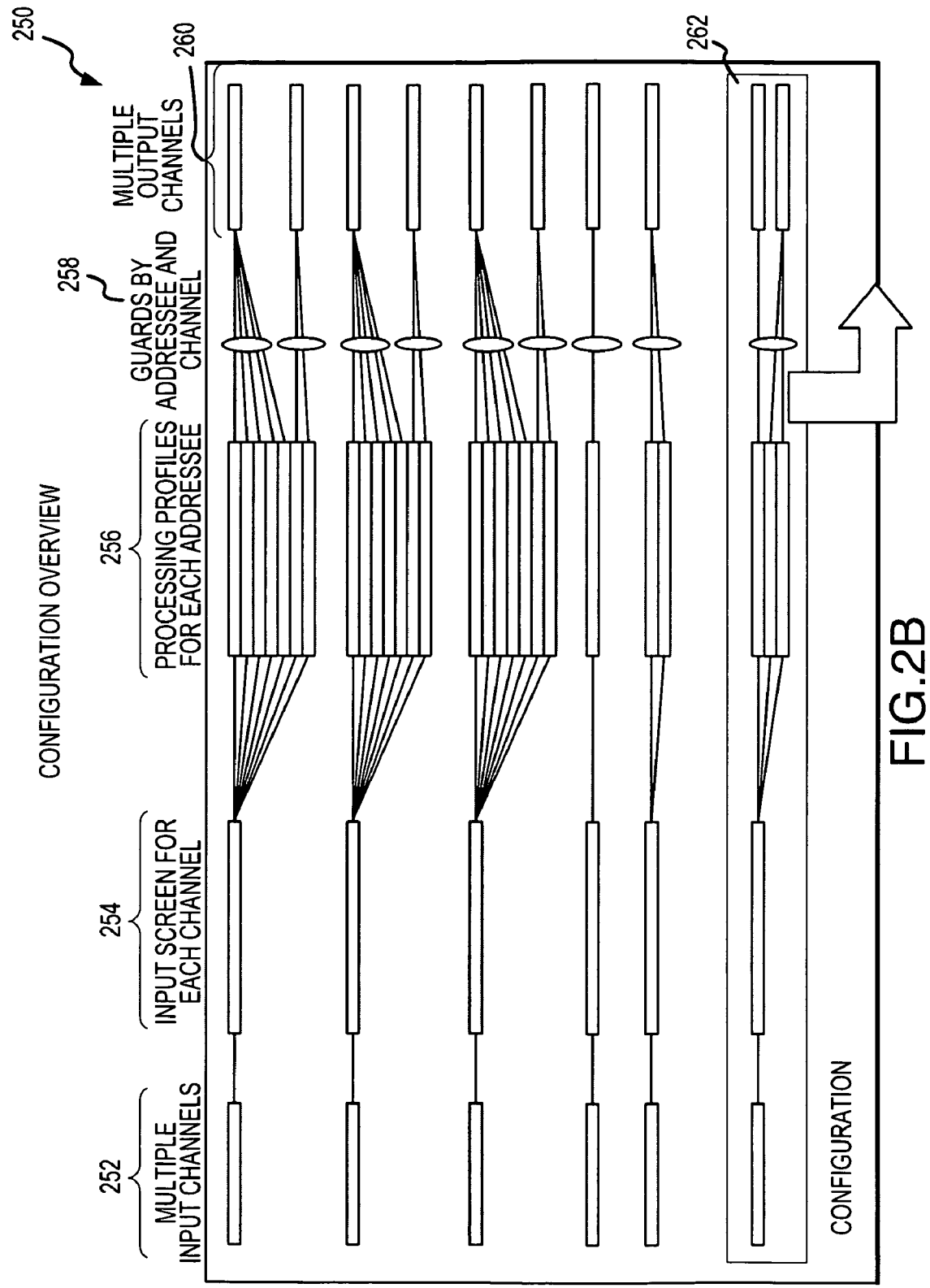

MAG
DATA TRANSFORMATION - A CHARACTER MESSAGE

ARCHITECTURAL STRATEGY

KEY REFERENCE ARCHITECTURES
- OBJECT MANAGEMENT ARCHITECTURE (OMA)
  - OPENGIS, COSSERVICES
- COE LAYERED ARCHITECTURE
- UCA CRYPTOLOGIC FRAMEWORK
- USIGS
  - GIAS

KEY DATA MODELS
- SOM, MIDB, JCDB, ASAS, L245, ECDS, TEXTA

ARCHITECTURAL PATTERNS
- LAYERED ARCHITECTURE
- DATA CENTRIC ARCHITECTURE
  -INFORMATION MANAGEMENT FRAMEWORK
  -INTERACTIVE ANALYSIS FRAMEWORK
- MISSION MANAGEMENT ARCHITECTURE
  -TASK MANAGEMENT FRAMEWORK
  -RESOURCE MANAGEMENT FRAMEWORK

COTS SW INFRASTRUCTURE
- JAVA/C++
- CORBA
- ENTERPRISE JAVA BEANS
- RDBMS/ODBMS
- MICROSOFT WINDOWS
- WEB SERVER/BROWSER
- XML/DOM

COTS HW
- UNIX SMP SERVER
- NT WORKSTATIONS

FIG.27

IMPORTANCE OF DATA-CENTRIC COLLABORATION FRAMEWORK

- FRAMEWORK IS APPLICABLE TO MOST DOMAINS
- SMALL TOOLS EXTEND OVERALL CAPABILITY
  - BUILD DOMAIN OR ANALYST SPECIFIC TOOLS—NOT SYSTEMS
  - ADDING SINGLE COLLABORATIVE CAPABILITIES RESULTS IN EXPONENTIAL GROWTH OF OVERALL SYSTEM CAPABILITY
- COLLABORATION INTEGRAL TO FRAMEWORK
  - INSTEAD OF PASTING IMAGES ONTO A WHITEBOARD, COLLABORATE ON THE TOOL ITSELF USING WHITEBOARDING LAYER
  - NO SPECIAL LOGIC NEEDED IN TOOLS TO SUPPORT COLLABORATION
- SUPPORTS LEGACY APPLICATIONS
  - DATA IS SHARED AND NOT REPLICATED, SO CHANGES TO THE DATA BY LEGACY TOOLS PROPAGATE TO COLLABORATIVE TOOLS.

FIG.33

LIST VIEWER

- SORTING
- ROW SELECTION
- ROW COLORING
- ROW HIDING
- CHOOSE ATTRIBUTES TO VIEW

2818

☐ OPSPICTURE-KOREANFACILITIES-DATALIST

| SITECODE | NAME | COUNTRY | LATITUDE | LONGITUDE | THREAT |
|---|---|---|---|---|---|
| KN00657 | CHOOK | KN | 39.233333 | 127.05 | 3 |
| KN00561 | CHILTAE | KN | 39.466667 | 127.05 | 6 |
| KN00017 | PALBONG | KN | 39.416667 | 127.066667 | 4 |
| KN00492 | CHANGMOK | KN | 39.433333 | 127.066667 | 5 |
| KN00250 | ISDU | KN | 39.562315 | 127.083333 | 8 |
| KN00228 | PYONGSAN | KN | 39.233333 | 127.1 | 0 |
| SC00002 | 232 AIR CO | KN | 38.4 | 127.1 | 10 |
| KN00380 | PYONGP'UN | KN | 39.983333 | 127.133333 | 4 |
| KN00227 | PYONGSANG | KN | 39.966667 | 127.166667 | 6 |
| KN00241 | PAEAM | KN | 39.683333 | 127.183333 | 5 |
| KN00242 | PAEBAWL | KN | 39.683333 | 127.183333 | 4 |
| KN00250 | CHOOOMIN | KN | 17.430562 | 127.9 | 8 |
| KN00296 | PAEKKONG | KN | 38.466667 | 126.566667 | 1 |
| KN00478 | CHANGGYE | KN | 39.466667 | 126.566667 | 2 |
| KN00044 | PANMUU | KN | 37.895555 | 126.564555 | 8 |
| KN00045 | RASDASS | KN | 38.956546 | 127.566667 | 7 |
| KN00292 | PAEKHWAD | KN | 37.95 | 126.583333 | 6 |
| KN00425 | CHAERYON | KN | 37.833333 | 126.6 | 2 |
| KN00257 | PAEGO | KN | 38.433333 | 126.6 | 1 |
| KN00521 | CHARYONG | KN | 39.366667 | 126.6 | 2 |
| SC00004 | BQ12YSA | KN | 37.8 | 126.6 | 10 |
| KN00030 | PANCH'ON | KN | 37.8 | 126.633333 | 5 |
| KN00712 | CHODEDAM | KN | 39.56 | 126.633333 | 7 |
| KN00019 | PALCHACH'ON | KN | 37.966667 | 126.633333 | 3 |
| KN00323 | PAEKTONGUM | KN | 37.933333 | 126.65 | 4 |
| KN00103 | PONGAM | KN | 38.965333 | 126.65 | 8 |
| KN00493 | CHANGNAE | KN | 37.833333 | 126.666667 | 4 |
| KN00195 | PYONGCHA | KN | 37.916667 | 126.666667 | 4 |

FIG. 40

INFORMATION AGGREGATION, PROCESSING AND DISTRIBUTION SYSTEM

RELATED APPLICATION INFORMATION

This application is a divisional of and claims priority from U.S. patent application Ser. No. 10/459,388 (now U.S. Pat. No. 7,437,408) filed Jun. 10, 2003 entitled "Information Aggregation, Processing and Distribution System", and claims priority from U.S. patent application Ser. No. 10/293, 246 filed on Nov. 13, 2002 entitled "Information Aggregation, Processing and Distribution System", and U.S. patent application Ser. No. 10/293,230 filed on Nov. 13, 2002 entitled "System for Enabling Collaboration and Protecting Sensitive Data", and each of the '246 and '230 applications claim priority from U.S. Provisional Application Ser. No. 60/337,499 which was filed on Nov. 13, 2001, entitled "Collaborative Information System and Method"; U.S. Provisional Application Ser. No. 60/370,464 which was filed on Apr. 5, 2002, entitled "Radiant Trust Implementation of Terrorist Tracking Capability Pilot"; and U.S. Provisional Application Ser. No. 60/385,518 which was filed on Jun. 4, 2002, entitled "Real-Time Collaborative Information Acquisition and Distribution System". The entire disclosures of the referenced applications are incorporated herein by reference.

FIELD OF THE INVENTION

The present invention generally relates to managing the use and exchange of information in the context of collaboration between multiple users in a network. In particular, the invention relates to managing, in substantially real-time, the dissemination of information within the network as between multiple users based on a policy, e.g., a set of data access and handling rules developed by the users. The invention has particular advantages with respect to managing the dissemination and use of sensitive information.

BACKGROUND OF THE INVENTION

In a variety of contexts, it is desirable to enable access to and processing of information among multiple users within a network environment such as for collaborative research, problem solving and sharing of common tools. Some of the problems that may arise in such contexts include: how to handle multiple formats, data structures and protocols associated with legacy source and target systems; how to manage access to classified, confidential, proprietary or otherwise sensitive information; and how to protect privacy and other civil liberty concerns of individuals.

Even where technologies attempt to address one or more of these concerns, a lack of trust may inhibit collaboration. For example, a subcontracting company may be reluctant to make documents including sensitive information available via a network to a primary contractor, partners or others within a community working on a project due to fear that the sensitive information will be used improperly. Financial institutions or others in a position of trust may be reluctant to share information regarding unauthorized electronic access incidents or attempts with appropriate authorities for fear that public release of such information identifying the victimized institution may erode public confidence in the institution. Individuals may resist releasing personal information into a network community that may include government actors on privacy or civil rights grounds. Similarly, medical institutions may be prevented from making patient information available, e.g., for research, insurance analysis or other statistical aggregation, due to patient privacy concerns. In all of these contexts, fruitful collaboration may be inhibited due to a lack of confidence that sensitive information will be properly controlled.

SUMMARY OF THE INVENTION

The present invention is directed to a method and apparatus ("utility") for managing exchanges of information within a context involving multiple users, e.g., multiple information sources and multiple potential recipients. In particular, the present invention relates to enabling sharing of information (e.g., the Radiant Sanitizer/Guard subsystem) from disparate sources and as between various recipients so as to increase the range of information and tools available (e.g., The Radiant Collaboration subsystem) to address a problem of interest. Addressing the problem involves both technical and societal issues. Technically, enabling such exchanges of information involves accommodating various data formats, data structures and messaging protocols associated with various legacy systems. Societally, facilitating such exchanges involves protecting sensitive information, privacy, and civil liberties interests so as to build an environment of trust that encourages sharing of resources. The present invention provides tools for addressing these issues in the context of real-time or near real-time exchanges of information, as well as in collaborative contexts. In this regard, the invention enables automatic enforcement of a pre-defined policy, e.g., data access and handling rules developed by network users within a community of trust, regarding sensitive information. The invention also enables the monitoring of a broad range of interactions to generate alerts and logs of information exchanges. Such logs can be reviewed by interested parties to ensure compliance with the established policy, or such logs can be automatically processed, in near real-time for audit compliance in accordance with the present invention. The present invention thus facilitates establishment of a community of trust, which encourages fruitful collaboration. Collaboration, in this regard, involves at least one of: 1) making information available to multiple network users for substantially concurrent processing by the multiple users ("multiple user parallel processing"); 2) making information available to multiple network users which persists across time and allows all network users to see a coordinated view of the same data, irrespective of who changed it and when ("multiple user data collaboration"); 3) making information from multiple sources available for processing by a common tool, tool set, or tool programming interface ("multiple source aggregation"); and 4) making a common tool or tool set available for use by multiple users ("tool sharing"). In all such contexts, collaboration is enabled while ensuring appropriate handling of sensitive information.

In accordance with one aspect of the present invention, sensitive information is handled in a collaborative environment in accordance with a pre-defined policy. The method involves establishing a collaborative environment for multiple network users. The collaborative environment includes a network structure for use in enabling collaboration with respect to subject matter including sensitive information (subject to a policy regarding handling thereof and a computer-based tool for automatic enforcement of the policy). The computer-based tool is used to manage the collaboration event by monitoring activities relating to the subject matter using the network structure, identifying an activity concerning a portion of the sensitive information and controlling the identified activity based on the pre-defined policy.

Preferably, a single policy governs dissemination of information among the multiple users. This policy may be negotiated by or otherwise agreed to among the multiple users and data owners. The policy may be implemented by a set of rules defining, for example, which users are entitled to access or use certain sensitive information or portions thereof, what activities a particular user may perform in relation to sensitive information, or the like. In this regard, multiple classifications of network users may be defined with corresponding rules regarding access to or use of sensitive information. Such classifications may vary depending on the context. For example, the system may distinguish between government or non-government users, between industry partners and competitors, between approved information aggregation tools/users and others, etc. In this manner, multiple users having multiple different classifications can securely collaborate while a consistent policy regarding dissemination of sensitive information is automatically enforced in substantially real-time.

The activity identified by the computer-based tool may involve potential access to sensitive information by one or more identified parties, potential transfer of such information, potential modification or aggregation of the sensitive information, or another potential use of the sensitive information. Depending, for example, on the policy and the identity or identities of the potential user (users), such an activity may be allowed, prevented or allowed with appropriate measures to enforce the policy. For example, policy enforcement may involve eliminating sensitive information or altering sensitive information. Thus, for example, the name of a victimized company or a patient may be omitted or changed to a generic identifier. Sensitive data may be deleted, reduced in accuracy or otherwise modified. In this manner, a high level of useful collaboration can be supported while enforcing the policy.

In accordance with another aspect of the present invention, records can be maintained regarding the use of sensitive information to further encourage confidence within the collaborative environment. An associated utility involves establishing a collaborative environment for multiple users where the collaborative environment includes a computer-based tool for monitoring activities involving collaboration subject matter; operating the computer-based tool to identify an activity involving the sensitive information; and operating a computer-based tool to establish a log entry for the activity identifying a user associated with the activity and the nature of the activity. Thus, the log entries may collectively indicate which users have had access to, modified or otherwise used particular items of sensitive information. Such log entries can be audited by a user, a trusted official, or other third party to verify that sensitive information has been handled in accordance with the established policy. Additionally, the computer-based tool may provide automated processing of the log entries for continuous auditing compliance.

It should be understood that the collaboration supported by the present invention can involve many users, two users involved in a one-on-one collaborative effort, or even a single human user accessing a shared resource. In certain instances below, reference is made to "first" and "second" users. The use of "first" and "second" throughout this document is intended as exemplary, to better explain the invention through the use of a basic case. The invention is applicable to environments with many users, and interactions described for many users generally occur in the same way as for two. To further illustrate this point, the following are examples of collaborative contexts supported by the present invention: 1) a large number of parties share information regarding potential security breaches in a network, e.g., while protecting the identities of entities that have been attacked; 2) a user at company A shares compatibility information with a user at company B in connection with a joint development or multi-contractor effort, e.g., while appropriately protecting company sensitive information; and 3) a user provides design information to a contract fabrication facility that, at other times, is used by others, e.g., while appropriately guarding sensitive information of all users. Many other collaborative contexts are possible in accordance with the present invention.

According to another aspect of the present invention, a utility is provided for making information available to multiple users in a collaborative environment in accordance with content-based rules specific to each of the users. For example, the utility may be used to facilitate multi-user parallel processing type collaboration while maintaining the integrity of sensitive data. The utility involves a collaboration system for enabling substantially concurrent access to collaboration subject matter, based on input information, by a first user system and a second user system. The input information may be provided by one of the first and second systems and/or by another source or sources. The collaboration system is operative to receive the input information and identify the first and second user systems. The user systems may be identified, for example, based on a previously established distribution list for the collaboration subject matter, address information included in a message or messages from the input source or access requests by or on behalf of the first and second user systems. The collaboration system is further operative for accessing content-based rules associated with each of the identified user systems, processing the input information based on the content-based rules, establishing first and second outputs for the first and second user systems, respectively, and enabling access to the outputs. In this manner, the first and second systems can be used for collaborative work related to the collaboration subject matter in accordance with content-based rules.

In one implementation, the collaboration system is used to filter information disseminated to multiple recipients so as to protect sensitive data. Thus, for example, the content-based rules may be used to implement a policy (e.g., established by specific users, collaboration groups or defined enclaves or established based on a relationship between a given source and recipient) regarding transmissions of sensitive information or to facilitate collaboration between users having different nationalities, security clearances, statuses (e.g., public or private sector) or authorizations relative to sensitive information. Thus, for example, the content-based rules may be associated with particular intended recipients based on the identity of that recipient or the nationality, security clearance, title, affiliation or other attribute of that recipient. The filtering may involve removing or modifying the sensitive information to comply with rules protecting the information. For example, names may be deleted or changed (e.g., genericized) to protect privacy or security concerns or sensitive data may be deleted or the accuracy of data may be changed to accommodate access limitations of particular intended recipients. By using multiple rules associated with multiple users, collaboration is facilitated even in environments where individual user access to the collaboration subject matter may be limited.

In accordance with another aspect of the present invention, a utility is provided for making information from multiple sources available to a user system in a collaborative environment in accordance with content-based rules. For example, the utility may be used to facilitate multi-source aggregation type collaboration while maintaining the integrity of sensitive data. The utility involves operating a collaboration system to receive first and second collaboration subject matter inputs from first and second source systems, respectively, and identify a user system for receiving an output. The collaboration system is further operative for processing each of the inputs based on a content-based rule set associated with the identified user system and providing the user system access to a first output established using the first input and the content-based rule set and a second output established using the second input and the content-based rule set.

The utility may be used in a variety of contexts. For example, in connection with a product development process involving multiple component providers and a system integrator, specification information from each of the component providers may be provided via the collaboration system to the system integrator, or to another component provider, to the extent necessary for the development process as governed by rules defined by the participants. In the contexts of law enforcement, intelligence gathering and regulatory compliance, information from private and/or public sector sources may be provided to the relevant government entity based on rules implementing privacy, civil liberties and other policies (e.g. company policies) or legal safeguards. In this manner, an environment of trust is fostered which promotes collaboration. The utility may also be operative for combining or fusing multiple inputs to generate enhanced data, e.g., combining information regarding multiple instances of sightings of a person being tracked to provide improved location information or fusing information to authenticate a person's identity.

In connection with the noted multi-user parallel processing and multi-source aggregation environments, it will be appreciated that it is desirable to maximize sharing of collaboration subject matter within the bounds of protecting sensitive information. Additionally, it is desirable to execute the content-based rules rapidly so as to enable substantially real-time collaboration. It is also desirable to execute the content-based rules consistently and objectively so as to engender trust among collaborators and thereby more fully realize the intended benefits for which the content-based rules were established. This is accomplished in accordance with the present invention through the cooperative use of certain parsing and sanitization tools as described below.

BRIEF DESCRIPTION OF DRAWINGS

For a more complete understanding of the present invention and further advantages thereof, reference is now made to the following Detailed Description taken in conjunction with the drawings, in which:

FIG. 2B illustrates a configuration overview of the Radiant Sanitizer/Guard component of the Radiant Trust system of FIG. 1;

FIG. 27 is a flow chart of the architectural strategy;

FIG. 33 is a chart summarizing the importance of having a data-centric collaboration network;

FIG. 40 illustrates the output in a list viewer;

DETAILED DESCRIPTION

In the following description, the invention is described in the context of a transliteration, sanitization and collaboration system, denoted as the Radiant Trust System, for promoting collaboration among various users in relation to various homeland security and defense applications. These applications include, but are not limited to terrorist tracking, preflight passenger screening and border security and multilateral policing activities. Although these represent particularly advantageous application of the present invention, as noted above, the invention is applicable in a variety of contexts including private sector applications, public sector applications and public/private sector applications. Accordingly, the various aspects of the present invention are not limited to the context described in detail below.

The description below begins with an overview of the Radiant Trust System describing the system architecture and network environments. Thereafter, the two components of Radiant Trust, the Radiant Sanitizer Guard subsystem and Radiant Collaboration subsystem, are detailed in the respective subsequent sections.

I. Overview of the Radiant Trust System

Figure 1:
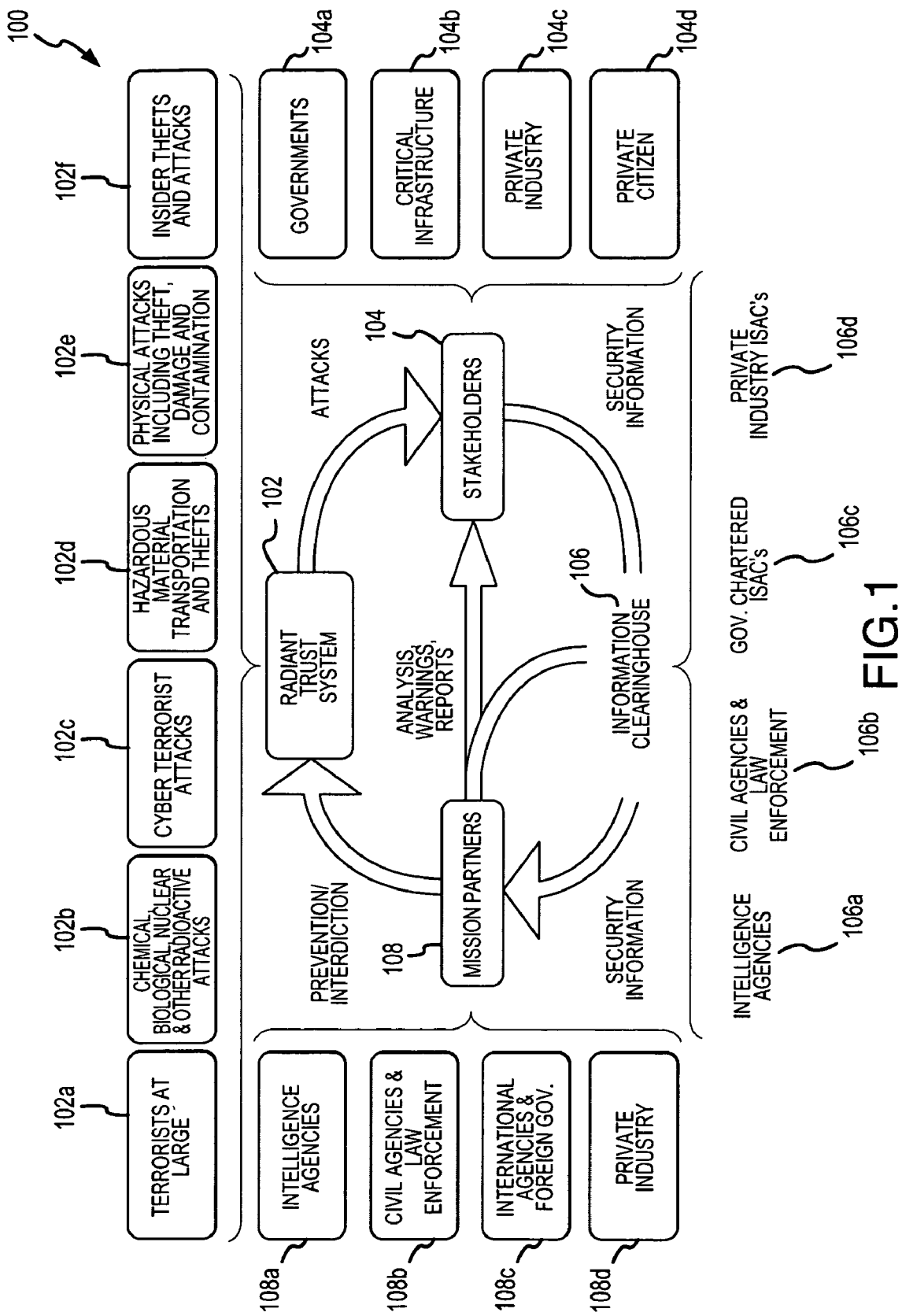
FIG. 1 illustrates a web of relationships between users of a Radiant Trust system in accordance with the present invention.

FIG. 1 illustrates a cycle 100 of relationships, stakeholders and participants of the Radiant Trust System of the present invention. One of the goals of the Radiant Trust System is to create an environment of trust among users. With regard to information sources, this environment of trust is fostered by protecting sensitive information and respecting privacy and other civil liberties issues. The trust that is thus earned encourages sharing of information so that system partners can have more complete information and perform better analyses of the data. Based on these analyses, more useful warnings can be provided to system users and others, which further encourages sharing of information.

The cyclical nature of this process is illustrated in FIG. 1. The risks 102 addressed in the illustrated implementation of the Radiant Trust System include: terrorists at large 102a; chemical, biological, nuclear and other radioactive attacks 102b; cyber terrorist attacks 102c; hazardous material transportation and thefts 102d; physical attacks including theft, damage and contamination 102e; and insider thefts and attacks 102f. These risks 102 pose a threat of attacks on stakeholders 104. The stakeholders in the illustrated implementation of the Radiant Trust System may include government 104a, critical infrastructure 104b, private industry 104c and private citizens 104d. These stakeholders 104 may possess a variety of information that is relevant to analyzing the risks 102. Such information may include information about attacks and attempted attacks, as well as information which, considered individually, may not necessarily indicate a risk. For example, travel industry database records indicating that John Doe and Jane Doe plan to be on a particular flight may not indicate a risk until that information is correlated with a suspected terrorist watch list of a government intelligence agency identifying both John Doe and Jane Doe as suspected terrorists. It will be appreciated that the types of information that may be useful in such analyses are as varied as the types of analyses that may be devised and would be expected to evolve with experience. The Radiant Trust System is designed to accommodate such flexibility and, indeed, to promote use of information sources whose efficacy may not previously have been fully explored. It is important to note in this regard that the Radiant Trust System addresses a number of issues which have previously hampered coordination among different government agencies, potentially competitive private entities, and among public and private sector entities.

Such information is provided by the stakeholders 104 to one or more trusted information clearinghouses 106. These information clearinghouses implement the Radiant Trust functionality governing sharing of information while protecting sensitive information and addressing privacy and other civil liberties issues. In the illustrated implementation, such systems are operated by intelligence agencies 106a, civil agencies and law enforcement agencies 106b, government chartered ISACs (Information Sharing and Analysis Centers (e.g. Information Clearing Houses) 106c and private industry ISACs 106d. As will be discussed in more detail below, in certain implementations, information passing from, for example, a private industry source to a government recipient may pass through a first clearinghouse operated by a private sector entity and a second clearinghouse operated by a government entity. The information clearinghouse may also perform a number of functions related to transliterating data formats and otherwise ensuring technical compatibility as well as providing certain data processing and collaboration functionality. The resulting information, which may be sanitized relative to sensitive information and reformatted, is made available to mission partners 108. In this regard, such information may be made available on a continuous or regular basis in response to standing queries or content-based rules governing distribution, or such information may be provided in response to a specific inquiry from a mission partner 108.

In the illustrated implementation, the mission partners include intelligence agencies 108a, civil agencies and law enforcement agencies 108b, international agencies and foreign governments 108c and private industry partner's 108d. These mission partners 108 may perform a variety of different analyses and provide a variety of different outputs. Indeed, it is a goal of the Radiant Trust System 100 to encourage creativity in this regard. As illustrated, one result of these analyses may be prevention and interdiction efforts to directly reduce or eliminate the risks 102. Additionally, the mission partners 108 may provide analysis, warnings and reports to the stakeholders 104. For example, analysis may be provided with respect to a reported cyber attack, providing some information about the methodology employed by the cyber terrorist. This information may be used by a stakeholder to patch firewalls or otherwise address network security. Warnings of potential terrorist activity may be provided to local governments or frontline private industry entities such as airlines. Reports based on security information may be provided to stakeholders 104 to keep the stakeholders better informed and/or to help stakeholders evaluate risks.

Similar information may be provided by the mission partners 108 to the information clearinghouse 106. For example, such information may be reported to the information clearinghouse 106 to be relayed to stakeholders where the relevant stakeholders are not known to the mission partners due to privacy concerns. In addition, such information may encompass enhanced security information determined through data fusion or other processing which may be of interest to other mission partners 108. It will thus be appreciated that the system 100 feeds on itself such that, even in the context of a closed system with respect to the participants involved, ever-increasing degrees of information sharing and processing are achieved. As will be discussed below, it is anticipated that such systems generally will not be closed. In fact, it is expected that as trust is gained and benefits are demonstrated, systems will be interlinked to create a radiating web of trust transcending national and public/private sector boundaries.

Figure 2A:
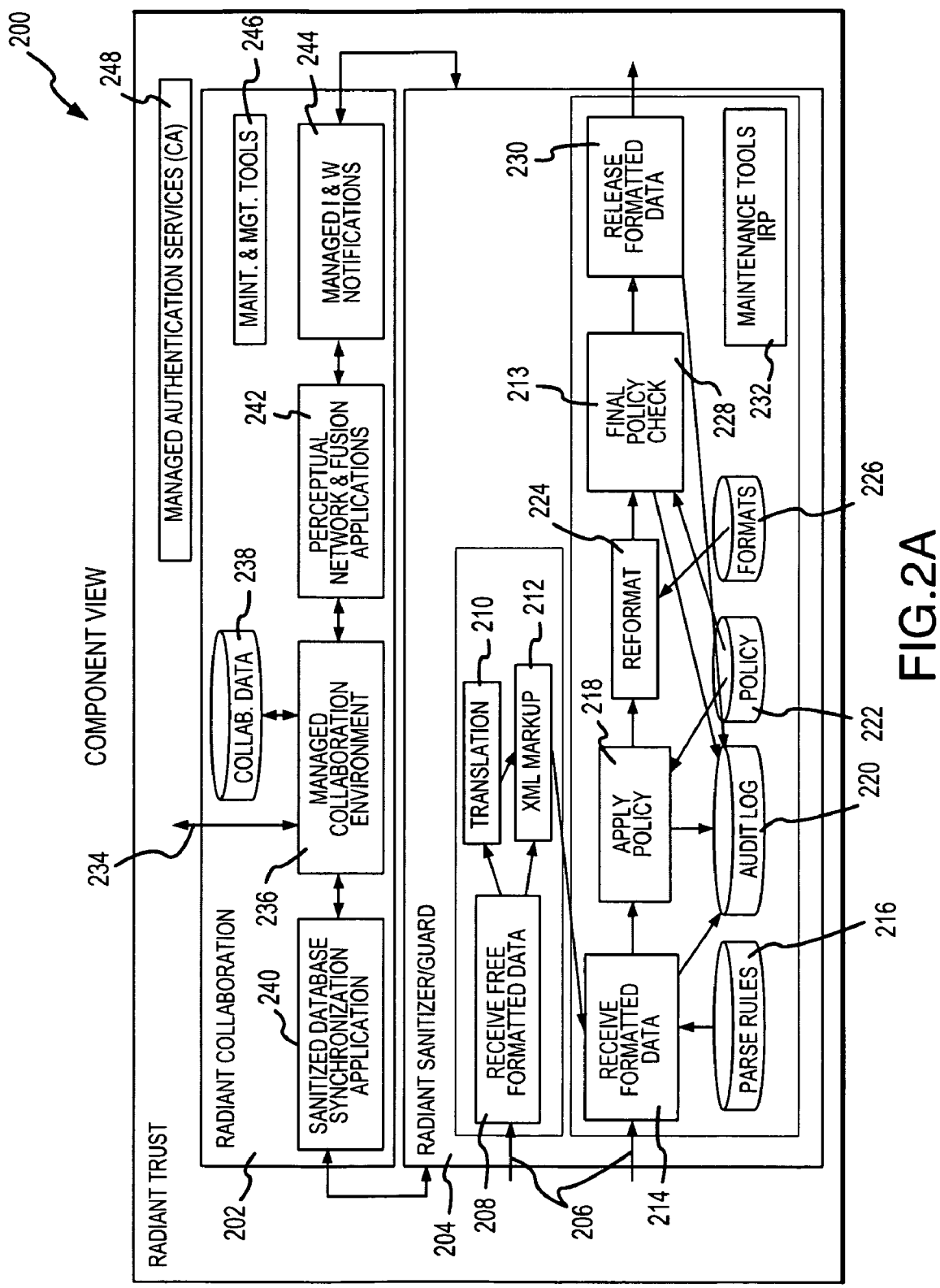
FIG. 2A illustrates a component view of the Radiant Trust system of FIG. 1.

FIG. 2A illustrates a component view of the Radiant Trust System 200. As shown, the system 200 generally includes a Radiant Collaboration subsystem 202 and the radiant sanitizer/guard subsystem 204. Each of these subsystems is described in more detail in its own section later in this description. The Radiant Sanitizer Guard 204, as shown in FIG. 2, receives input information 206 that may include formatted and free formatted data. In this regard, the formatted data is data that is already formatted in the desired internal format of the Radiant Trust System 200. The free formatted data may be formatted in accordance with the legacy system of the associated source. One of the strengths of the Radiant Trust System 200 is the ability to handle a variety of formats such that information from a greater variety of sources can be made available. In this regard, such free formatted data may be received by an input module 208. As will be described in more detail below, this free formatted data may then be translated or transliterated into an internal format by a translation module 210 and associated with XML tags and otherwise processed by XML markup module 212. The resulting formatted data is then provided to the formatted data input module 214 where it is processed in the same manner as preformatted data.

The input module 214 constitutes the input port of sanitizer 213. The sanitizer 213 implements an automated process for protecting sensitive information included in the inputs. In this regard, the inputs are automatically processed to execute content-based rules related to specific information sources and intended recipients. In particular, participants in the Radiant Trust System may develop rules determining what information can be shared with whom. The nature of these rules and the manner of executing the rules will be discussed in more detail below. It should be noted, however, that is desired to prevent the unauthorized dissemination of sensitive information while making as much information as possible available for use in the Radiant Trust System and to external users. This is accomplished by parsing the input information into information objects, using Message Analysis and Generation of the desired size or resolution and applying the content-based rules with regard to each information object. Each information object can selectively be deleted, modified, or passed into the output stream. Thus, in the illustrated implementation, parse rule database 216 stores the rules for governing the process by which the input information is parsed into Message Analysis and Generation. The policy processor 218 then applies the content-based rules which are stored in the policy database 222 to construct a recipient-specific output in compliance with the predefined content-based rules. This output is provided to a reformatting processor 224 that reformats the data in a form for use by the intended recipient system. Information defining these formats is stored in tables of the format database 226. A final check module 228 performs a final check on the output to assure compliance with the policies indicated by the content-based rules and the resulting output is provided to an output module 230 for transmission to the intended recipient system or systems.

The sanitizer 213 also includes an audit log 220 and maintenance tools 232. The audit log database 220 is interfaced with the modules 214, 218, 228 and 230 to compile complete records identifying the inputs received, the modifications made to the inputs to implement the content-based rules and the output transmitted by the sanitizer 213 together with information identifying the information sources and the recipients. In this manner, users can verify that information has been disseminated only in accordance with the predefined rules, thereby further encouraging trust. In addition, information transmissions can be checked when appropriate to provide evidence of and address any misuse of information. The maintenance tools 232 provide the functionality necessary to update, repair and otherwise maintain the radiant sanitizer/guard subsystem 204. In this regard, it will be appreciated that reliable operation of the system 200 is essential to achieving the goals of the system 200.

The Radiant Sanitizer Guard subsystem 204 thus, of itself, enables substantially real-time sharing of information between multiple sources within the network and multiple recipients within the network in accordance with predefined rules governing such exchanges of information based on content and the identities of the sources and recipients. This represents a significant step toward achieving the goals of the system 200. However, in some cases, it may be desired to enable collaborative work on particular documents or subject matter as between multiple system participants. This is facilitated by the radiant collaboration subsystem 202. In particular, the subsystem 202 allows for establishing a conference of collaborators, identifying a document or documents to be included in the conference, allowing such documents as well as changes to such documents resulting from the collaboration process to be represented to individual collaborators in accordance with the content-based rules as well as system-specific parameters related to display and the like, and allowing for processing of information contained in the documents using tools common to the conference or system 200.

Specifically, the environment manager module 236 receives inputs 234 defining the managed collaboration environment. These inputs may define, for example, the participants in the conference, the documents that are to be the subject of collaboration, and certain parameters of the participant systems. The documents or the other subject matter of collaboration may be stored in the collaboration database 238.

Representations of the collaboration data are provided to each of the conference participants via the interface 234 to enable collaboration. In order for such outputs to conference participants to be managed in accordance with the content-based rules, the radiant collaboration subsystem 202 is interfaced with the radiant sanitizer/guard system 204. This interface is managed by the sanitized database synchronization application 240. In particular, this application 240 handles all operations necessary to provide formatted or free formatted data to input ports 208 or 214 and receive sanitized data from the output port 230. These operations include identifying the conference participants to the sanitizer 213 and associating the multiple outputs with the intended conference participants. These sanitized outputs are provided by the application 240 to the environment manager 236, which manages output of the information in accordance with particular participant system parameters to the participants via the interface 234. In this regard, the environment manager 236 may invoke certain applications 242 so as to make certain processing tools available to all conference participants and associate visualization and control properties with the data so that the data becomes self-describing. Such association of visualization and control properties with the data may be performed by a perceptual network application.

An example of tools that may be made available to the conference includes fusion applications for aggregating data from multiple sources so as to generate enhanced data. The radiant collaboration subsystem 202 further includes a notification manager module 244 for issuing notifications of interest to participants of system 200 based on the results of the collaboration effort. For example, where the conference participants collaboratively identify a risk of terrorism, appropriate notifications may be made available to system users via the radiant sanitizer/guard subsystem 204. Maintenance and management tools 246 are also provided as part of the subsystem 202 to update and repair the subsystem 202 for increased reliability. It will be appreciated that the Radiant Trust System 200 may further make use of managed authentication services 248 for authenticating system users.

FIG. 2B illustrates a processing configuration 250 of the Radiant Trust Sanitizer Guard subsystem. In the illustrated configuration, the sanitizer receives inputs via multiple input channels 252. Screens 254 are provided for each input channel to perform a variety of different input channel-specific functions such as verifying access authorization, reformatting, and parsing the input information to the desired resolution. Instantiations of the input information may be also be generated for each addressee of the information. Processor 256 then performs addressee specific processing including processing based on addressee profiles. Output guards 258 are provided for each addressee and channel to ensure against improper information dissemination, e.g., provision of classified information to channels or individuals not having sufficient clearance levels. The information is then output via the multiple output channels 260. As shown, the configuration can very greatly, depending on the number of addressees associated with each input channel and the number of output channels associated with each input channel. Although not illustrated in FIG. 2B, it will be appreciated that information from different input channels 252 may be directed to a single output channel 260.

Figure 2C:
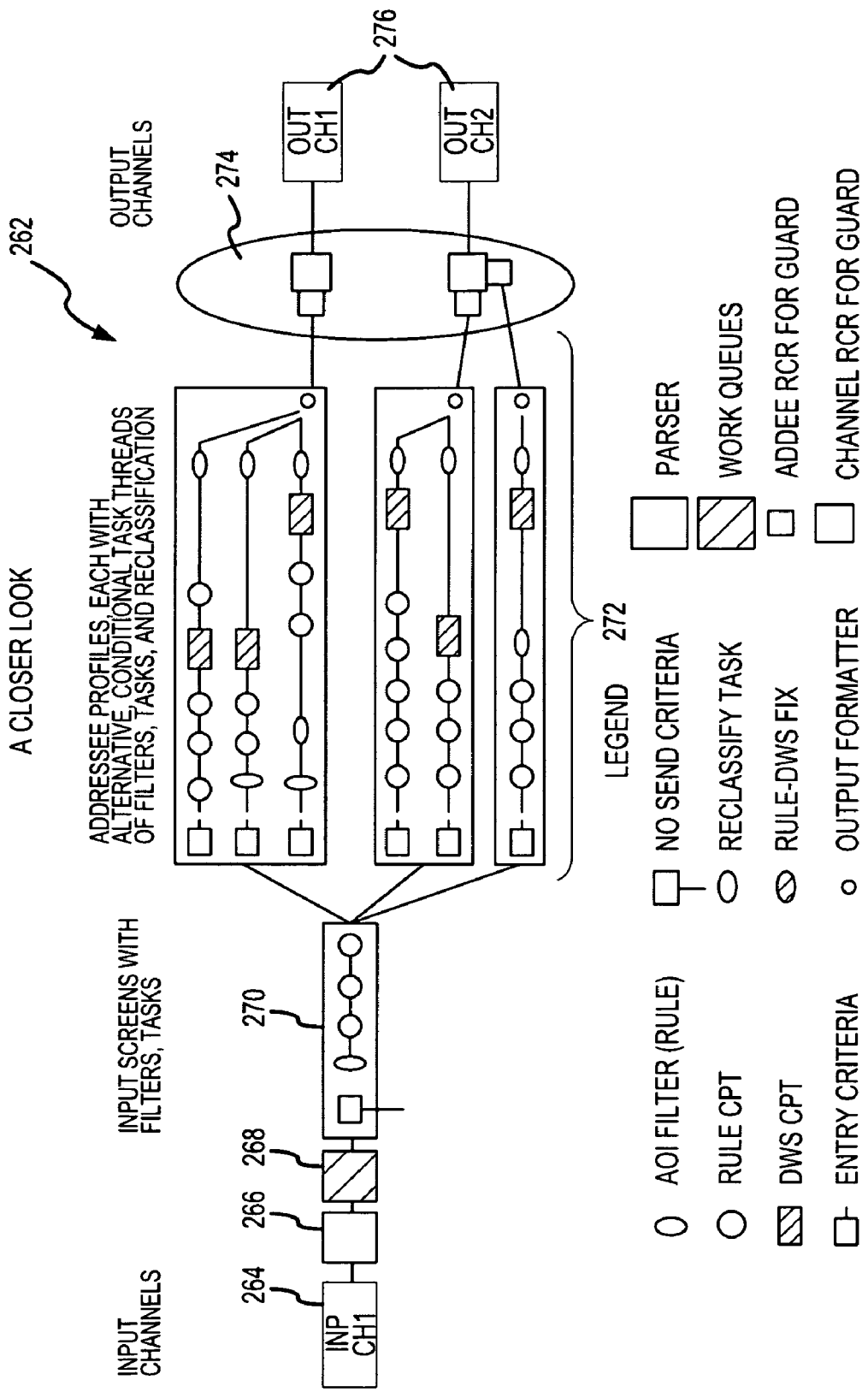
FIG. 2C illustrates a portion of the configuration of FIG. 2B associated with a single input channel.

The processing components associated with a single input channel system 262 are shown in more detail in FIG. 2C. In particular, an input received on a first channel 264 is first processed by a parser 266 to parse the input to the desired parsing resolution and the parsed input is then stored in work queue 268. Channel-specific input screens 270 then filter the input and perform a number of other channel-specific tasks. Processors 272 then apply the addressee profiles including filters, tasks, and reclassification of information, e.g., where the input information has been modified to reduce its classification status. The guard 274 then implements addressee specific and channel-specific guard functions and the resulting information is output to the channels 276.

Figure 3:
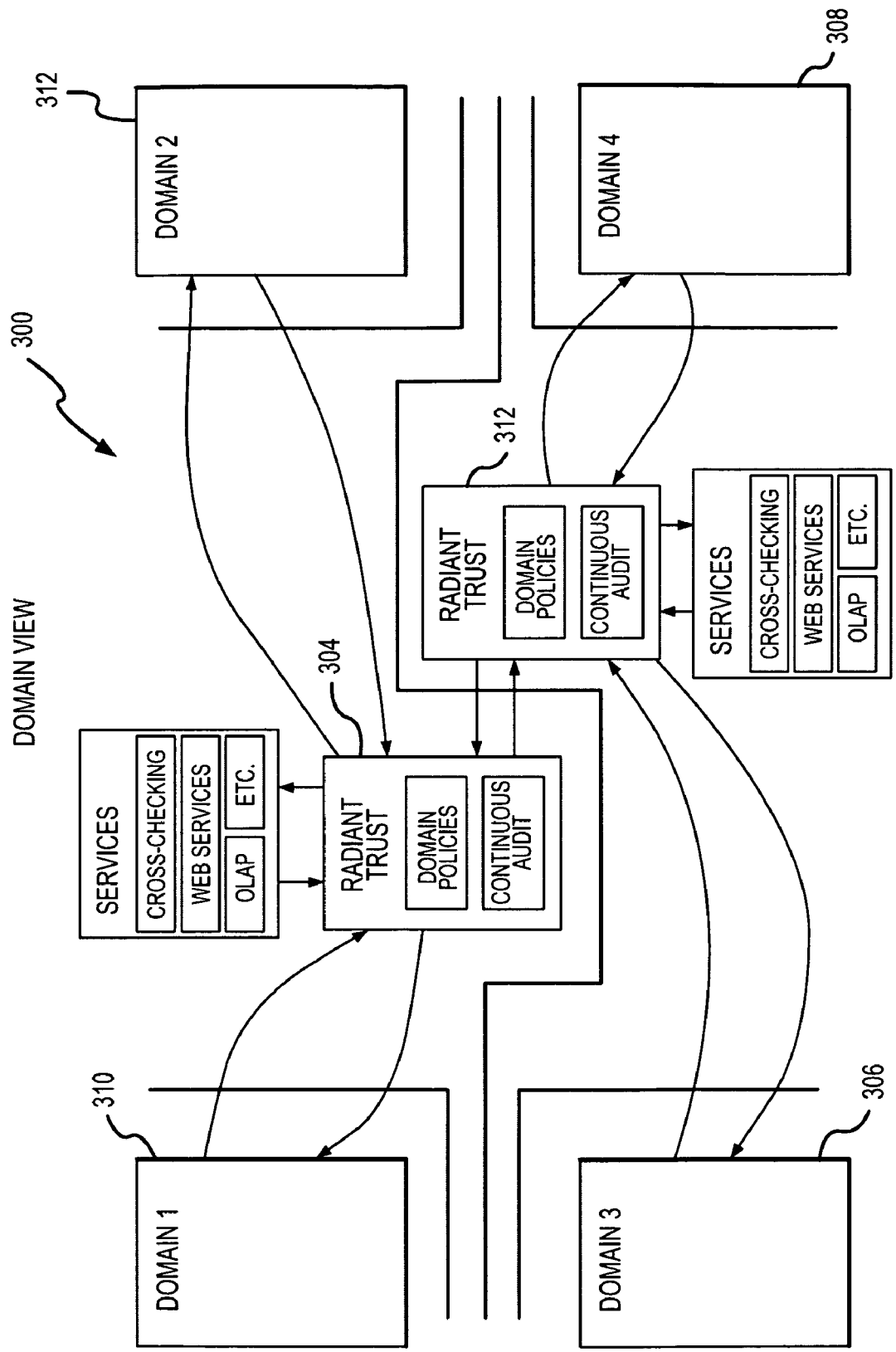
FIG. 3 illustrates a domain view of a network employing multiple Radiant Trust system in accordance with the present invention.

As noted above, multiple Radiant Trust Systems may be utilized within a network to implement a hierarchy of policies or peer policies relating to exchange of information across user domains. This is illustrated by the network 300 of FIG. 3.

That network 300 includes a first Radiant Trust System 302 and a second Radiant Trust System 304. For example, the first Radiant Trust System 302 may be operated by a private sector entity and may be operative for managing exchanges of information as between private sector domains such as domain three 306 and domain four 308. The second Radiant Trust System 304 may be operated by a public sector entity and may be operative for managing exchanges of information as between public entity domains such as domain one 310 and domain two 312. Each of the Radiant Trust Systems 302 and 304 may be fully operative as discussed above to manage exchanges of information and allow for collaboration as between its associated domains. In this regard, each system 302 or 304 may execute its own domain policies regarding exchanges of information, continuously audit exchanges of information and provide various services as described above.

Additionally, the first Radiant Trust System 302 may be interfaced with the second Radiant Trust System 304 so as to enable exchanges of information therebetween. Thus, for example, information regarding a cyber attack may be provided by the private sector participant of domain three 306, e.g., an Internet Service Provider, to a government sector participant of domain two 312 such as an intelligence agency. The information from domain three 306 may be processed by the first Radiant Trust System 302 to execute a content-based rule requiring that the name of the domain three user be replaced by a generic designation such as "Internet Service Provider" in the context of a public sector recipient or based on identification of the specific recipient of domain two 312. An output from the first Radiant Trust System 302 is then provided to the second Radiant Trust System 304. The second system 304 may output the information to domain two 312 and/or make the information available for use in a conference involving domains one and two 310, 312. As a result of processing within domain two 312 or in conjunction with a collaborative conference, it may be desired to issue a warning or report to the user of domain three 306 or to a number of system users such as the users of domains three and four 306, 308. For example, a report may be generated by the user of domain two 312 which is forwarded to the user of domain three 306 via the first and second Radiant Trust Systems 302 and 304. In this manner, the public sector user of domain two 312 gains access to information regarding a cyber attack which might not have been made available outside of the trusted environment created by the Radiant Trust Systems 302 and 304. The user of domain three 306 receives useful analysis and feedback regarding the cyber attack. Moreover, the user of domain three 306 may be comforted in the knowledge that its identity never left the private sector environment defined by the first Radiant Trust System 302 and its associated domains 306 and 308. In this manner, numerous enclaves of trust may be defined.

Figure 4:
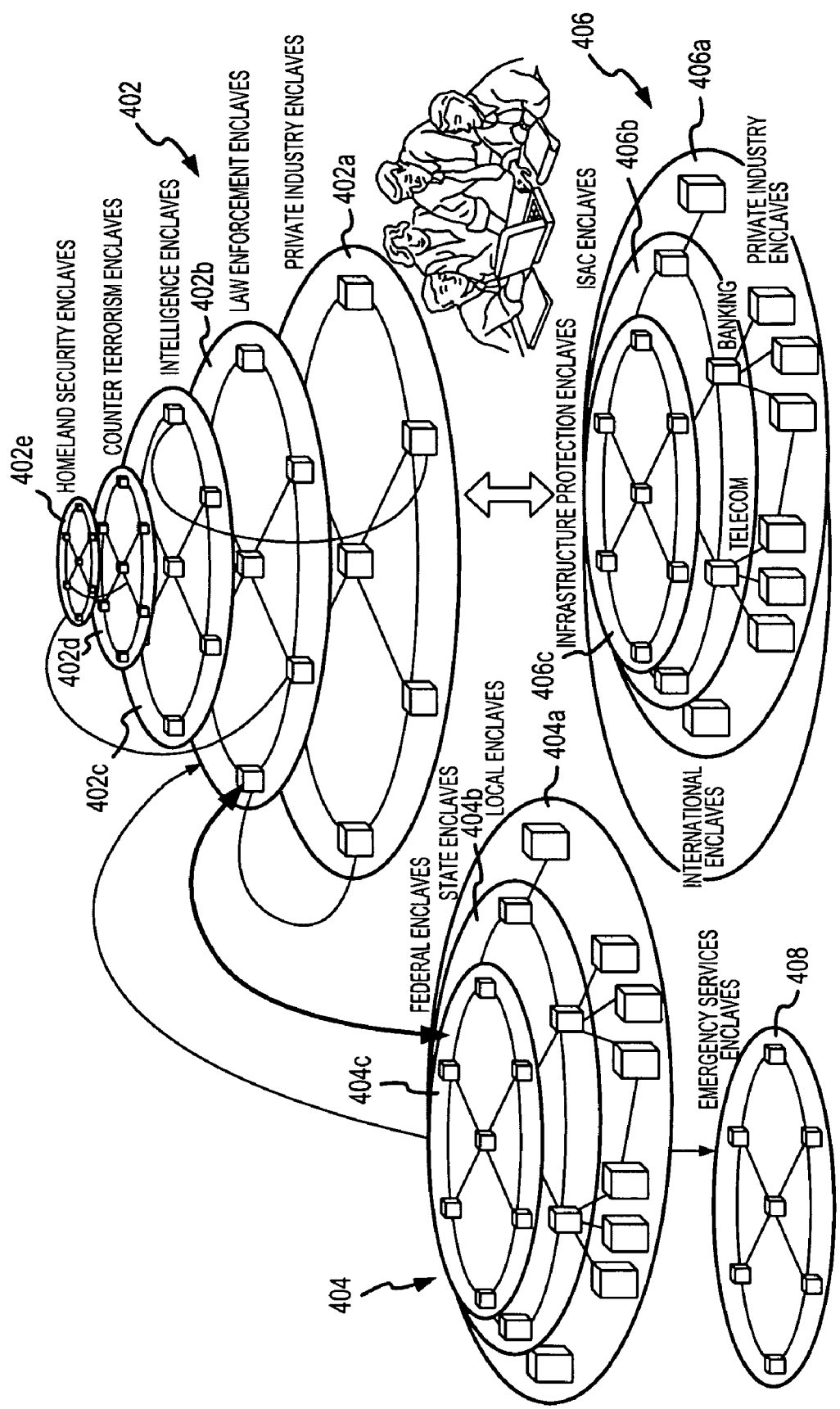
FIG. 4 illustrates enclaves of trust and hierarchies of enclaves defined in connection with the Radiant Trust system of the present invention.

These enclaves may be arranged in peer groups, hierarchies of peer groups, peer hierarchies, and hierarchies of hierarchies, as illustrated in FIG. 4. The illustrated network 400 includes a first hierarchy 402 of enclaves 402a-e, a second hierarchy 404 of enclaves 404a-c, a third hierarchy 406 of enclaves 406a-c and an independent emergency services enclave 408. Each of these enclaves 402a-e, 404a-c, 406a-c and 408 is depicted in FIG. 4 as a ring of peer entities centered about a Radiant Trust System. Hierarchy 402 includes a private industry enclave 402a, a law enforcement enclave 402b, an intelligence enclave 402c, a counter-terrorism enclave 402d and a homeland security enclave 402e. Hierarchy 404 includes a local enclave 404a, a state enclave 404b and a federal enclave 404c. Hierarchy 406 includes a private industry enclave 406a, an ISAC enclave 406b and an infrastructure protection enclave 406c. This hierarchy may also include an optional international enclave.

It will be appreciated that the illustrated hierarchies do not necessarily denote a particular sequencing or importance of the functions performed by the associated Radiant Trust Systems. For example, in the case of hierarchy 402, the hierarchical structure does not suggest a one-way flow of information from the private industry enclave 402a to the homeland security enclave 402e. Although such hierarchical rules may be built into a hierarchy, for example, by agreement of the participants, the illustrated hierarchies merely provide a convenient conceptual framework. Additionally, the illustrated hierarchies are not intended to limit the types of relationships that may be defined between the participants. Thus, for example, within the hierarchy 406, sub-hierarchies may be defined. For example, a banking ISAC or telecom ISAC of enclave 406b may be associated with particular private industry participants of enclave 406a.

Moreover, it should be appreciated that the illustrated proliferation of Radiant Trust Systems does not necessarily entail a directly corresponding proliferation of computing platforms. In this regard, the functionality of a given system may be distributed over multiple platforms and functionality of different systems may be performed over a common platform. As illustrated in FIG. 4, the Radiant Trust network 400 flexibly allows for exchanges of information within an enclave, between enclaves, between hierarchies, or between a hierarchy and an enclave. Such exchanges of information generally involve at least one Radiant Trust System but do not necessarily require a predefined sequence of Radiant Trust Systems associated with a particular hierarchy.

Figure 5:
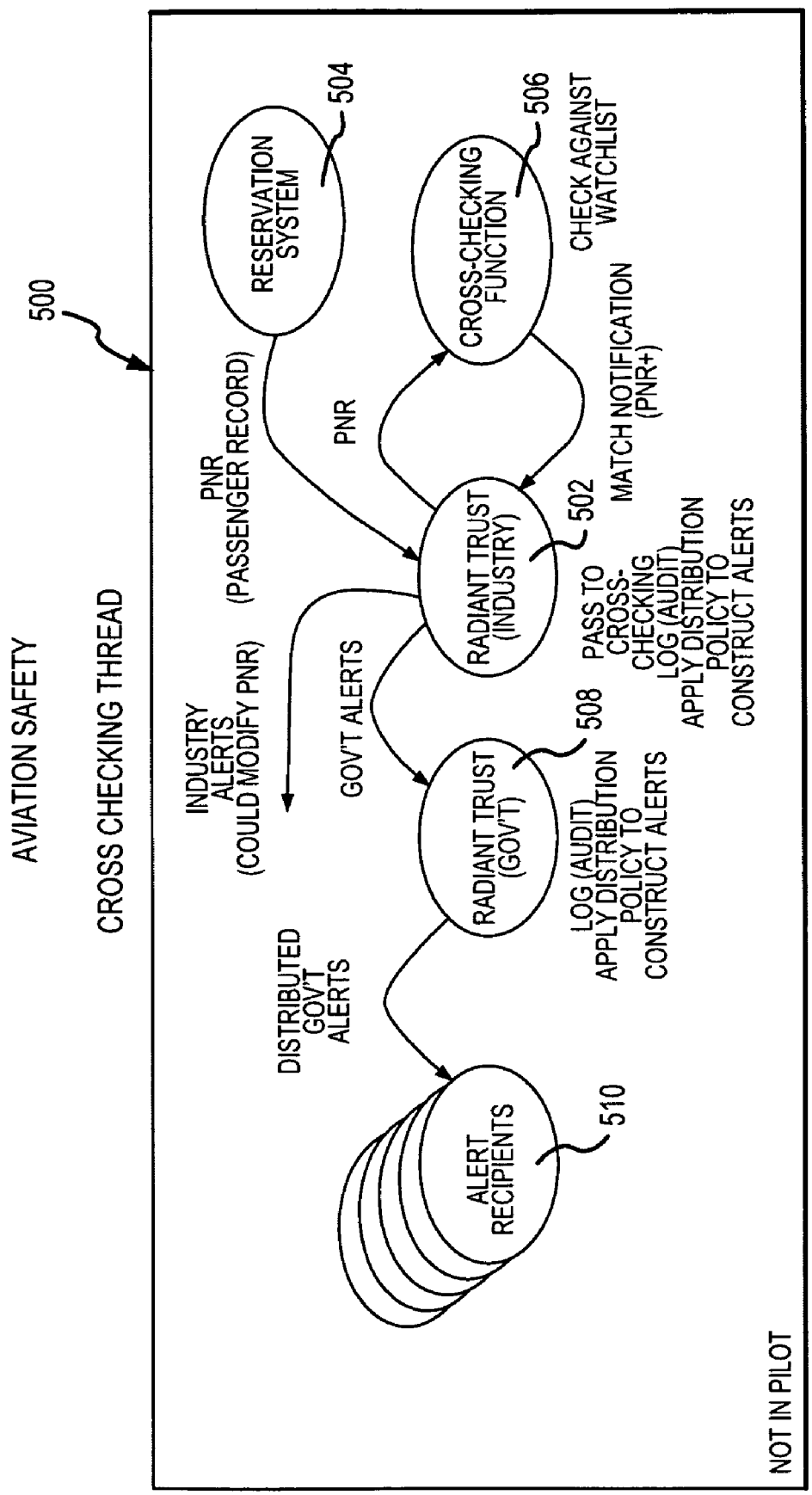
FIG. 5 illustrates a cross checking thread implemented by the Radiant Trust system of the present invention in connection with an aviation safety application.
Figure 6:
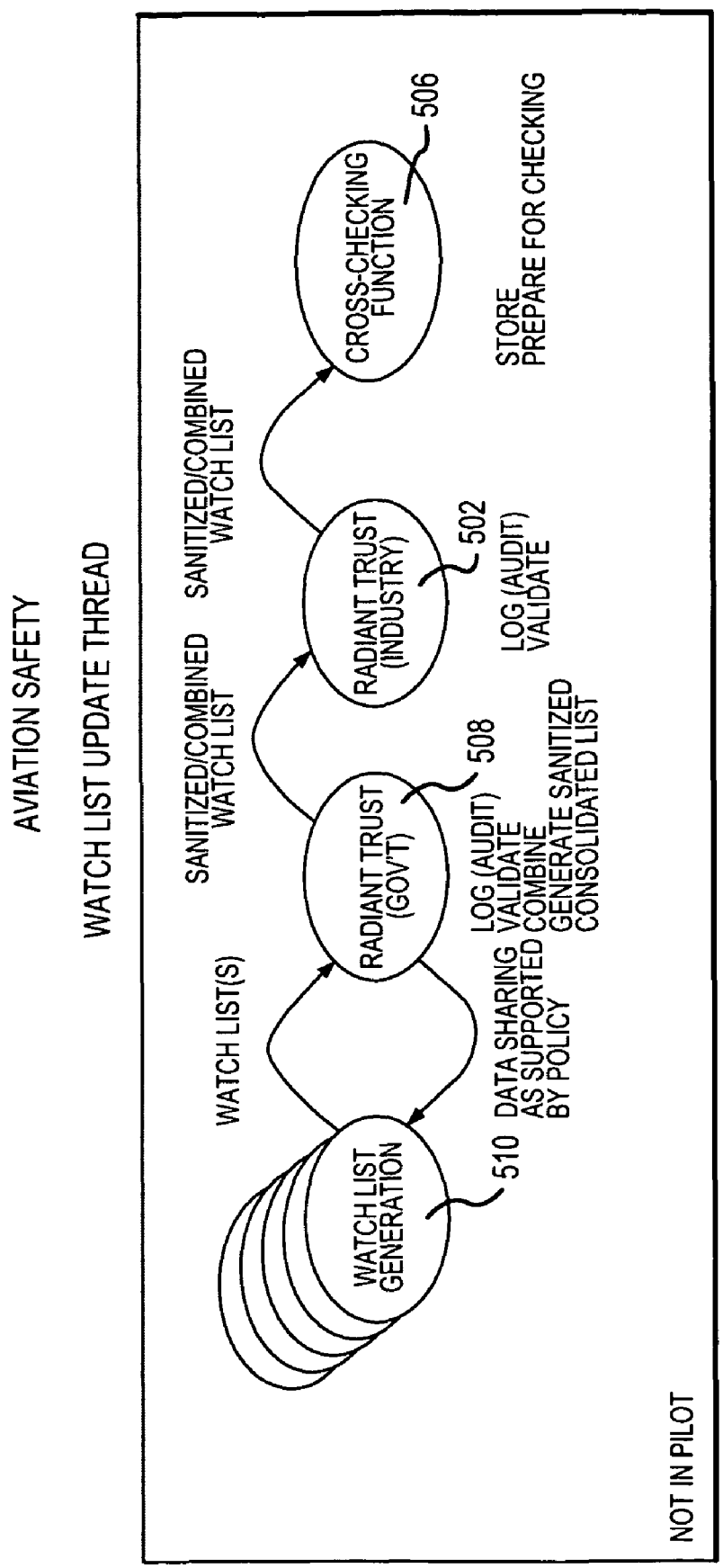
FIG. 6 illustrates a watch list update thread executed by a Radiant Trust system according to the present invention in connection with an aviation safety application.

FIGS. 5 and 6 depict certain processing threads implemented using the Radiant Trust System in the context of an aviation safety application. In particular, FIG. 5 illustrates a cross-checking thread 500 that may be used to cross-check an airline reservation system record against an intelligence agency terrorist watch list. FIG. 6 illustrates an update thread that can be used to update a terrorist watch list. Referring first to FIG. 5, an industry Radiant Trust System 502 receives an input from an airline industry reservation system 504. In this case, the input is a passenger record including at least the passenger name and flight information. The industry Radiant Trust System 502 in the illustrated implementation is operated by an industry-based entity. As noted above, this system 502 is operative to handle varying input formats and to protect any sensitive information.

The first Radiant Trust System 502 forwards information including at least a passenger name to a cross-checking application 506 which checks the passenger name against an existing terrorist watch list. The application 506 responds to the industry Radiant Trust System 502 with information including at least the passenger name and an indication that the cross-check resulted in a match or did not result in a match. In the case of a match, the industry Radiant Trust System 502 may forward an alert to a second Radiant Trust System 508, e.g., operated by a government entity. Alerts may also be forwarded to peers in the aviation industry. In this regard, sensitive information may be deleted or modified to address civil liberties concerns or competitive concerns. The government Radiant Trust System 508 distributes the alert to identified alert recipients 510. Such recipients may include law enforcement officials, intelligence agencies and foreign intelligence agencies or governments.

FIG. 6 illustrates a thread 600 by which the cross-checking application 506 may be compiled and updated. As shown, the watch list information may come from a variety of sources including various intelligence agencies, law enforcement agencies and foreign sources. This information is provided to the government Radiant Trust System 508 which logs and validates the information, aggregates the information and generates a sanitized consolidated watch list. This watch list is provided to the industry Radiant Trust System 502 which, in turn, forwards the information to the cross-checking application 506. As shown, the government Radiant Trust System 508 may be operative to disseminate the consolidated list back to the individual sources in raw or sanitized form, depending on the associated policy rules.

II. Radiant Sanitizer Guard

As noted above, the Radiant Trust System includes a Radiant Sanitizer Guard subsystem and a Radiant Collaborative subsystem. The Radiant Sanitizer Guard subsystem is described in more detail in this section and the Radiant Collaborative subsystem is described in the following section.

Figure 7:
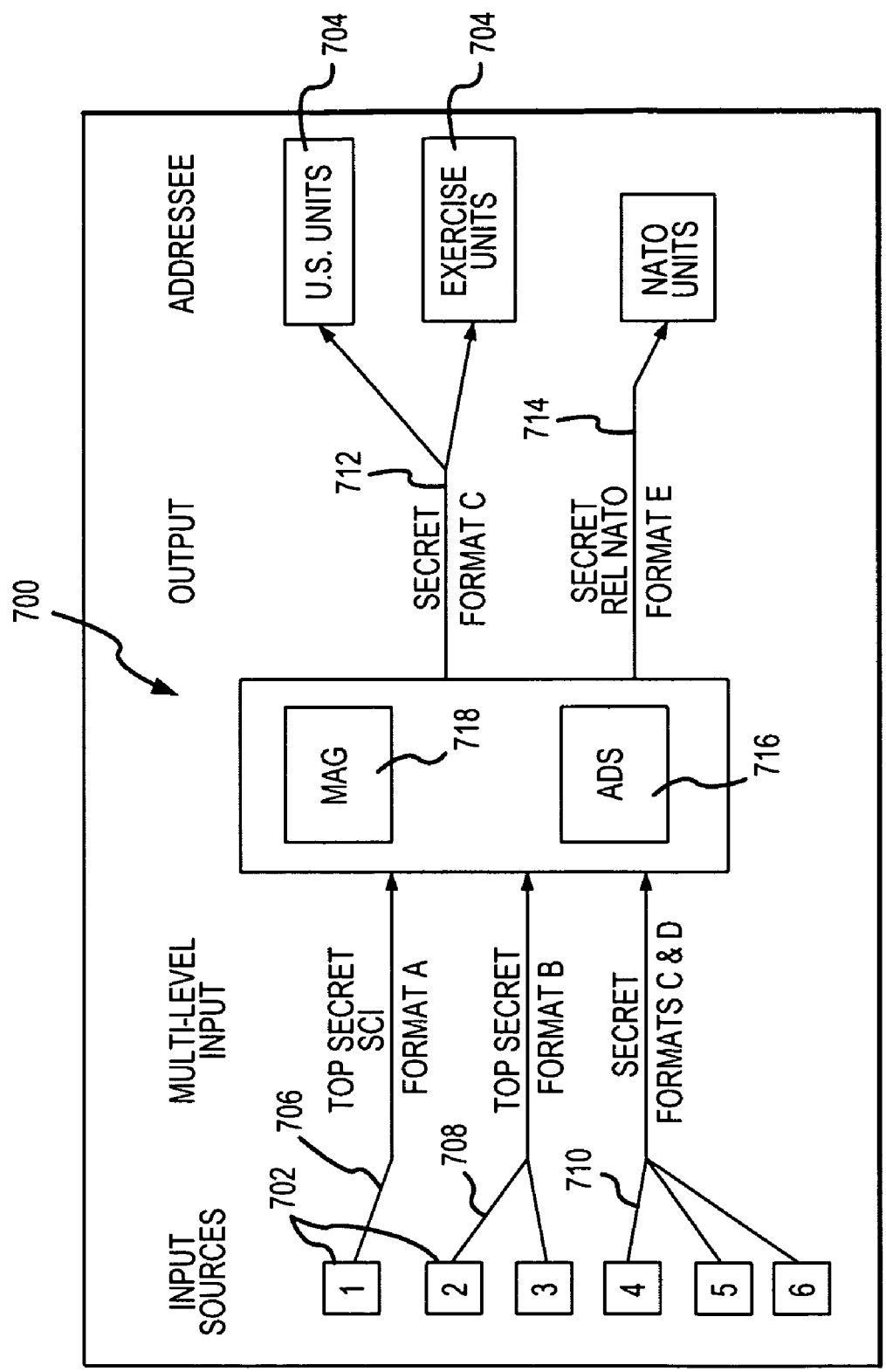
FIG. 7 is a schematic diagram of a classified information processing and distribution system in accordance with the present invention.

FIG. 7 is a schematic diagram providing an overview of a sanitizer/guard subsystem that may be incorporated into a Radiant Trust system as described above. In this case, the subsystem is illustrated in connection with an application for handling classified/sensitive information as may be required in various defense contexts. As shown, multiple input sources 702 provide information to the system 700 at various levels of classification. In the illustrated example, these classifications include "Secret" and "Top Secret", as well as sensitive compartmented information (SCI). This information is reported over various communication channels 706, 708 and 710 and in different message formats, in this case designated formats A-D. The system 700 sanitizes that data to the classification levels required for dissemination over lower level channels 712 and 714 to addressees 704, at least some of whom do not have clearance sufficient to receive all of the input information, i.e., addressees who are only authorized to see sanitized versions of the data. In the illustrated case, the output channels 712 and 714 are associated with classification levels "Secret" and "Secret Rel NATO." The system 700 accommodates different addressee consumers by reporting data in formats they understand or can process, which may or may not be the same as the original reported format. In the illustrated embodiment, the output channels 712 and 714 are shown as handling data in formats C and E, i.e., one of which (C) overlaps the input formats and one of which (E) does not.

The system 700 supplements or replaces conventional manual sanitizer terminals previously used in such applications and provides a standard intelligence data communications interface. The system 700 implements sufficiently trusted software and hardware within a system concept that removes the human interaction required by manual sanitization. This accelerates delivery of time sensitive information, since human intervention is not required for each message release. It also increases the level of trust, since a computer can be relied upon to perform repeatedly the same tasks in exactly the same way, unaffected by the type of performance distractions to which a human operator may be subject.

Application of the "need-to-know" doctrine within the compartmented security system of the United States means that various users are to receive only selected subsets of the information and products produced by the intelligence community. Gatherers of this intelligence information and creators of the intelligence product initially are responsible for determining the security level of their output. Systems which subsequently distribute and further process this information, including the illustrated system 700, are responsible for insuring that the integrity of the security classifications are maintained.

The classification of a message such as an individual contact report is defined by the sensitivity of the information in the data fields within the report format. It is possible to modify (e.g., change or delete) the information in specific fields within the contact report to reduce the overall classification of the message information and so give the message a broader releasability. In the past, this action required determination by an operator/analyst to insure that product dissemination did not compromise higher-level accesses or compartments. This added processing delay time to contact data which is often time-critical to the final tactical user, e.g., the Command and Control tactical decision-maker or the Over-the-Horizon weapon system.

In some cases, the nature of the data and message formats used for data distribution permit the system 700 to insure that sanitization, downgrading or screening is properly accomplished quickly. This is especially true in the following cases: where message formats are well-defined and controlled and contain free text fields; where these free text fields may be simply eliminated from the resultant outgoing product; and where the rules governing information classification and the formatted data fields are well defined and understood.

The illustrated system 700 generally includes an Automatic Data Sanitizer (ADS) module 716 and a Message Analysis and Generation (MAG) module 710. These modules encompass functionality similar to that of various components described above, and provide certain functionality specific to the classification screening context. The ADS module 716 provides the automated means by which formatted multi-level classified data, including SCI, is sanitized and rapidly disseminated at different classification levels. The module 716, in cooperation with the MAG module 718, accepts classified data from designated communications channels, sanitizes and then reclassifies the data according to user-designated rules, and verifies that the data meets a set of precisely defined and rigorously controlled criteria for release. The ADS module 716 releases the information at a different level of classification or compartmentation, typically at the general service (GENSER) level. The system 700 disseminates the information only to users cleared for that level of classification and/or compartmentation. It does not disclose or release data to unauthorized consumers.

The MAG module 718 addresses issues relating to accommodating different data formats. As noted above, the various external systems that define the input sources and output addressees/consumers of classified information are characterized by a proliferation of data transmission formats. The MAG module 718 generally performs two transformation functions in this regard. First, the module 718 transforms input data from the various external formats into the internal data representation of the ADS module 716. Then, the MAG module 718 receives sanitized information from the ADS module in the internal representation and transforms such information into the various external formats of the addressee systems. It will thus be appreciated that the MAG module 718 is capable of handling a variety of external formats. As will be described in more detail below, the MAG module 718 is a table driven subsystem that can access multiple external format specifications stored in a table structure so as to implement these transformation functions without undue delay.

The following description is generally divided into two subsections. First, the various interface functions as implemented by the MAG module 118 are described. These functions include the parsing of input data and formatting of output data. Next, the following description includes a detailed discussion of the various sanitization related functions implemented by the ADS module 116.

A. The Message Analysis and Generation (MAG) Module

FIGS. 8-14 illustrate the various structures and processes of the MAG module. Although the MAG module is described for use in connection with the sanitization and distribution of classified information and has particular advantages in this regard, it will be appreciated that various aspects of the MAG module are useful in other contexts in connection with other applications. In this regard, many applications need to parse and format message data. These functions are generally transformations between external and internal (application-specific) representations of information. The MAG module provides a simply invoked and powerful utility for both transformations.

Figure 8:
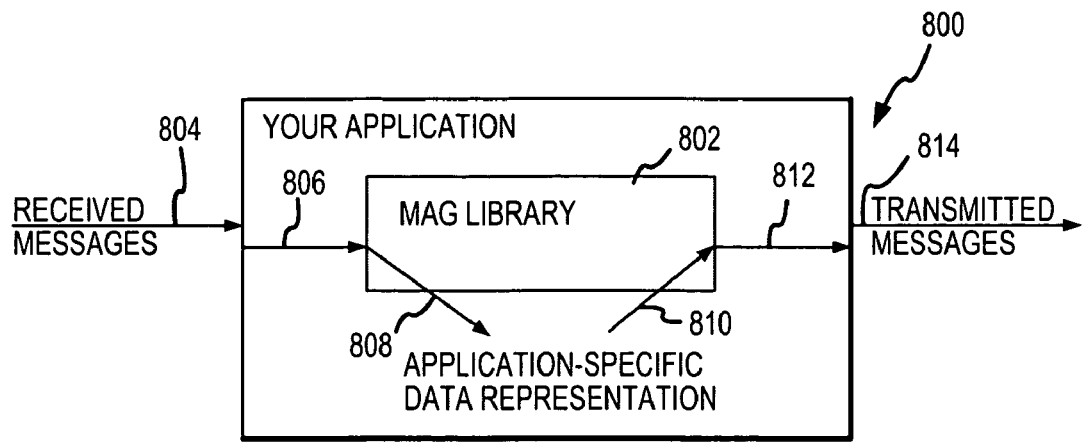
FIG. 8 is a schematic diagram showing an information flow relative to a Message Analysis and Generation module in accordance with the present invention.

FIG. 8 provides a schematic diagram of the MAG module functionality. In the illustrated example, the MAG module 802 is incorporated into and may be called by a processing system 800 such as the classified information processing and distribution system of FIG. 7. The system 800 receives messages 804 in any of multiple external formats. The module 802 receives an input 206 based on the received message 804 and processes the input 806 to provide a transformed input 808 reflecting an application-specific data representation. The processed input 808 is then further processed by the system 800 to generate an output 810, again reflecting an application-specific data representation. This output 810 is then processed by the MAG module 802 to generate a processed output 812 reflecting an external format of an identified addressee system. The system 800 then provides e.g., transmits or otherwise makes available for transmission an output message 814 based on the processed output 812.

As will be discussed in more detail below, the MAG module 802 is recursively invoked and is driven by format specifications. Such recursive invocation enables the module 802 to provide a selectable parsing resolution to address specific parsing processes. In this regard, the utility can parse entire messages, data sets within a message, data items within a data set and sub-items within a data item. The data can thus be analyzed in a tailored fashion as precisely as the calling application requires. The module 802 can thereby implement single instances of various message processing functions (e.g., extraction, content validation, checks and validation) at each such level of a message. All of this functionality is based on a platform and application independent library enabling reuse of the MAG module 802 in a variety of computing environments. Moreover, the common form of the internal representation of data used by the module 802 simplifies message translation.

Figure 9:
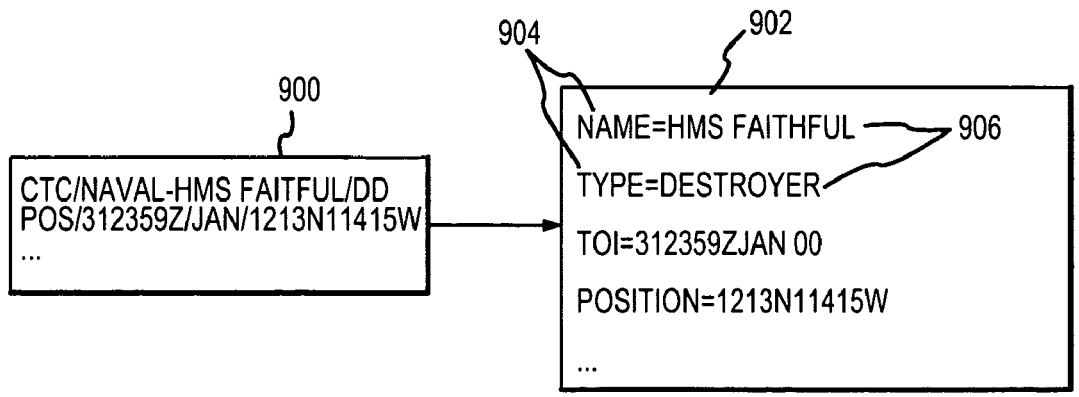
FIG. 9 illustrates an "input data transformation" in accordance with the present invention.
Figure 10:
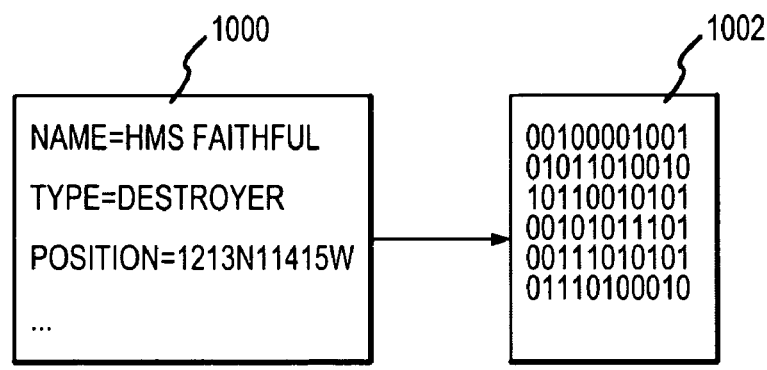
FIG. 10 illustrates an "output data transformation" in accordance with the present invention.

As noted above, the illustrated MAG functions entail two separate data transformations. The module 802 can handle various messaging formats including character-oriented (ASCII) and bit-oriented (binary) messages. The transformation processes that are possible are as varied as the permutations of different source and addressee formats. FIGS. 9 and 10 schematically illustrate character and binary message transformations respectively. Specifically, these Figures illustrate an exemplary information flow through a sanitization system incorporating the MAG module 802 where input text is received in a character-based input format and sanitized data is output in bit-based format.

Referring first to FIG. 9, box 900 illustrates a formatted character-based message input. The input 900 includes a number of data fields from which useful data can be extracted. The process for extracting such data involves accessing a format specification, using the format specification to parse the message into its various fields and reading the information from the various fields. Box 902 illustrates an internal data representation that can be understood by the calling application. In this case, the internal representation 902 includes a number of tags 904 identifying the data fields together with content 906 associated with each such tag. FIG. 9 thus illustrates an input transformation process from an external format to an internal data representation.

FIG. 10 illustrates an output transformation. Box 1000 represents an internal data representation. The content of this message may be the same or different than the input message. In the illustrated example, the message 1000 is a sanitized message (at least the Time of Intercept—TOI—field has been eliminated from the input message as shown in FIG. 9). In the illustrated example, the message 1000 is transformed to a binary message output 1002. The binary message 1002 includes all of the data for message 1000 organized in a format that will be understood by an identified addressee system. Again, this transformation is performed based on a format specification defining the corresponding external format.

Figure 11:
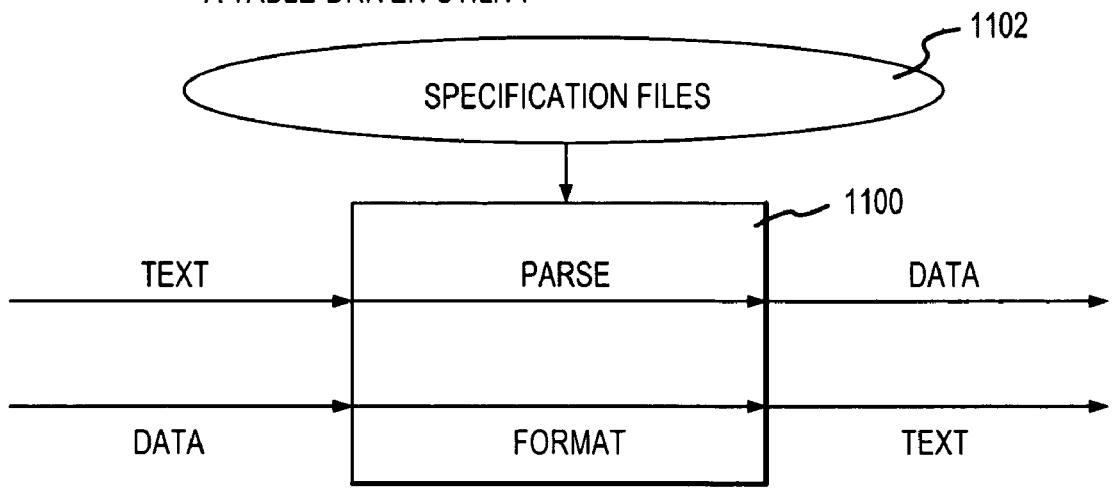
FIG. 11 illustrates a high-level architecture of the Message Analysis and Generation module of FIG. 8.

The MAG module thus provides a message disassembly and reassembly engine. A preferred architecture for such a module 1100 is generally illustrated in FIG. 11. As shown, the module 1100 is configurable for different transformation processes by accessing stored specification files 1102. The specification files 1102 may be stored in format-specific tables, e.g., in a relational database where each table includes a format specification and an identifier or link for that format. Details of the various formats thus reside outside of the executable software of the module 1100 and outside of the calling application. When the module 1100 is required to process a new message format (input or output format) software modifications are generally not required. Rather, a new format specification can simply be added to the specifications files 1102. Similarly, when an existing message format changes, or a source system breaks predefined rules, it is generally unnecessary to rewrite software. Such issues can generally be addressed by modifying a file of the specification files 1102.

The formats and associated specifications may be standard or custom formats. Examples of formats that may be supported by the module 1100 include OTHT—Gold, OIL-STOCK, KLIEGLIGHT, TACELINT, TACREP, TIBS binary, ENSCORE—ELD, NITF, SENSOREP, SAR, TRE Tabular, various inter-database formats and numerous specialized formats. The module 1100 can process and transliterate on a line-by-line or similar basis relative to such formats. Simple user interfaces may be provided for selecting and defining formats to be supported for a particular application, as set forth in U.S. Provisional Patent Application Ser. No. 60/215,114.

The specifications are thus external to the compiled software. As a result, it is unnecessary to recompile software each time processing formats change. The specifications are also generally hierarchical. That is, the specifications may be defined relative to an overall message, a data group, a data item, and data sub-items. Accordingly, as will be discussed below, the module 1100 can implement a substantially unlimited depth of resolution and text analysis. Moreover, many of the attributes of the specifications are inheritable. That is, many specifications evolve from a common lineage. For example, two specifications may have evolved from a common parent. In such cases, many of the specifications' attributes can be inherited from the parent, thus simplifying specification definition and reducing the required storage space. Similarly, many of the attributes of the various specifications are reusable. For example, it is generally unnecessary to respecify the known months of the year each time a message references one.

The basic paradigm of a system implementing the MAG module is a parse-process-reassemble paradigm. An example of the intermediate process step is set forth in the latter section of this description. The associated concepts of parsing, parsing resolution, inheritance and the like may be better understood by reference to the parse tree 1200 of FIG. 12. For the purposes of this example, consider the components that constitute a simple document 1202. In this case, the document 1202 is composed of sections of text separated by section markings. The defined sections might include introduction 1204, scope, 1206, references 1208, descriptive 1210 and recommendation 1212 sections. Each descriptive section 1210 may be further divided into an introductory paragraph 1214, a series of section body paragraphs 1216 and a summary paragraph 1218, each separated by a blank line. Each paragraph may be divided into sentences 1220 separated by periods, question marks, or exclamation points. Each sentence may further be divided into words 1222 separated by blanks. The parsing functionality of the MAG module is recursive. That is, the module can iteratively access and parse the "tokens" that constitute the content of various levels of the parse tree 1200. The specifications describing these various tokens are referred to herein as "MAGs." Thus, in the illustrated example, the specification describing the document is the top level MAG. The introduction, scope, references, descriptive and recommendation section MAGs are all children of the document MAG, and each is a sibling MAG to one another. Similarly, each descriptive section MAG is a parent to (or composed of) an introductory paragraph MAG, a repeatable body paragraph MAG, and a summary paragraph MAG. The hierarchy of parent and child continues to the lowest level of individual words in a sentence in this example. Thus, the MAG module can be recursively invoked to provide substantially any level of processing resolution. For example, a message may be parsed to the word level to search for "dirty words". In such a context, a sanitization process can be tailored to carefully protect against dissemination of protected information while enabling maximal transmission of clean information.

Figure 12:
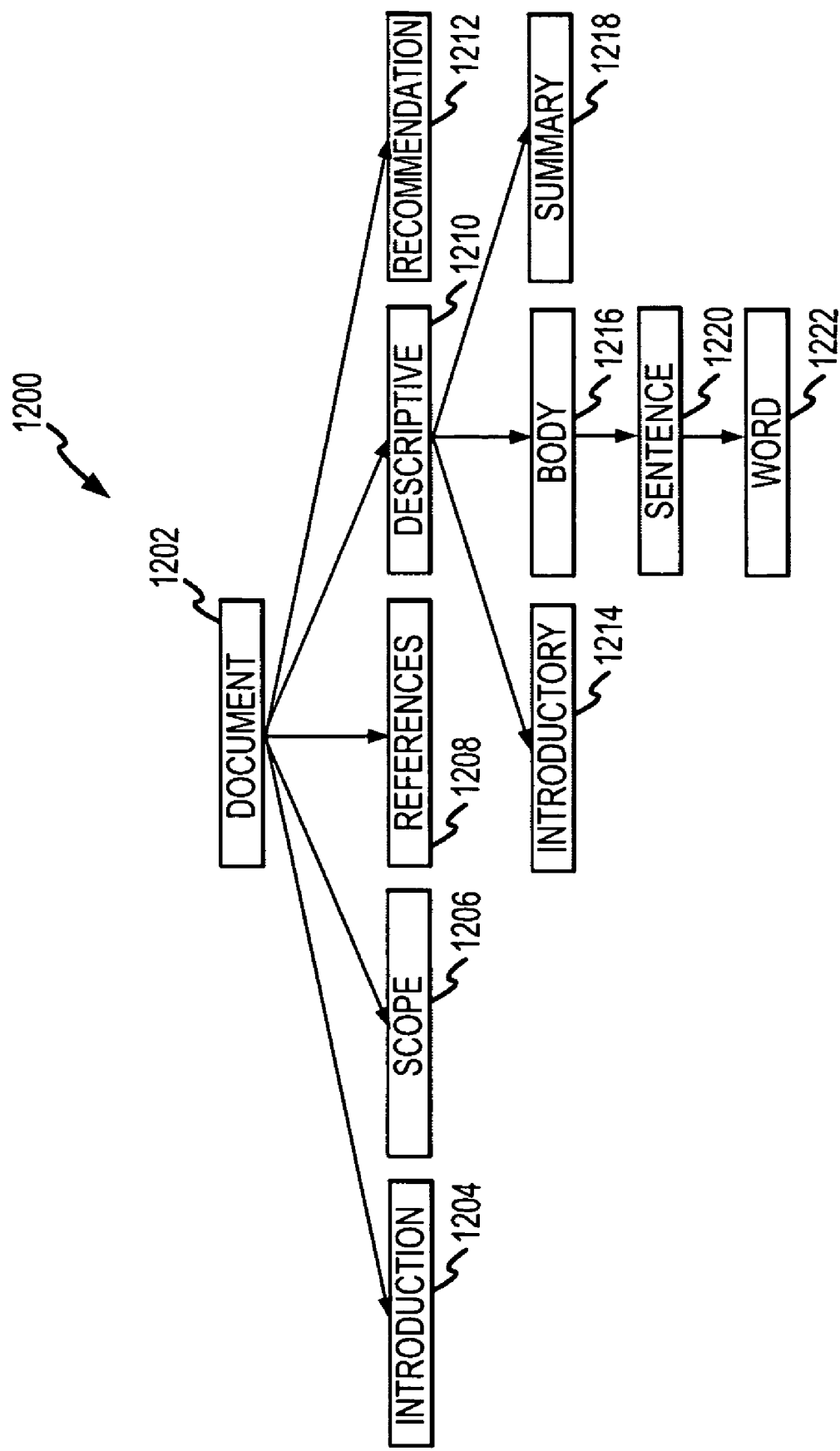
FIG. 12 illustrates a "parse tree" that may be executed by the Message Analysis and Generation module of FIG. 8.

Also, from the parse tree of FIG. 12, it will be observed that many of MAGs' attributes can be inherited from related MAGs, thereby simplifying MAG definition and the required storage. The associated MAG specification tree, including all specifications of alternatives, components, delimiters, and so on, provides the roadmap needed to traverse the textual message. As the text of the message is sequentially parsed, available branches of the specification tree are followed or rejected to allow full understanding of message content. The text pertinent to an accepted branch is isolated and provided to higher resolution (component) specifications: a line of text is isolated and extracted based on its delimiters and lengths and is then handed down to component field specifications which perform similar functions, isolating and extracting text for processing by component sub-field specifications.

The specifications define various MAG parameters. A MAG parameter is a variable aspect of the MAG definition that controls some part of MAG behavior. Most parameters of a MAG specification need not be defined; typically, this means that the validation or construction associated with that parameter specification will not be performed. Parameters may also be inherited from a parent MAG, so that child MAGs need not repeat the specification of parameters of the parent. For each parameter, the requirements may be grouped by applicability to specification parse and format.

A detailed listing of parameter types is provided in U.S. Provisional Patent Application Ser. No. 60/215,114 as well as user interface implementations related thereto. Some of these parameters are: identification parameters that allow for identification of a MAG, including specification of component or parent relationships and inheritability of parameters and specification of MAG type such as format-type (e.g., TACELINT) or field-type (e.g., ORIGINATOR); delimiting and length parameters that provide the means by which the content or text domain associated with a MAG is distinguished or isolated from the text that surrounds it, including definition of delimiter symbols, maximum length and minimum length; content restriction parameters such as verification of allowed characters and detection of non-data indicators; and component parameters by which each MAG can specify a list of components that must be parsed in conjunction with the process by which the higher level MAG is itself parsed. This last parameter type will be better understood upon consideration of the following process flow discussion.

The processes implemented by the MAG module include parsing and formatting. In the context of the illustrated implementation of the present invention, parsing is the transformation of information from the input text domain to the internal data domain and formatting is the transformation of information from the internal data domain to the output text domain. While parsing is essentially a message-driven activity in which MAG specifications are chosen from those available based on how well they accommodate the message, formatting is a specification-driven activity in which text is generated based on the availability of internal data to populate it.

Figure 13:
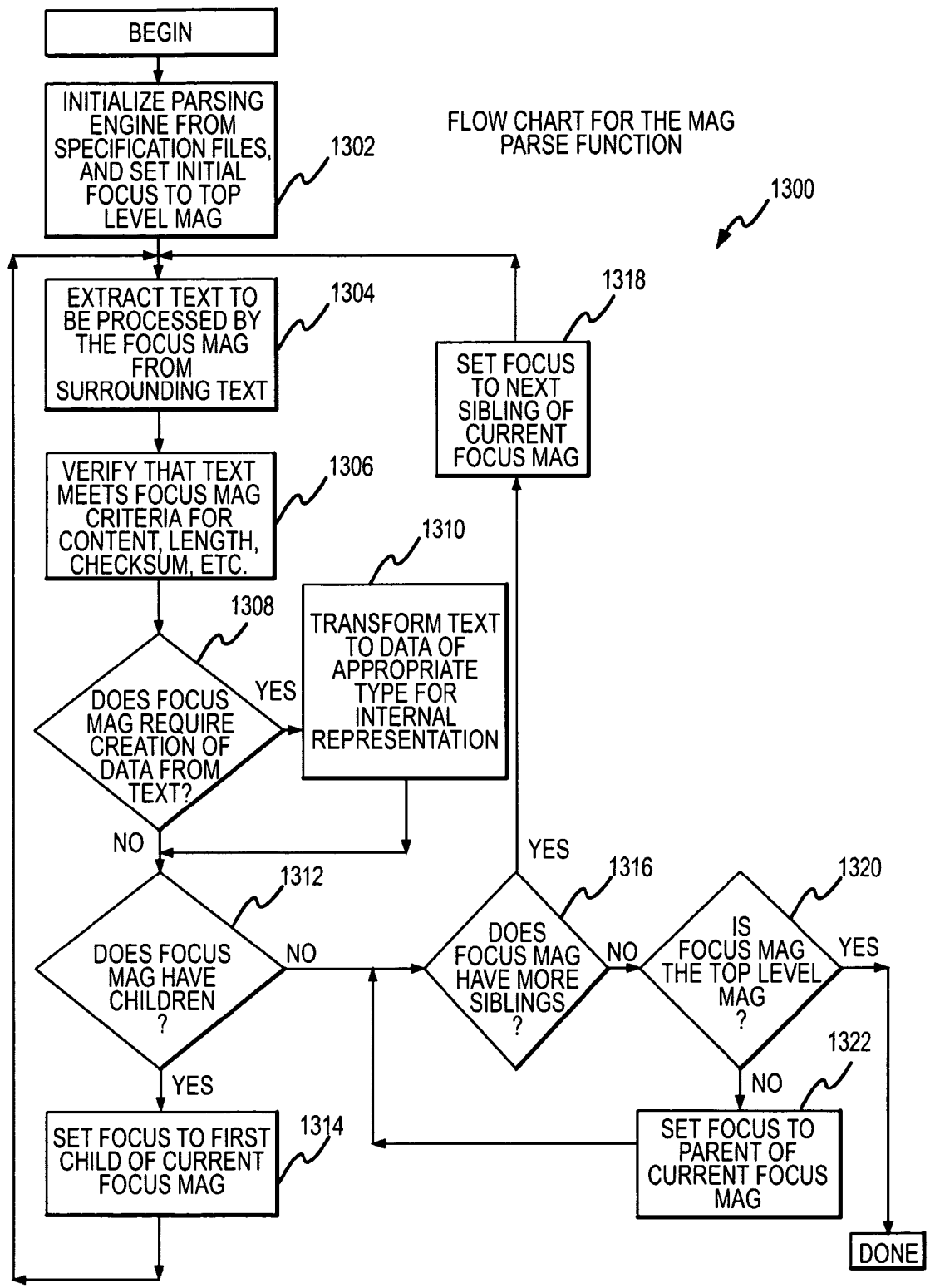
FIG. 13 is a flowchart of a Message Analysis and Generation "parse function" in accordance with the present invention.

FIG. 13 is a flow chart illustrating the MAG parse function 1300. The function 1300 begins with initializing (1302) the parsing engine component of the MAG module from specification files and setting the initial focus of the parsing engine to the top level MAG. This involves identifying the external format of the information source accessing the corresponding specification from the specification tables and using the specification to configure the parsing engine. The specification will also define the top level MAG. This MAG becomes the "focus" MAG for the ensuing processing. The MAG module then extracts (1304) the text to be processed by the parsing engine using the focus MAG from the surrounding text. Specifically, a primary purpose of the parsing function 1300 is to transform a message from an external format to an internal representation. This is implemented based on the specification for the external format. For each token of a parse tree, the associated text is processed based on its MAG.

Prior to transformation, the MAG module verifies (1306) that the text meets focus MAG criteria for content, length, checksum, etc. It is then determined (1308) whether the focus MAG requires creation of data from text. If so, the text is transformed (1310) to data of an appropriate type for internal representation. If not, further parsing may be required. In this regard, the MAG module next determines (1312) whether the focus MAG has any children. If so, the focus of the parsing engine is set (1314) to a first child of the current focus MAG and the process defined by blocks 1304, 1306, 1308 and 1310 is repeated using the new focus MAG. It will thus be appreciated that loop 1304, 1306, 1308, 1310, 1312 and 1314 defines a process for recursively parsing along a particular lineage (the "intralineage parsing process") to achieve the parsing resolution required for an application under consideration. If it is determined during any such iteration at block 1312 that the focus MAG does not have children, then the MAG module determines (1316) whether the focus MAG has any siblings. If so, the focus of the parsing engine is set (1318) to the next sibling of the current focus MAG and the intralineage parsing process is repeated with respect to this sibling. In this manner, different lineage branches of the parse tree can be parsed to the resolution required for a particular application.

If it is determined at block 1316 that the current focus MAG has no more siblings, then the MAG module determines (1320) whether the focus MAG is the top level MAG. If not, the MAG module sets (1322) its focus to the parent of the current focus MAG to see whether the parent has any siblings. The loop thus defined can be iterated to work back up through the parse tree to the top level MAG. In this manner, any MAG relationships that may have been missed working downward through the tree can be identified. Once the top MAG is reached, the process is complete.

Figure 14:
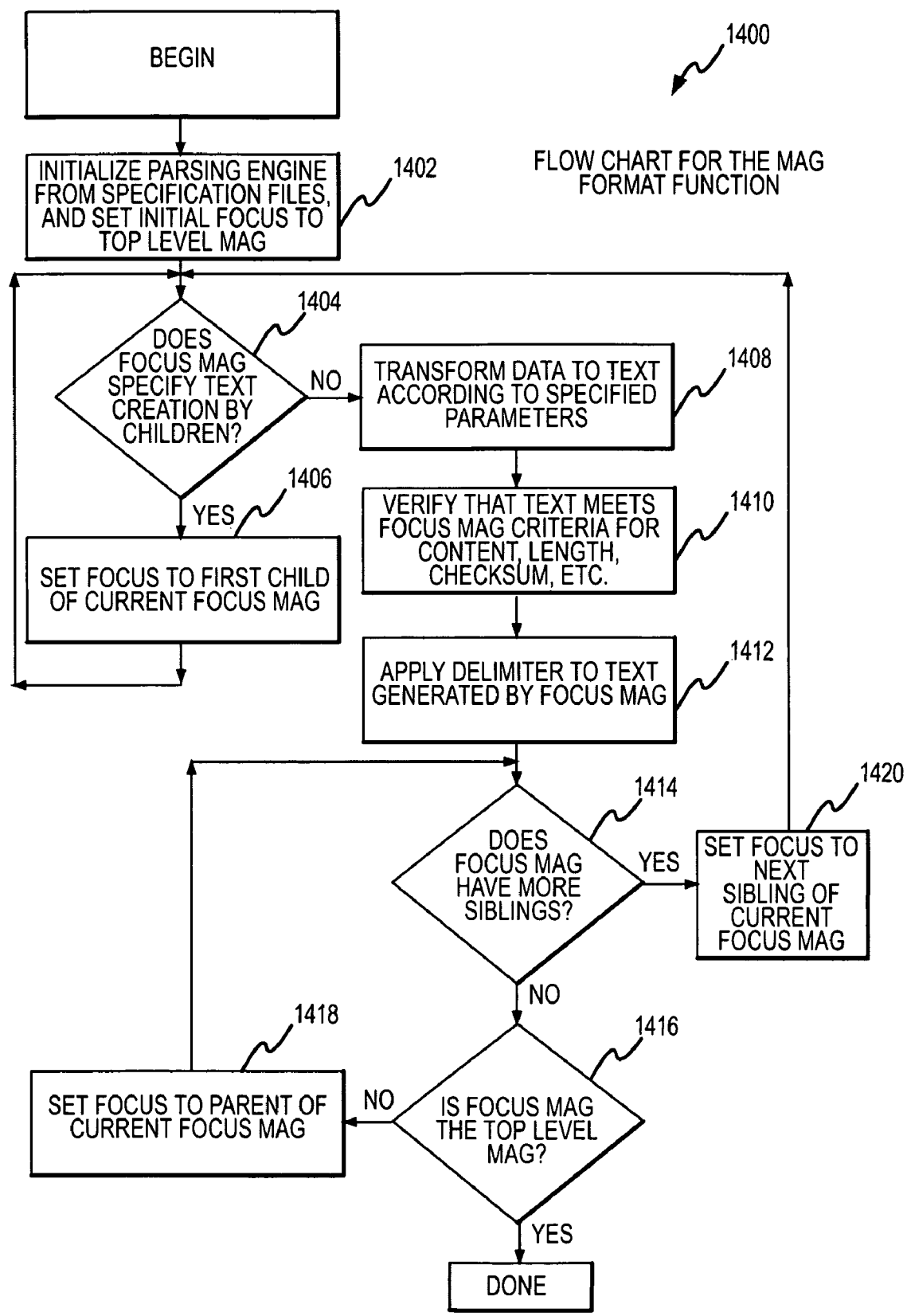
FIG. 14 is a flowchart of a Message Analysis and Generation "format function" in accordance with the present invention.

FIG. 14 shows a flow chart for the MAG format function 1400. The process begins by initializing (1402) the parsing engine from the specification files and setting the initial focus of the engine to the top level MAG. Similar to the process described above, this involves identifying a format of an external addressee system and accessing the corresponding specification table to configure the parsing engine. In order to transform a message from an internal application-specific representation (e.g., in a data format) to an external addressee format, it is necessary to parse the message to the parsing resolution required for transformation to the target format. Thus, the MAG module next determines (1404) whether the focus MAG specifies text creation by children of the current focus MAG. If so, then the focus is set (1406) to the first child of the current focus MAG. The loop defined by blocks 1404 and 1406 is then iterated until the MAG module determines at block 1404 that the focus MAG does not specify text creation by children. At this point, the required processing resolution has been achieved with respect to the focus MAG. In this case, the MAG module transforms (1408) the content associated with the focus MAG from the internal representation (e.g., data) to the target format (e.g., text) according to the parameter specified by the focus MAG. The resulting text is then analyzed to verify (1410) that it meets focus MAG criteria for content, length, checksum, etc., and any appropriate delimiters are applied (1412) to the resulting text.

Next, the MAG module determines (1414) whether the focus MAG has any siblings. If so, the focus is set (1420) to the next sibling of the current focus MAG and the preceding parsing and transformation steps are repeated. If the focus MAG does not have siblings, the MAG module determines (1416) whether the focus MAG is the top level MAG. If not, the focus is set (1418) to the parent of the current focus MAG and the resulting loop is iterated to work back up through the parse tree and identify any MAG relationships that may have been missed working downward. When it is determined at block 1416 that the focus MAG is the top level MAG, then the process is complete.

In the context of the system 700 of FIG. 7, the MAG module 718 as described above is operative to interface the ADS module 716 with the various source systems and addressees. The operation of the ADS module 716 will now be described.

B. Automatic Data Sanitizer (ADS) Module

Figure 15:
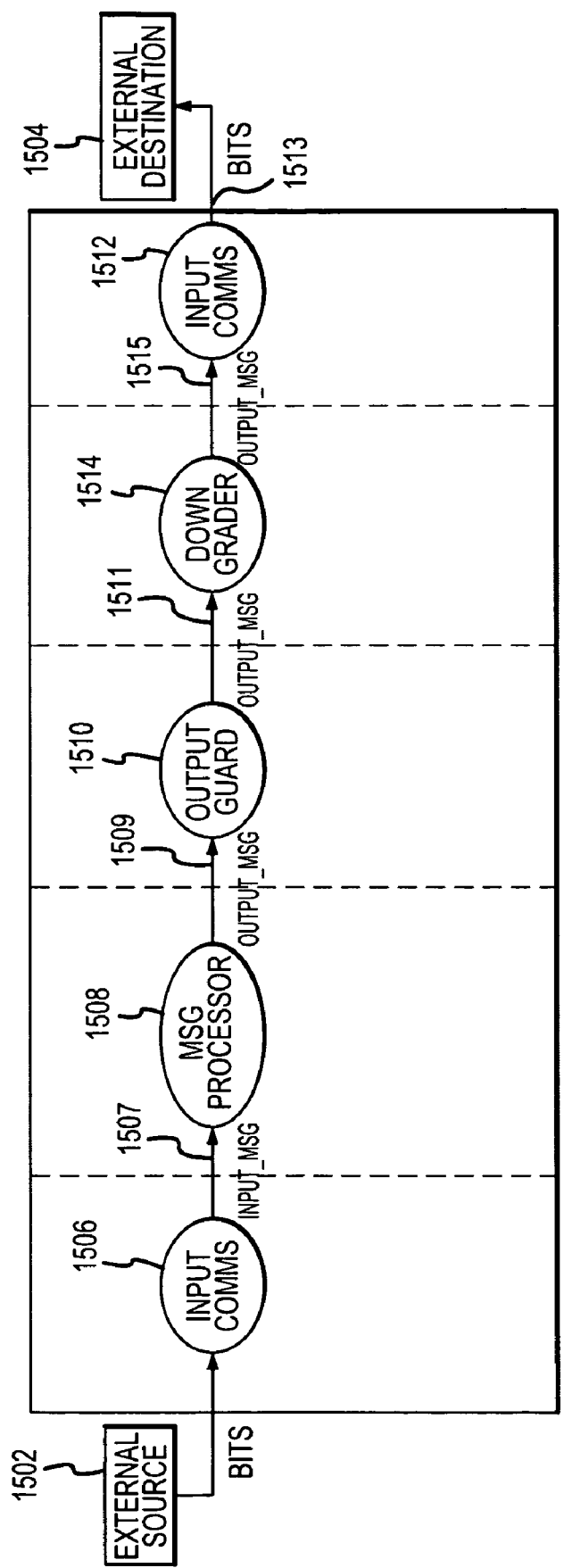
FIG. 15 is a schematic diagram of an Automatic Data Sanitizer module in accordance with the present invention.

FIG. 15 is a schematic diagram of the ADS module 1500. The module 1500 automatically modifies, or sanitizes, formatted data from an external source system 1502, according to sanitization rules, for release to an external destination system 1504 so that the destination system receives only that portion of the original data for which it is authorized access. The module 1500 generally includes an Input Comms Module 1506, a Message Processor 1508, an Output Guard 1510, and a Downgrader 1514 and Output Comms 1512. The Input Module 1506 supports the communications protocol dictated by the external source system 1502 and forms a complete message from the message segments provided to it by the external system 1502. The resulting complete input message 1507 is then provided to the Processor 1508 which sanitizes the message according to rules written for the specific external system 1504 under consideration. The sanitized message 1509 is then passed to the Guard 1510 which verifies that the modifications performed by the Processor 1508 are correct. The Guard 1510 then passes the verified message 1511 to the Downgrader 1514 that in turn passes an output message 1515 to the output directory of the Output Module 1512, which supports the communications protocol dictated by the external destination system 1504 so as to effect communication of an output message 1513 from the ADS module 1500.

Figure 16:
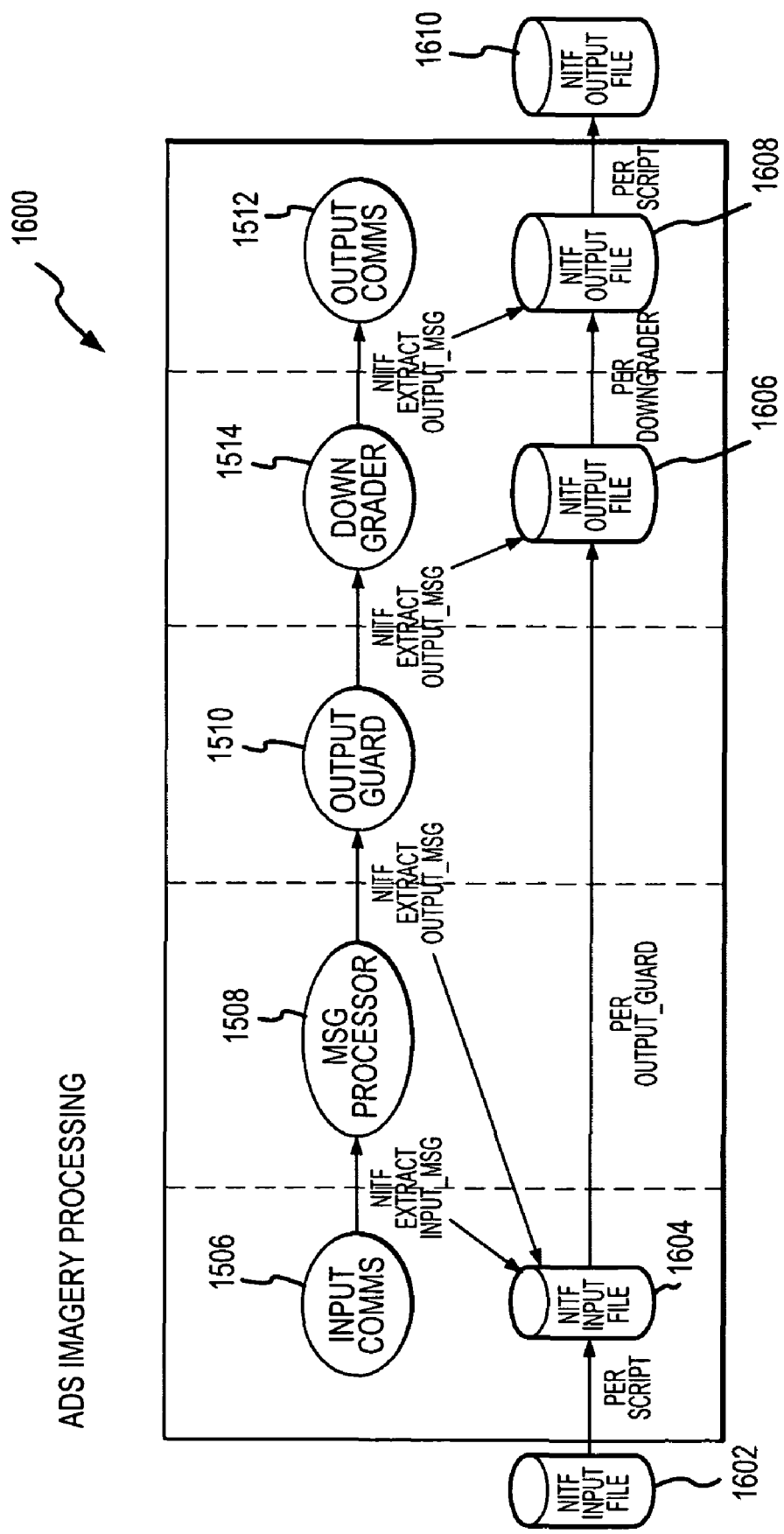
FIG. 16 is a schematic diagram of an alternative implementation of an Automatic Data Sanitizer module in accordance with the present invention.
Figure 17:
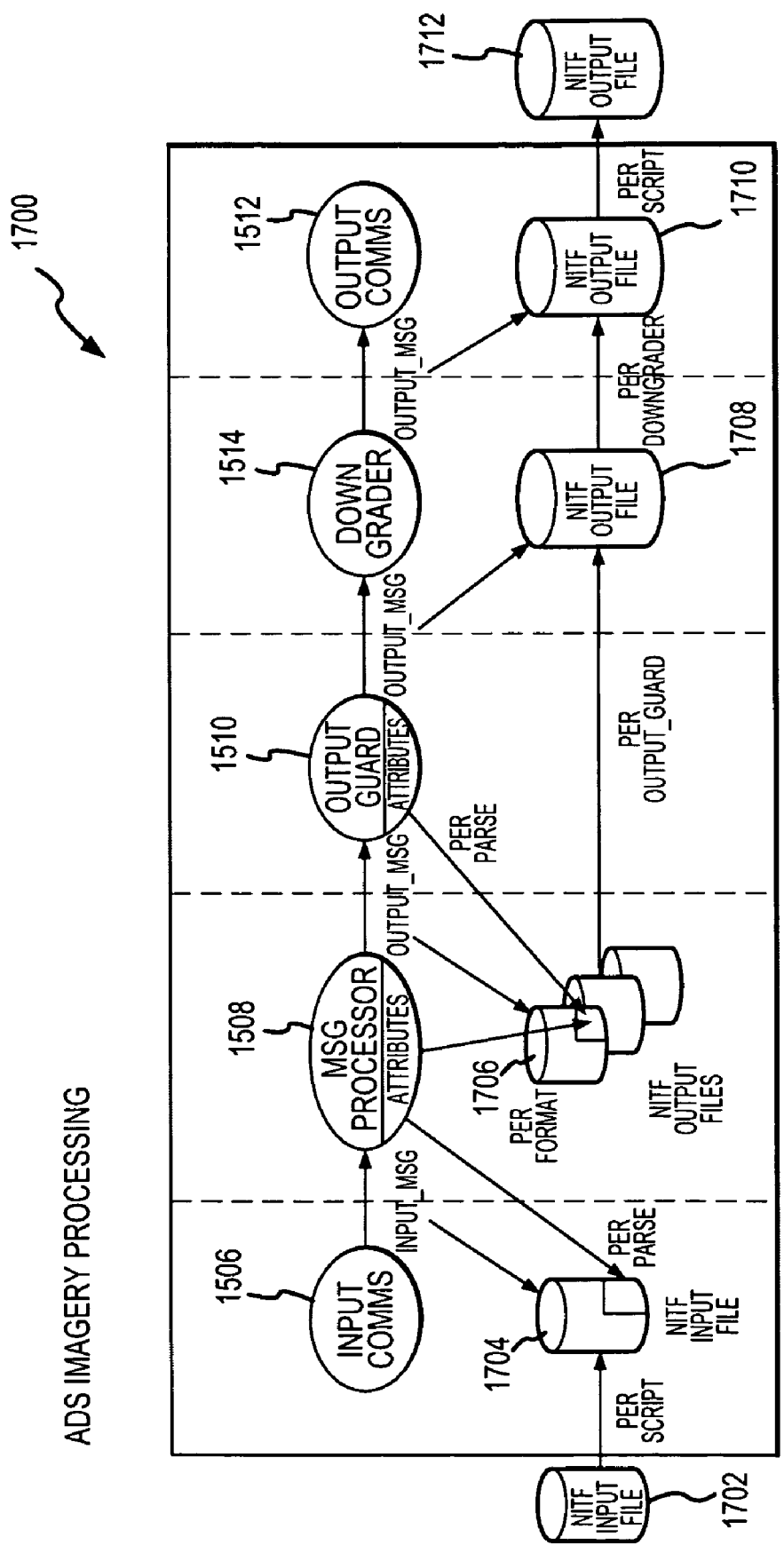
FIG. 17 is a schematic diagram of a further alternative implementation of an Automatic Data Sanitizer module in accordance with the present invention.

FIGS. 16 and 17 show certain modifications of the ADS module for handling messages including images. The components of the modules illustrated in FIGS. 16 and 17 that correspond to components of FIG. 15 are identified by the same numerals. In a variety of applications, including dissemination of tactical information, it is desirable to be able to sanitize and distribute messages including images. However, the processing of such image messages presents certain challenges. First, image messages include image elements that are not readily susceptible to analysis using conventional sanitization rules. In addition, when text and other data components are included together with images, there is a need to separate the intelligible data from the image components. Image messages also often constitute very large files, e.g., sometimes in excess of two gigabytes. Currently, many tactical systems do not have this much RAM. Accordingly, the module structures of FIGS. 16 and 17 include certain modifications to address the needs of handling image messages.

Referring first to FIG. 16, the sanitization module 1600 is illustrated in an exemplary application for processing an image message in one standard image messaging format; namely, NITF. A goal of the module 1600 is to process NITF messages as much as possible like simple textual messages. The principal modifications relate to file management. In this regard, the message text is kept in an external file. Thus, the input file 1602 is initially stored in an input file database directory 1604. Upon completion of processing by the Message Processor 1508 and Output Guard 1510 as discussed below, the file is transferred to the Downgrader working directory 1606. The message, as prepared for transmission by the Downgrader 1514, is finally stored in transmission output file directory 1608 from which the output message file 1610 is made available to addressee systems. It will thus be observed that the large message file including its inscrutable image components is never loaded into running memory. Rather, the message is separated into its inscrutable image components and its intelligible data components and the processing capabilities of the Processor 1508, Guard 1510 and Downgrader 1514 are allowed to operate only on the intelligible data components that are generally of a manageable size. Accordingly, an initial parsing or processing rule is added to the various parsing and processing rules used for handling data. This initial rule identifies and deletes from the working files to be processed by the Processor 1508, Guard 1510 and Downgrader 1514 certain inscrutable components. For example, such components may be identified based on size. In this regard, an attribute size threshold may be established that is sufficiently large to allow for processing of all text and other data, but sufficiently small to avoid loading image data into running memory. Such a rule is easily executed and the data components that remain for processing can then be processed using sanitization rules as discussed above.

More specifically, with regard to the input file 1602, a script can be used to access the NITF file from an external upstream system and write the NITF file into the Input Comms working directory 1604. The Input Comms 1506 is then operative to implement the initial rule as noted above for separating intelligible data from image components. The Input Comms 1506 also verifies message length and other components and passes the extracted input message to the Message Processor 1508. The Message Processor 1508 parses the extracted input message, applies the sanitization rules to the parsed extracted input message and generates an extracted output message that is passed to the Output Guard 1510. The Output Guard 1510 then verifies the extracted output message against release constraints, moves the NITF file to the Downgrader working directory 1606 and passes the extracted output message to the Downgrader 1514. The Downgrader 1514 moves the NITF file to the Output Comms working directory and passes the NITF extracted output message to the Output Comms 1512. Finally, the Output Comms 1512 invokes an output script to move the NITF file to an area where it can be accessed by an external addressee system.

FIG. 17 shows an ADS module 1700 with further modifications for image message handling. In this case, again, a script is used to access an NITF file 1702 from an external source system and write the file into the Input Comms working directory 1704. The Input Comms 1506, again, is operative to verify the message length and other parameters. However, in this case, the Input Comms does not attempt to parse the input message so as to extract intelligible data. Rather, the Message Processor 1508 parses the NITF file into intelligible elements (character and numeric attributes) and nonintelligible elements (file attributes, pointing to segments of original NITF file). The Message Processor 1508 then applies the sanitization rules to the parsed NITF file including attributes of all types and generates an output message pointing to an entirely new NITF file 1706 using the attributes. Finally, the Message Processor 1508 passes the output message to the Output Guard. The Output Guard 1510, in this case, also parses the NITF file into intelligible elements and nonintelligible elements and verifies the parsed NITF file 1706 per release constraints and moves the NITF file 1706 to the Downgrader working directory 1708. The Downgrader 1514 moves the NITF file 1706 to the Output Comms working directory 1710 and passes the output message pointing to the NITF file to the Output Comms 1512. Finally, the Output Comms 1512 invokes a script to move the NITF file to an area 1712 accessible by an external addressee system.

Figure 18:
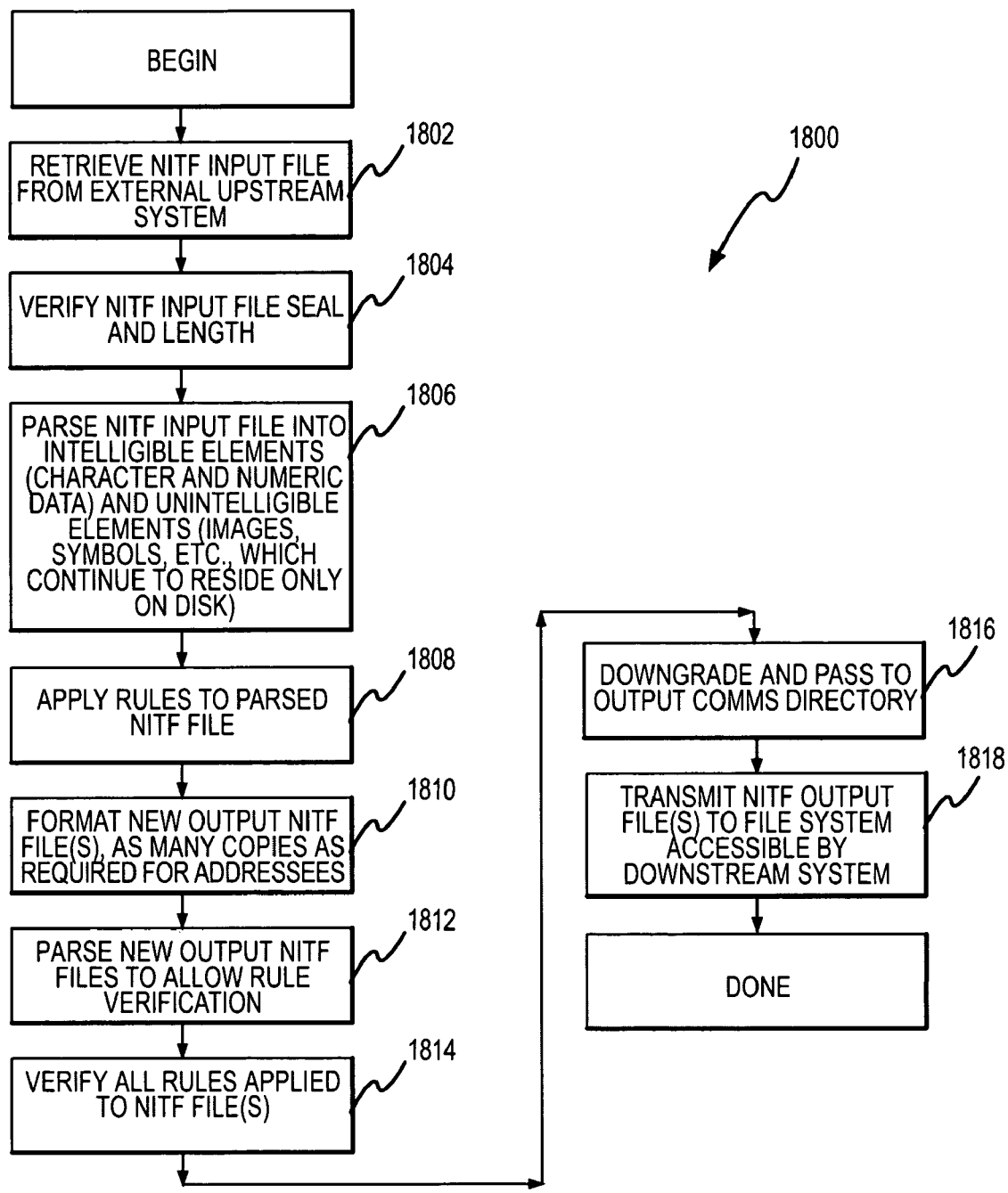
FIG. 18 illustrates the sanitization guidance system in accordance with the present invention.

FIG. 18 is a flowchart illustrating the sanitization module processing 1800 for handling image messages in accordance with the structure of FIG. 17. The process is initiated by receiving (1802) an NITF input file from an external upstream (source) system. Next, the NITF input file's seal and length are verified (1804) and the input file is parsed (1806) into intelligible elements and unintelligible elements. In this regard, the intelligible elements can be moved into running memory while the unintelligible elements including images, symbols, and the like continue to reside only on disk. The module then applies (1808) the appropriate rule to the parsed NITF file and formats (1810) a new NITF file or files including as many copies as required for the addressees. The new output NITF files are then parsed (1812) to allow rule verification and all rules applied to NITF files are verified (1814). The NITF output files are downgraded and passed to the Output Comms directory. Finally, the NITF output files are transmitted (1818) to a file system that is accessible by a downstream (addressee) system.

Figure 19:
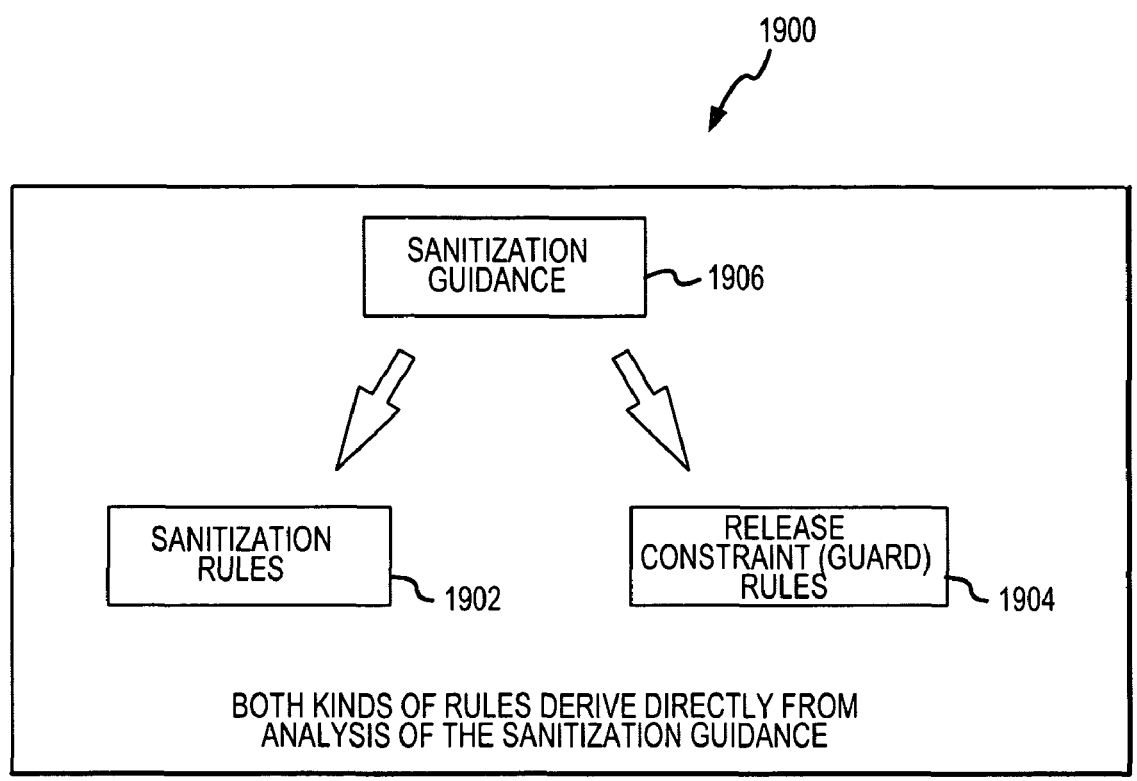
FIG. 19 is a flowchart of an image message process in accordance with the present invention.

The foregoing discussion has made reference to two important categories of rules. These rules are illustrated in FIG. 19. The rules 1900 include sanitization rules 1902 and release constraint rules 1904. Together these rules are controlled by sanitization guidance 1906. Each of these types of rules will be discussed in turn below.

When the message processor component of the ADS module obtains a parsed message, the message is generally processed using sanitization tasks common to all messages entering the system over a specific communications network or from a particular source. In this process, the message processor can screen the incoming data either to reduce data throughput to only messages of interest (e.g., data germane to a current area of interest), or perform a change to the data which is pertinent to all addees who will receive this message (e.g., correct the spelling of a particular field value).

The processor can then perform sanitization for specific "addees". An addee refers to an addressee or a group of addressees on a channel which has the same sanitization requirements for messages processed by the ADS module. For example, all Tomahawk ships on the same channel may be grouped under one addee name because each is only authorized to receive secret GENSER level messages. The message processor can then copy the message for each addee. A set of unique sanitization tasks, designed for each particular addee, is used to remove or replace data to satisfy security guidance required to downgrade or process the information for the particular addee. These sanitization tasks, as shown in FIG. 19, are derived directly from security guidance designed for the specific site of employment and the local security concept of operations. This guidance directs how messages processed by that site are to be sanitized for release at specific sensitivity levels.

The entire input message may be screened against a "dirty word" search task containing one or more definable tables of words or phrases or other strings that constitute a security risk. The dirty words may include code words or other classified names and/or locally prescribed dirty words that must be removed in order to properly sanitize the message.

Generally, one or more "rule" sanitization tasks have been developed by the operator to execute specific actions on fields in the message. Rules can add, replace, delete, round, adjust, copy, store or retrieve an attribute value. They can also send a message to the operator for review or delete free text in the message.

These sanitization tasks may be developed locally or imported from another system. The sequence or flow of sanitization tasks is defined by the operator and is generally under two person control, i.e., one person initiates an action and a second person approves the action. Once activated, the sanitization module handles the received messages automatically according to the plan designed by the operator.

The sanitization rules manipulate the parsed data based on a condition statement paired with an action statement, commonly called an if/then statement. If a certain condition exists in a message then the system performs a certain action. Each of these if/then statements is called a rule. Various examples of rules, as well as user interfaces for selecting, defining and implementing them, are set forth in the U.S. Provisional Patent Application Ser. No. 60/215,114. Some such types of rules include the following.

TABLE 1

| CONDITION | RULE BASED SANITIZATION ACTION |
|---|---|
| Operator defined criteria to delete a contact | Delete contact being processed |
| Operator defined criteria to delete a specific attribute | Delete specified attribute |
| Free (unformatted) text in message | Delete free text in message being processed |
| Operator defined value requiring numeric rounding | Round the value of the attribute as specified |
| Operator designates attribute whose value is to be replaced and designated attribute exists in the message | Replace the value of the attribute with the supplied value |
| Operator designates attribute whose value is to be replaced but designated attribute does not exist in the message | Add a new attribute containing the supplied value |
| Operator defined condition when met requires additional actions to be performed | Apply the additional rules to the contact meeting the conditions |
| Operator designates attribute whose value is to be copied to another attribute | Copy the value of the attribute to value of the designated attribute |
| Operator designates attribute whose value is to be adjusted | Adjust the value of the attribute as specified |
| Operator designates attribute whose value is to be incremented based on a previously applied value | Increment the value of the designated attribute |
| Operator designates an attribute whose value is to be stored | Store the value of a designated attribute based on a key attribute which uniquely identifies the stored attribute |
| Operator designates key attribute which identifies the stored attribute list from which the attribute value is to be retrieved | Retrieve the value of a designated attribute based on a key attribute which uniquely identifies the stored attribute list from which the attribute is to be retrieved |

Figure 20:
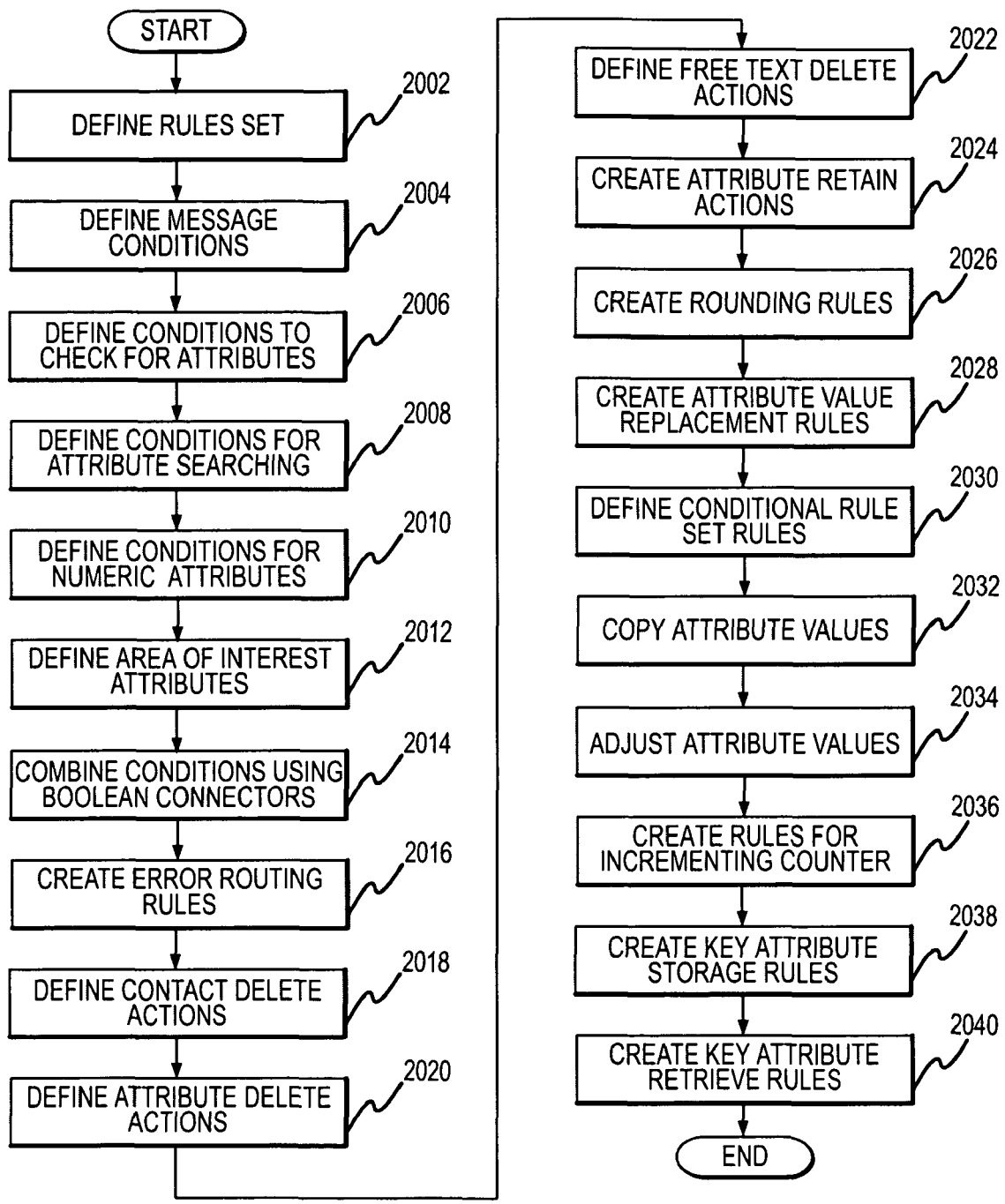
FIG. 20 is a flowchart illustrating a process for development of rules for rule-based sanitization.

FIG. 20 is a flowchart showing the steps an operator may perform in the development of rules based sanitation. The associated steps are listed below:

1. Define (2002) a set of rules used to sanitize messages and their component contacts.
2. Define (2004) conditions on message-level attributes and attributes of contacts contained in the message.
3. Define (2008) conditions checking for the existence of attributes.

4. Define (2008) conditions for text or character attributes searching for the occurrence of a given string, which may include wildcards (symbols that represent any characters)
5. Define (2010) conditions for numeric attributes as a comparison to a given value using the relational operators (equal, less than, greater than) or their negations
6. Define (2012) conditions in which contact positions are within a specified Area of Interest (predefined geographic area, e.g., in terms of coordinates).
7. Combine (2014) conditions in a set using Boolean logical connectors.
8. Create (2016) rule actions to route messages being processed to the Error Queue.
9 Define (2018) contact deletion actions.
10. Define (2020) attribute deletion actions, specifying the attribute to delete.
11. Define (2022) actions to delete all attributes containing free text.
12. Create (2024) rule actions that designate attributes to be retained, deleting all attributes not listed.
13. Create (2026) rule actions that specify the precision to which a specified numeric attribute (integer, floating point number, position, or time) is to be rounded.
14. Create (2028) rule actions that replace attribute values with supplied values.
15. Define (2030) rule actions that provide an additional set of rules to be conditionally performed.
16. Copy (2032) one attribute value to that of another attribute.
17. Adjust (2034) an attribute value by a supplied amount.
18. Create (2036) rule actions which increment the value of an attribute by a specified amount based on a previously defined message counter definition.
19. Create (2038) rule actions which store the value of an attribute based on the presence of an associated key attribute.
20. Create (2040) rule actions that retrieve a stored attribute value based on the presence of an associated key attribute.

In addition to rules based sanitization, the ADS module determines the classification level of the received message by reading the sensitivity labels in the message. The input and output communications channels parameters are defined by the operator according to local site security requirements, e.g., from top secret/sensitive compartmented information (TS/SCI) to top secret/NATO releaseable (TS/NATO), or from TS/SCI to secret (S). Using these definitions, the ADS module initiates internal checks and verification processes to insure data is guarded against release to unauthorized channels and addressees. Once sanitized, the message is reformatted.

The ADS module as discussed above also contains a separate Guard. The Guard contains rules, called Release Constraint Rules (RCRs). The RCRs are defined by the operator under two person control and, again, as depicted in FIG. 19, in accordance with the same sanitization guidance which governed the development of the sanitization rules. RCRs are designed to verify that each message has been properly sanitized by the sanitization rules. The Guard also verifies that correct classification markings are present and that the message header and body format are correct. It verifies that the correct constraints on message release are in place and that the message is at the right classification level to be released to the channel and addees prior to passing the message to the output channel for transmission.

The foregoing description has included a discussion of the various MAG and ADS components and processes. Further details in this regard, as well as user guide level instructions for operation of a specific product implementation is provided in U.S. Provisional Application Ser. No. 60/215,114.

III. Radiant Collaboration

As discussed above, the sanitizer/guard subsystem operates in conjunction with a collaboration subsystem in the Radiant Trust System. Referring generally to FIGS. 21-29, a computer implemented collaboration subsystem 2101 of the present invention incorporates a component-based infrastructure providing an architectural foundation for developing/incorporating advanced capabilities into new or legacy systems. The infrastructure incorporates a data centric approach where domain information is extended with control and visualization attributes and presented as self-describing objects. Data access is provided through industry standard interfaces, adding to the ease of integration with legacy and commercial applications. The collaboration system builds on a data centric philosophy to provide key foundation frameworks for data access, collaboration, and component integration.

The collaboration subsystem infrastructure is designed to integrate with existing collaborative products such as, for example, Net Meeting, Sun Forum, CVW, InfoWorkspace and Placeware, and to make available additional collaborative capabilities not provided by existing tools. Specifically, the collaboration system infrastructure provides access to multiple domain data sources and allows data from those sources to be analyzed and manipulated within a multi-user distributed environment where all visualization, processing, and agent applications work collaboratively.

The collaboration subsystem is a fully distributed architecture allowing each service to be configured and executed anywhere within the network. It is built upon an architectural framework including CORBA and Java. The infrastructure is platform independent with demonstrated operation under heterogeneous operating environments consisting of Microsoft® Windows 9x, Windows NT, Windows 2000, and Unix (e.g., Solaris 2.x). The collaboration subsystem is based on established and emerging government and commercial open standards including the Geospatial Information Access Specification (GIAS), OpenGIS, and Document Object Model (DOM). All interfaces to the collaboration subsystem infrastructure are provided through standard Interface Definition Language (IDL), ensuring adaptability to legacy systems written in Java, C, C++, Ada, or any other language with IDL bindings.

Still referring generally to FIGS. 21-29, the collaboration subsystem data access framework incorporates an adaptive repository layer that accesses the domain data through the access methods native to the data source. This enables data from any data source (real-time data feed, object data base, relational database, file system, etc.) to be accessed from the infrastructure. The repository approach is non-intrusive such that domain data sources do not need to be modified in any way. The repository acts as a gateway to the native data. The repository is responsible for describing the data and making the data available through industry standard interfaces. This alleviates the need for client applications to have any knowledge of data location or specific access logic unique to the data source.

Extensibility and flexibility are key attributes of the collaboration system infrastructure. Data is made available in a self-describing format such that client applications learn about the data and are able to manipulate the data without any a'priori knowledge of its intrinsic structure. Client viewers are subsequently able to manipulate data from a variety of different domain sources without requiring any specialized software. Therefore, adding a new data source or changing the structure of an existing data source requires no changes to the infrastructure or client applications. In addition, adding client applications that can provide extended capabilities, e.g., to manipulate data within any available data source.

Figure 21:
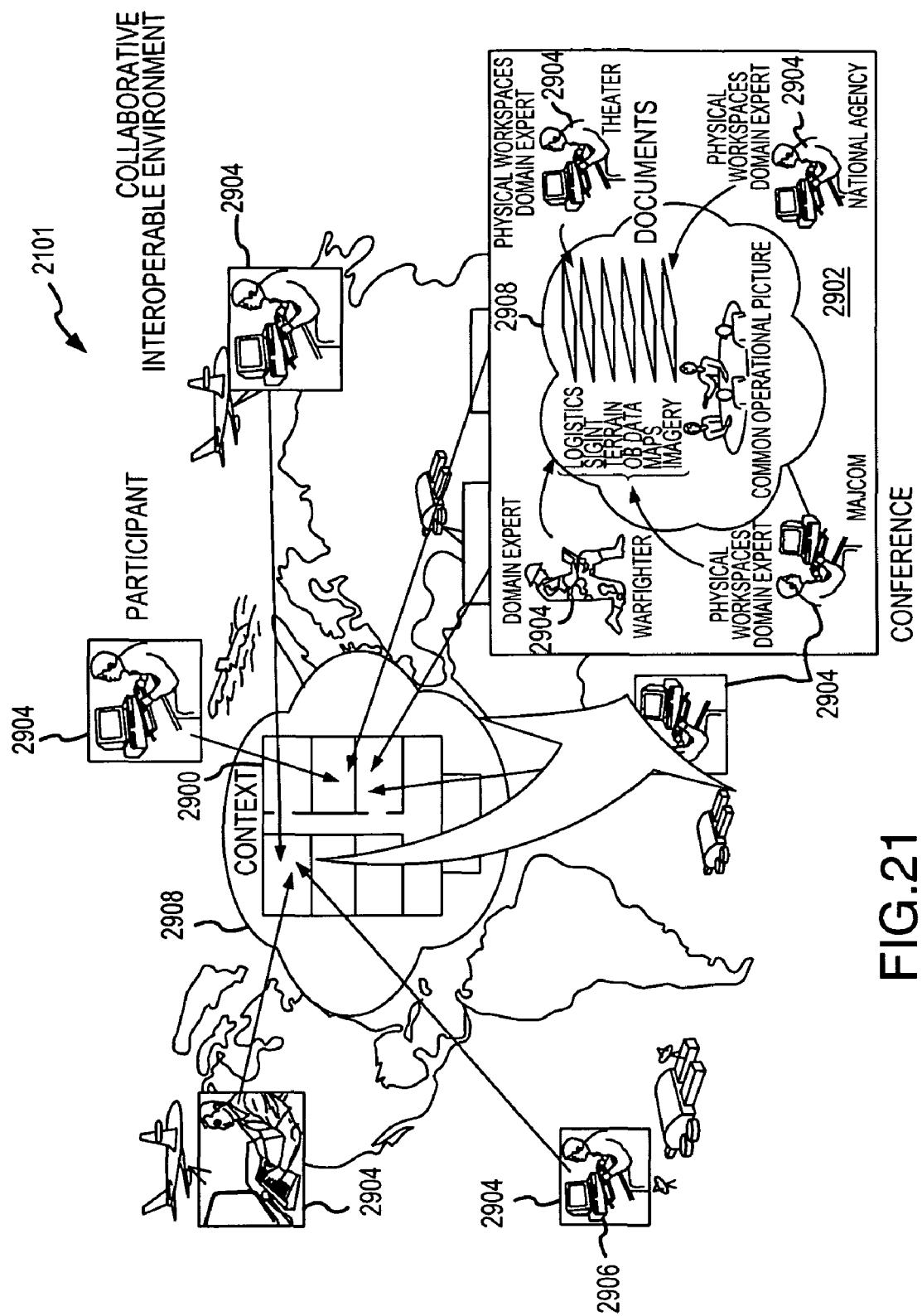
FIG. 21 is a flow chart of the collaborative environment.

Referring more specifically to FIG. 21, there is shown an overview of a collaborative interoperable context 2900 that is provided by the computer implemented collaboration subsystem 2101 of the present invention. Within the collaborative interoperable context 2900 one or more conferences 2902 are provided in which multiple participants 2904 are able to collaboratively access and manipulate data from one or more data sources at the same time to solve a problem. The participants 2904, who may be geographically remote from one another, access the conferences 2902 via user terminals 2906 connected to a data network 2908. The participants 2904 to a conference 2902 are able to access and manipulate the data through one or more documents 2910 that represent the data sources. For example, as is illustrated, within a conference 2902 of a context 2900 relating to an intelligence gathering and analysis operation there may be documents 2910 representing logistics data, signal intelligence data, terrain data, map data, image data and the like, together providing a common operational picture. It will be appreciated that although the illustrated context 2900 is of an intelligence related nature, the collaborative interoperable context 2900 may relate to many other non-military related matters.

The context 2900 provides a higher order organization for the conference 2902. A context 2900 may be a floor in a building, a region within a country or a conference room. Contexts 2900 may be entered by participants 2904 as a room would be entered and conferences 2902 can be established. Conferences 2902 provide the context 2900 to drop documents 2910 for collaboration. A document 2910 dropped within a conference 2902 will have an associated data channel that will maintain and make available the collection of information represented by the document 2910 as well as any extended visualization or control properties.

Figure 22:
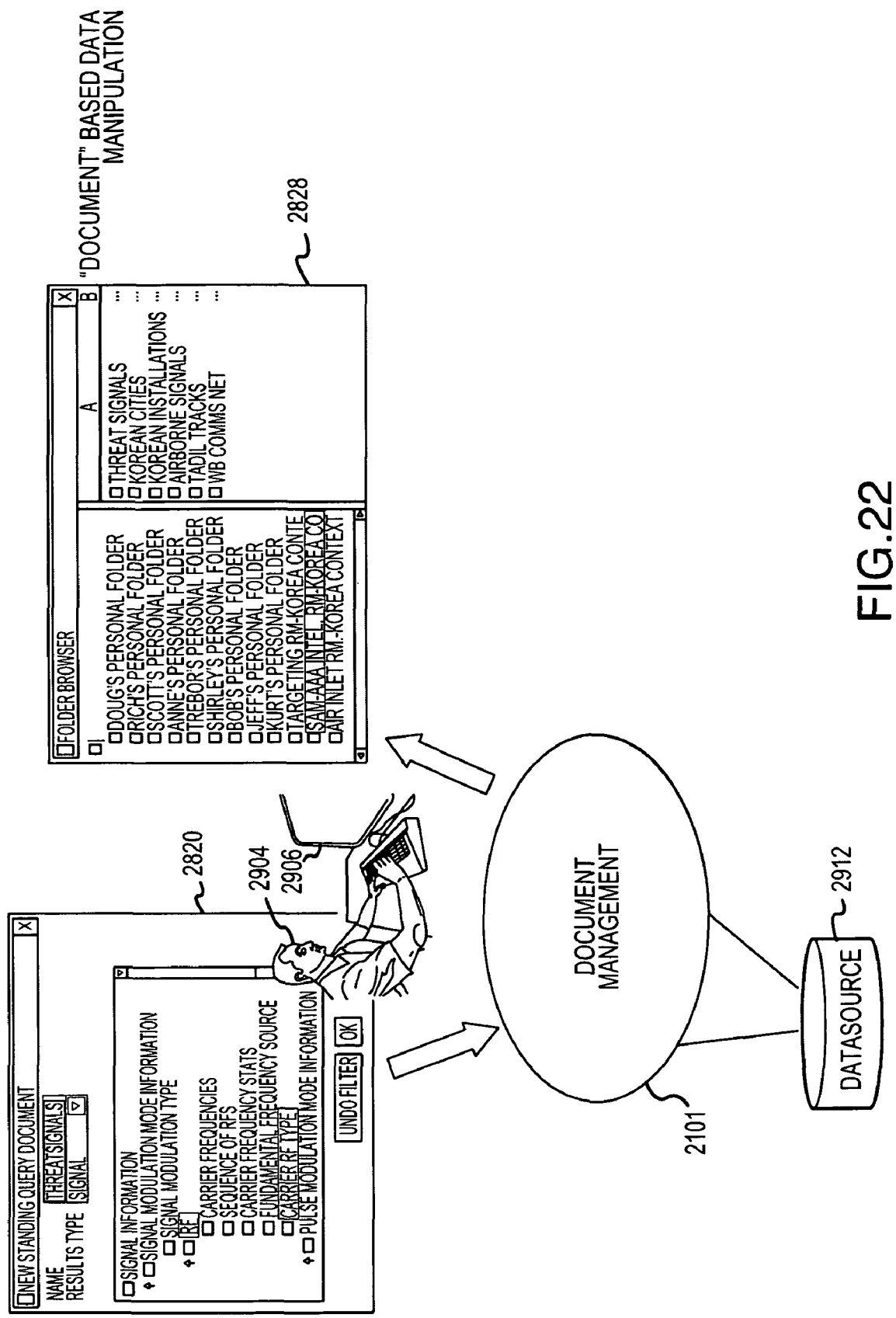
FIG. 22 is an overview of how clients participate with a document.
Figure 23:
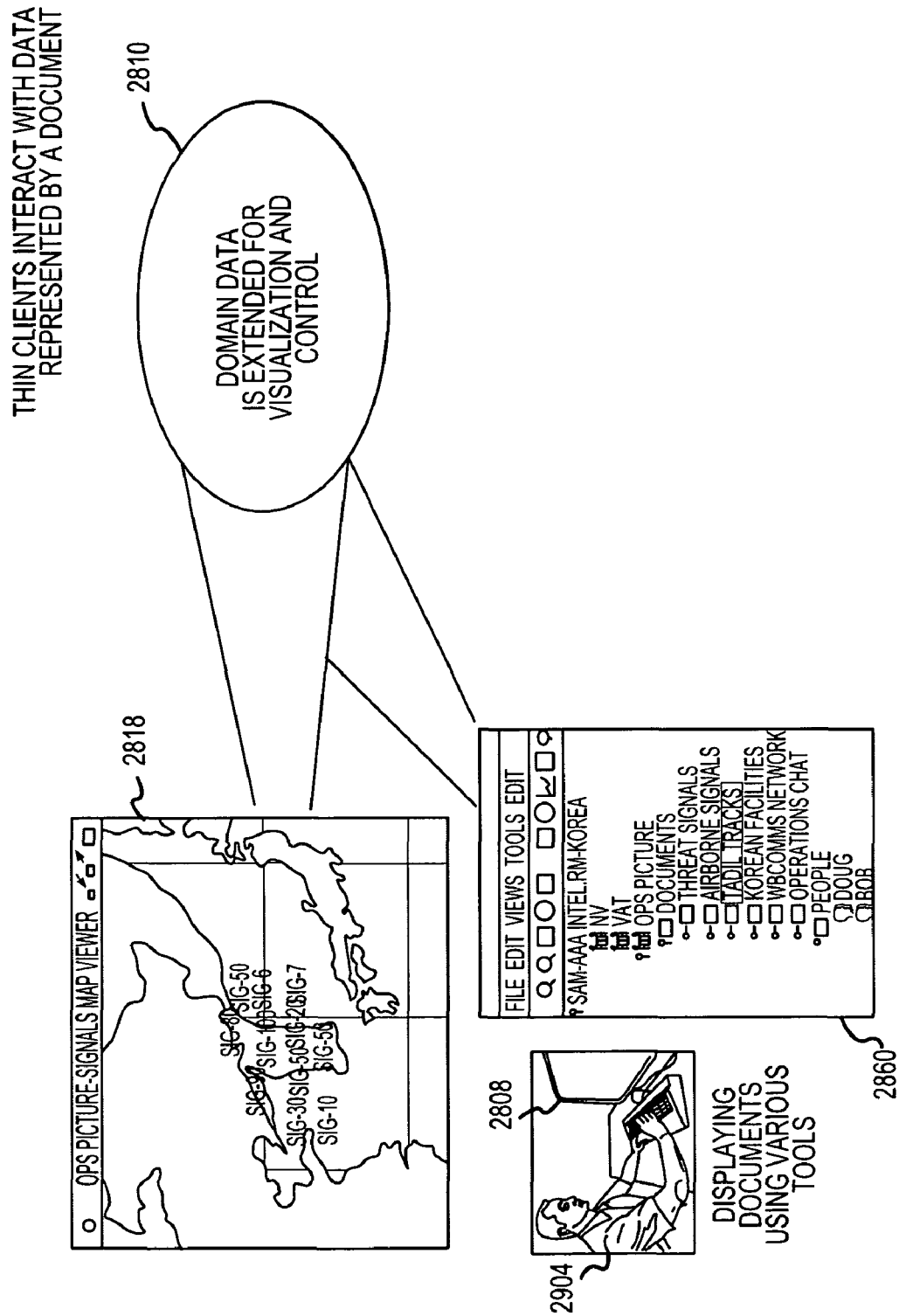
FIG. 23 is a flow chart illustrating how a client interacts with data on a document.

Referring now to FIGS. 21-23, each document 2910 represents data from a corresponding data source 2912. A document 2910 may be created by performing queries against the corresponding data source 2912 or it may be created as an empty document 2910 to be populated using interactive tools. In the former case, the query may be one of two types, standing or static. A standing query acts as an agent, constantly being evaluated to ensure that the collection of data represented by the document 2910 is up-to-date relative to the query specification. As changes are made to the corresponding data source 2912, the document 2910 is updated and those updates are propagated to any viewer that may be displaying the document 2910. A static query represents a snapshot of the data in the corresponding data source 2912 at the time that the query was invoked. The document 2910 representing the corresponding data source 2912 is not updated when the data source 2912 changes but may be manipulated by other software agents or individuals interacting with the document 2910 directly.

Once created, one or more documents 2910 may be placed into a conference 2902 by a participant 2904 (e.g., by dragging a document 2910 and dropping it into a conference 2902), then opened and acted upon by various client applications, such as display/processing tools (e.g., map viewers, list viewers, analytical packages, etc.). Within each conference 2902, the domain data (i.e., the data from the corresponding data sources 2912 represented in the documents 2910) is extended through the addition of visualization and control properties such as, for example, an associated color and/or symbol for displaying the data or an indication of what data has been selected by a participant 2904 using a client application. The visualization and control properties become part of the data represented in the documents 2910, allowing the client applications to focus on the presentation of the information rather than needing complex logic for accessing the data or logic dealing with collaboration between the participants 2904 to a conference 2902. Documents 2910 may be graphically overlaid or textually combined to show relationships between data from different data sources 2912 and to extract information that could not be extracted by viewing the data separately. Documents 2910 can be attached to tasks and may be passed from place-to-place or person-to-person following a process.

Figure 24:
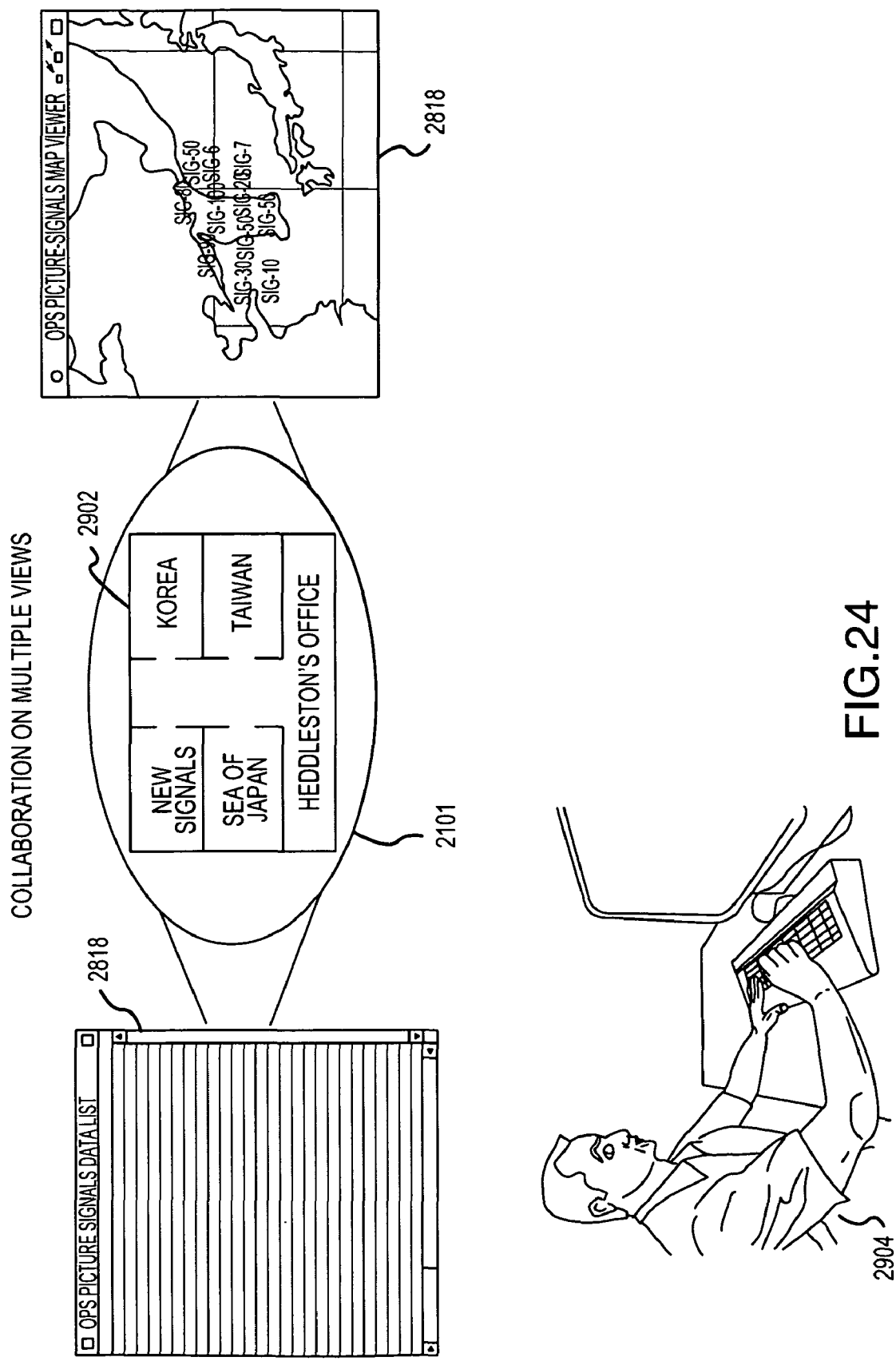
FIG. 24 illustrates the collaboration process on multiple views.

Referring now to FIG. 24, the computer implemented collaboration system 2101 of the present invention provides for single user collaboration. Single user collaboration is a concept used to describe a single user interacting with multiple visualization or data processing tools against one or more documents 2910 within the collaborative context 2900. By having all domain, control, and visualization properties available through the collaboration system 2901, collaborative tools work together to extract information from the data and cooperate for problem solving. It is important to note that, in accordance with the present invention, there is no direct communication between the tools.

Figure 25:
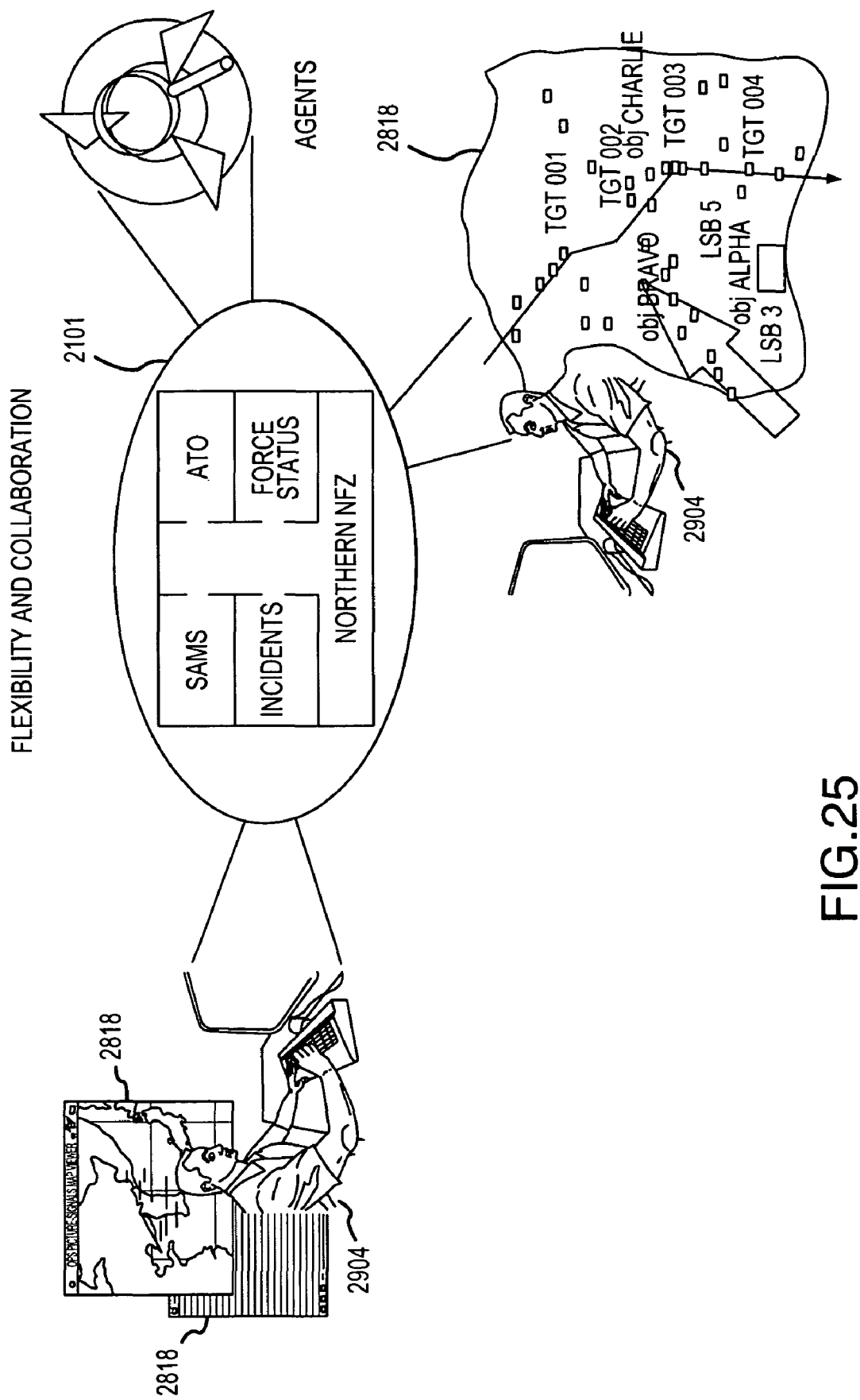
FIG. 25 is a flow chart illustrating flexibility and collaboration.
Figure 26:
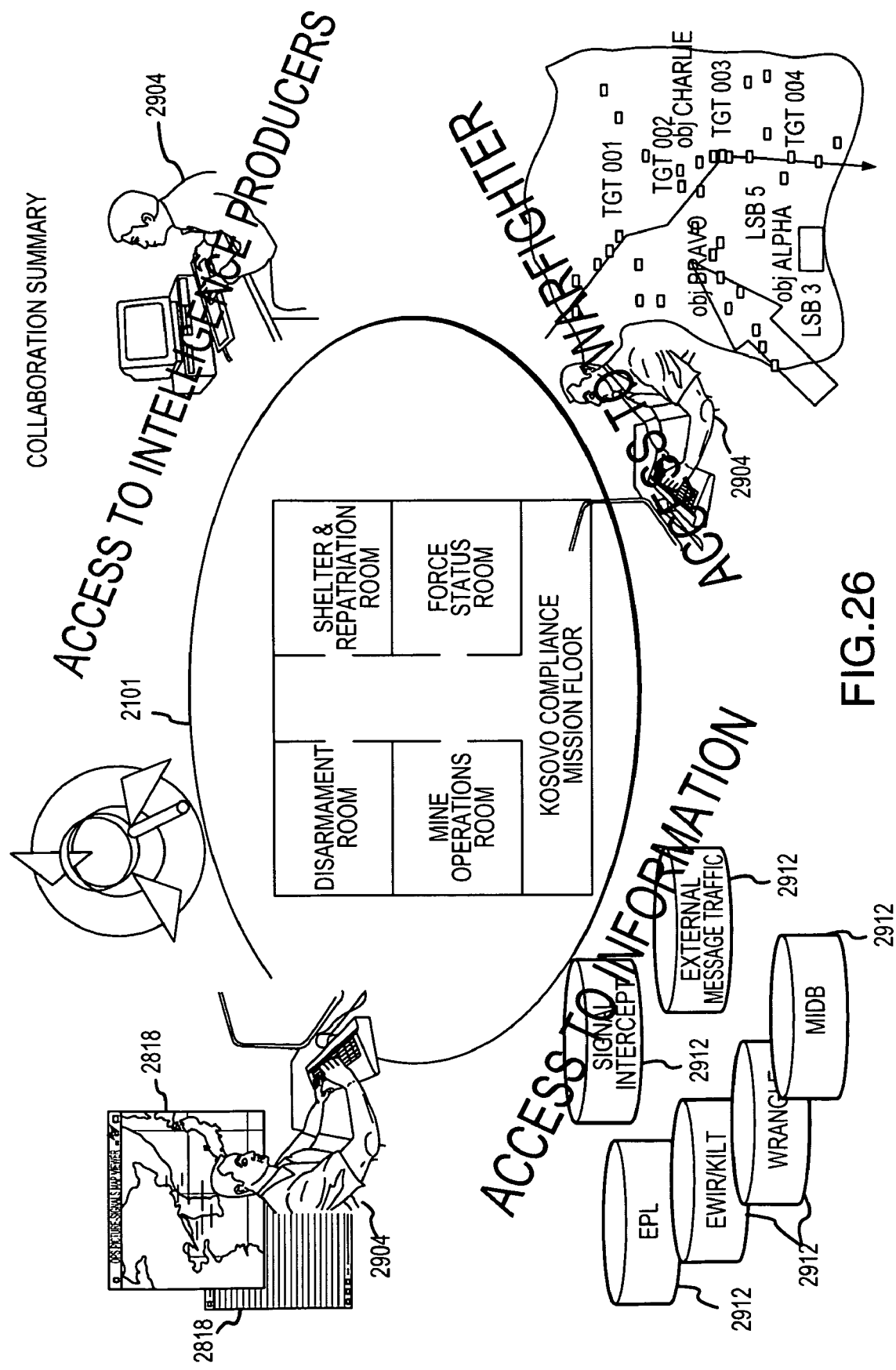
FIG. 26 is a pictorial summation of how a client accesses information.

Referring now to FIG. 25, the computer implemented collaboration system 2101 of the present invention also provides for multi-user collaboration. Multi-user collaboration is an extension of the single user collaboration environment to include multiple participants 2904. The collaborative framework of the collaboration system 2101 provides inherent multi-user collaboration in that no specialized logic is required for client applications to act collaboratively. Multiple users enter conferences to combine and apply various human knowledge, agent/application processing, and data resources to solve a problem. The computer implemented collaboration system 2101 of the present invention permits collaboration between multiple users without requiring that images be pasted onto a common "whiteboard" in order for the multiple users collaborate on the same data. Instead, collaboration is accomplished directly within the tools. Additionally, collaboration between multiple users is possible without requiring the incorporation of special logic within the tools. It will be appreciated that, in addition to human collaborators, there may be software agents involved in the collaborative process.

Figure 28:
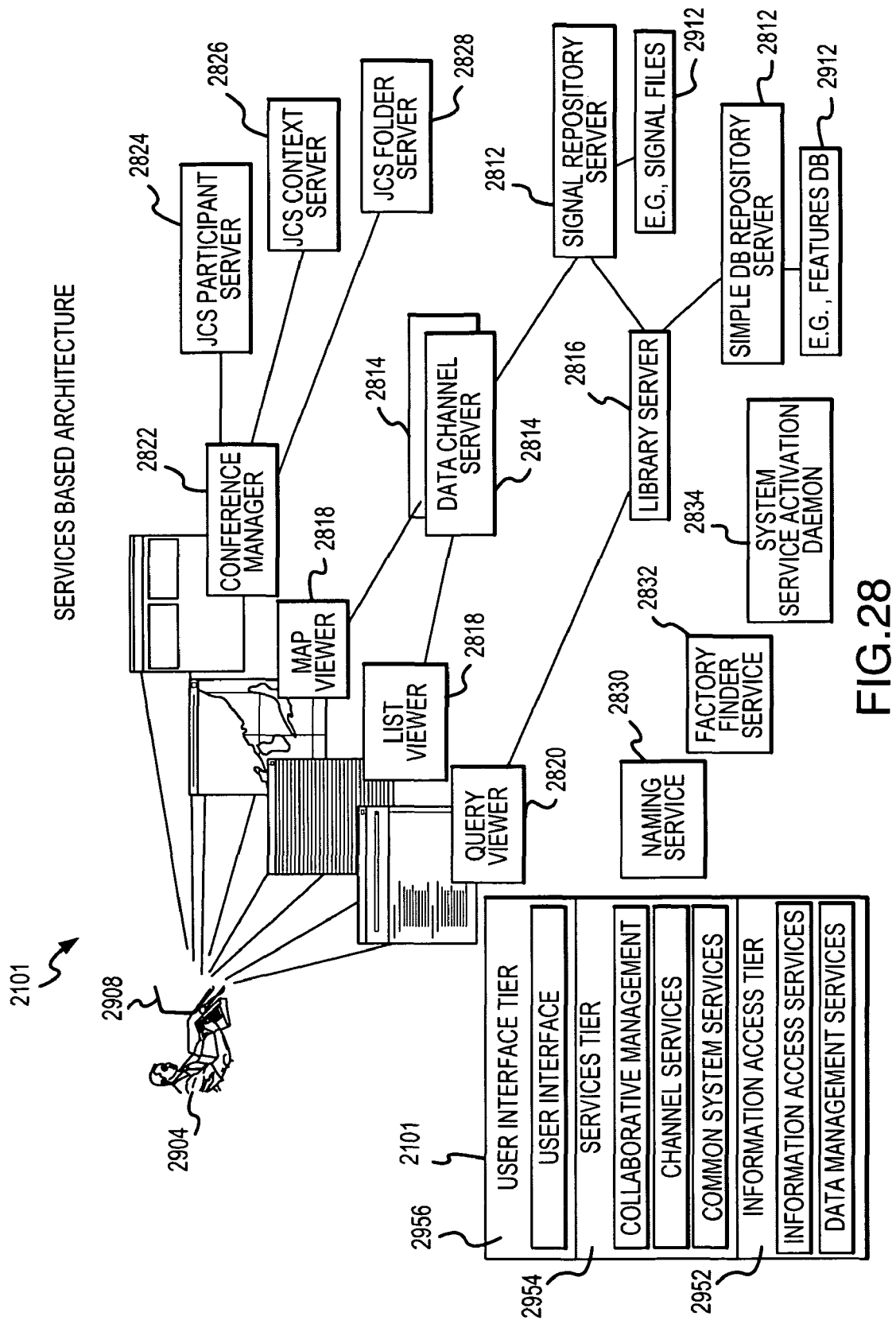
FIG. 28 is a flow chart of the services based architecture.

Referring now to FIG. 28, a block diagram of the components of one embodiment of a collaboration system 2101 in accordance with the present invention is shown. The collaboration system 2101 includes one or more repository servers 2812, one or more data channel servers 2814, a library server 2816, one or more client data viewing tools 2818 (e.g., a list viewer tool, a map viewer tool, or an X-Y viewer tool), a query viewer tool 2820, and a conference manager tool 2822. Each repository server 2812 is enabled for accessing data within a corresponding data source 2912, using data access methods native to its corresponding data source 2912. It will be appreciated that, since the repository servers 2812 provide access to the data sources 2912, the client data viewing tools 2818 do not need to be enabled for accessing the data within the data sources 2912, and therefore require no specific knowledge of the nature of the data within the data sources 2912. The data channel servers 2814 manage data centric channels within which extended data properties (e.g., visualization and control properties) are maintained. Maintaining the extended properties of the data within the data channel servers 2814, rather than within the client data viewing tools 2818, allows for single user and multiple user collaboration without requiring that the client data viewing tools 2818 be enabled for direct communication with one another or have any knowledge of each other.

The collaboration system may include additional management components supplied by the MITRE Corporation as part of the Joint Collaborative Services (JCS) Project, such as a JCS participant server 2824, a JCS context server 2826, and a JCS document server 2828. The participant server 2824 maintains a listing of all authorized participants 2904 as well as the processing state of the participants 2904 and the conferences 2902 that they have entered. The document server 2828 provides interfaces to manipulate documents 2910 within folders. Interfaces provide for creation and deletion of documents 2910 as well as folder management to allow organization of documents 2910 in a hierarchical storage structure. The context server 2826 provides the interfaces to manage collaboration contexts 2900 and conferences 2902 within those contexts 2900. The collaboration system 2101 may also include such standard CORBA services as a naming service 2830, a factory finder service 2832 and a system service activation daemon 2834.

Figure 29:
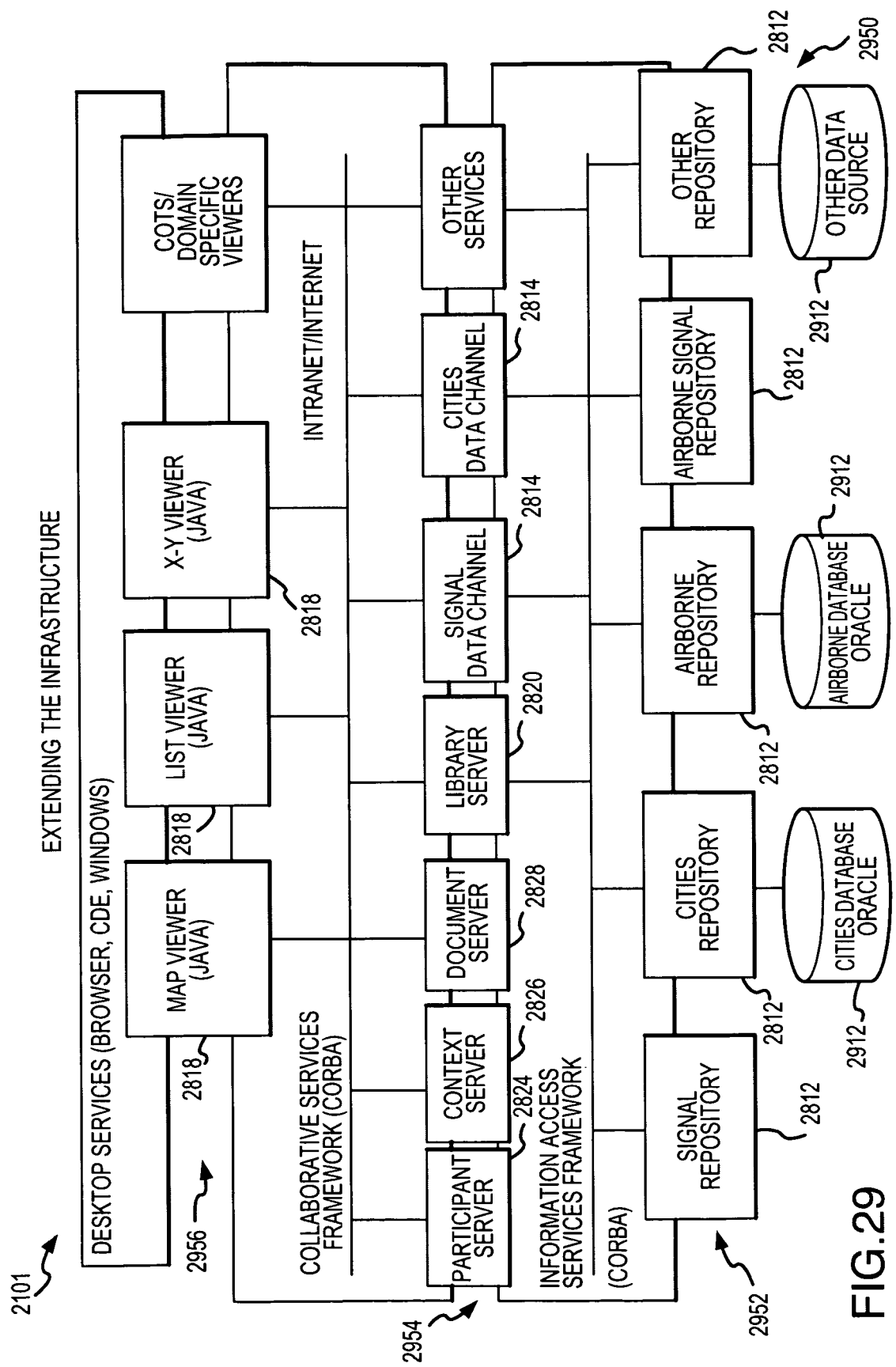
FIG. 29 is a flow chart of the system to extend the infrastructure.

Referring to FIG. 29, the components of the collaboration system 2101 are organized into an N-tier infrastructure including a data management tier 2950, an information access tier 2952, a services tier 2954, and a user interface tier 2956. Each tier is made up of components accessed and manipulated through a defined interface. The infrastructure of the collaboration system 2101 rides upon a CORBA communications framework. The data management tier 2950 includes and the data sources 2912 (e.g., a cities database, an airborne database). The data management tier 2950 provides the data management capabilities normally supplied by database management systems.

The repository tier 2952 is comprised of the repository servers 2812 (e.g., a signal repository, a cities repository, an airborne repository, an airborne signal repository). The repository tier 2952 provides the adaptive services to make the data maintained within the data sources 2912 available to the services in the services tier 2954 and the client tools in the user interface tier 2956. Each repository server 2812 in the repository tier 2952 interacts with its associated data source 2912 using the data source's 2912 native access methods. This allows virtually any data source 2912 to be integrated with the infrastructure without requiring modifications to the rest of the infrastructure services or client tools. The repository servers 2812 in the repository tier 2952 perform two functions. They act as proxies to execute service requests using their associated data source's 2912 native access methods, and they provide requested data to the infrastructure in self-describing structures.

Requests are made to the repository servers 2812 in two ways: standing queries and static queries. Upon initialization, each repository server 2812 interrogates its associated data source 2912 to extract the structure of the data maintained within it. This definition is described as a feature type. Each repository server 2812 then registers with the library server 2816, providing the supported feature type and the type of queries that the repository can perform (blank, standing, static). When a query is executed, the result of the query is transformed in to a self-describing data structure made accessible through a component called a "feature collection."

Figure 54:
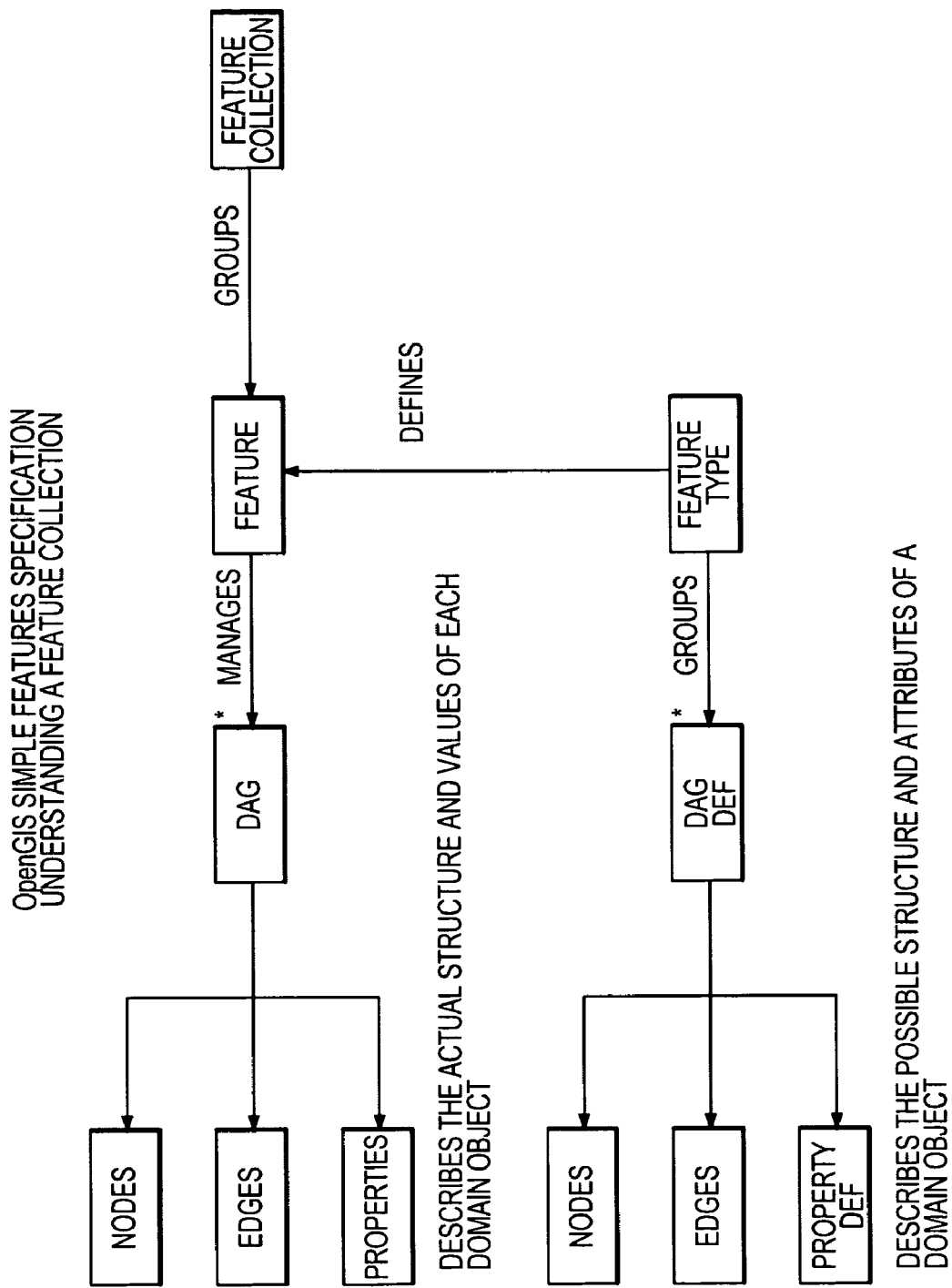
FIG. 54 illustrates the components that make up a "feature collection"

The repository servers 2812 are responsible for accepting requests for information, executing those requests and then managing the resulting collection of information. The collection of information resulting from a query, called a "feature collection," is made available in a self-describing format. The information and the access methods to manipulate the collection are modeled after the "Simple Features Specification" developed by the Open GIS Consortium. FIG. 54 illustrates the components that make up a "feature collection".

Figure 55:
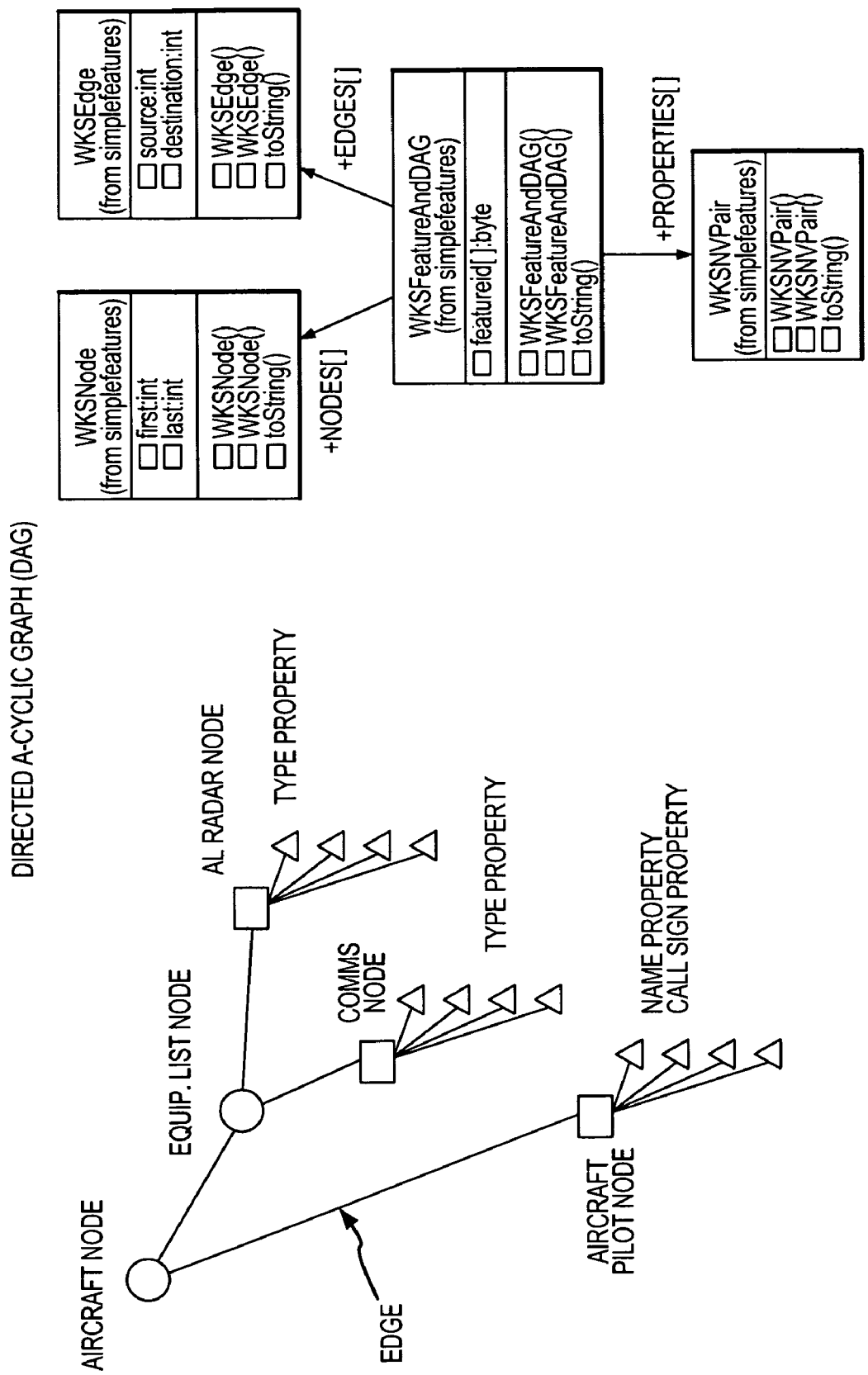
FIGS. 55-56 illustrate the directed a-cyclic graph data structure format.
Figure 56:
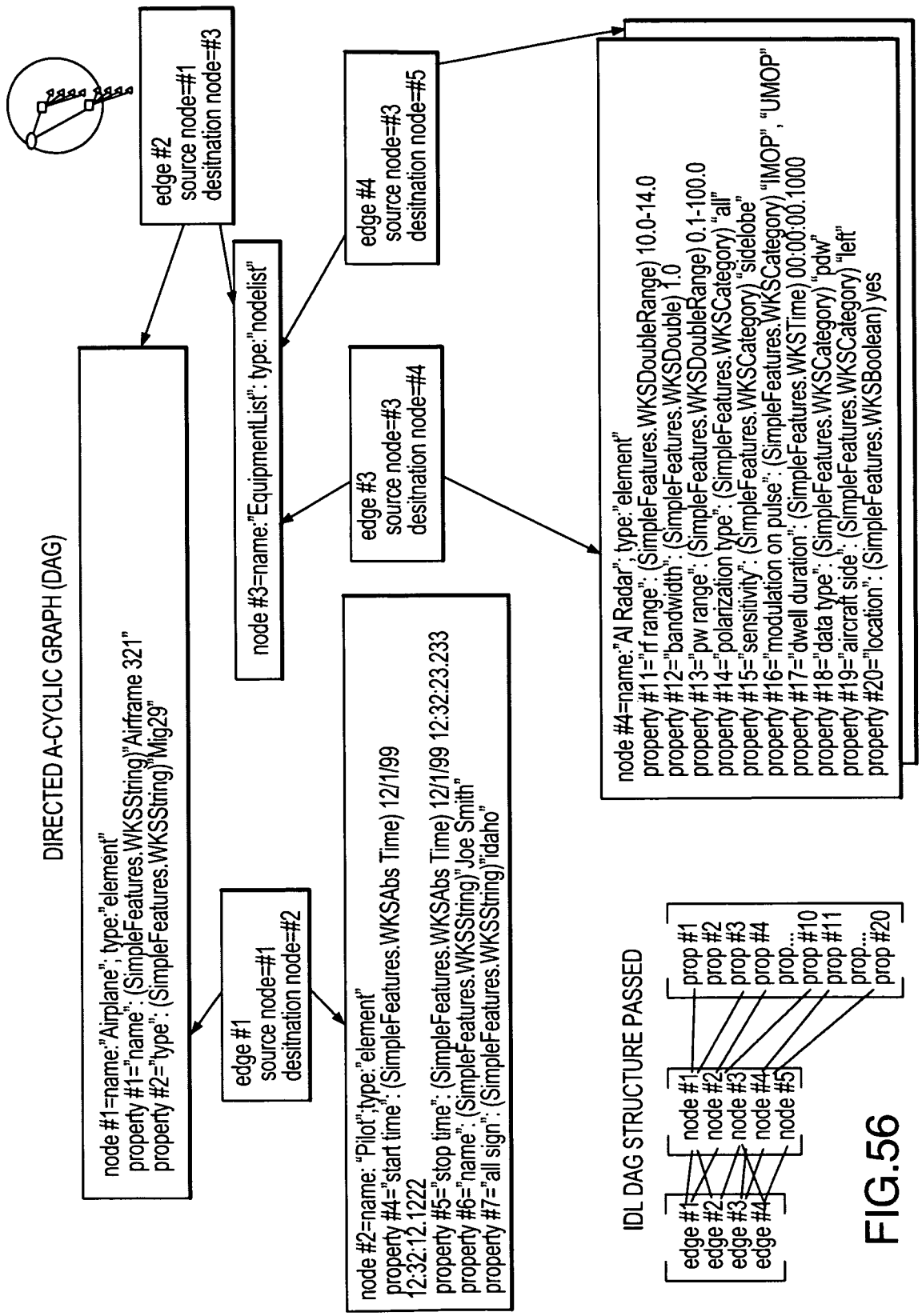

Each feature in a "feature collection" is managed in the form of a Directed Acyclic Graph (DAG). The DAG structure is used to describe the information resulting from a query and is subsequently used to communicate (pass-by-value) the object information between the client and server. The DAG structure, which is illustrated in FIGS. 55-56 has three parts: (1) an array of properties that contain only attribute information; (2) an array of nodes that contains lists of attributes (element node) or lists of other nodes (node list); and (3) an array of edges that connects two nodes. It will be appreciated that the DAG structure is easily converted from/to the DOM Objects.

The services tier 2954 is comprised of the data channel servers 2814, the library server 2816, the participant server 2824, the context server 2826, and the document server 2828, as well as other services. The services tier 2954 provides services that are accessible to any other service, client tool or repository. The services tier 2954 maintains the majority of the business logic as applied to a specific domain problem. The services tier 2954 is designed to be extended, allowing domain specific business logic to be added and made available to the enterprise system. New services register their existence with the naming service 2830 (FIG. 28), providing their home interface such that client tools and other services can learn and utilize their capabilities.

The user interface tier 2956 is comprised of thin client applications/applets/servlets (the client tools 2818) that allow the user to interact with the data. Each client tool 2818 interfaces directly with the collection (if no collaboration is desired) or directly with the data channel(s) 2814 (provides collaboration features).

Referring to FIGS. 30-42, the collaboration subsystem 2101 of the present invention provides an infrastructure for integrating legacy system capabilities and those provided by the collaboration system 2101. The infrastructure of the collaboration subsystem 2101 provides a foundation for keeping up with rapidly changing technology and supports adaptation of new capabilities as systems evolve. The collaboration subsystem 2101 has an open architecture, providing multiple options for integrating legacy systems. The level of integration selected for each legacy component depends on the capabilities of the infrastructure being utilized and the plans for system expansion. If long-term migration plans include extensive use of legacy software components, higher levels of integration are required to fully utilize the benefits of the architecture. If the plan is to make temporary use of legacy components until other capabilities are developed, a lower level of integration may be appropriate. One recommended approach provides for three levels of integration. This approach allows each component (data source, processing components, user interface) of the legacy system to be integrated as necessary to achieve the desired system capabilities.

Figure 30:
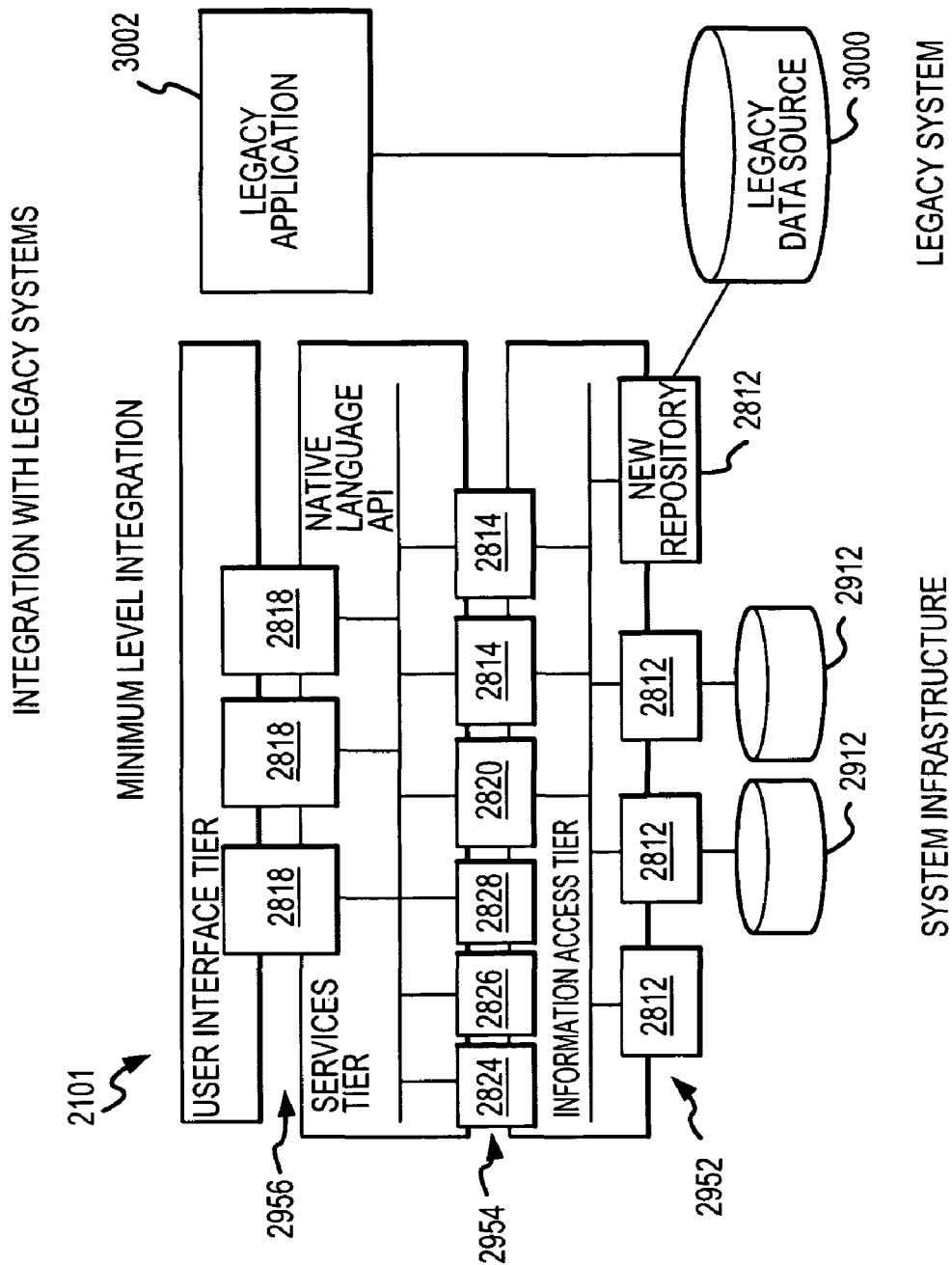
FIG. 30 is a flow chart of minimum level integration with legacy systems.

FIG. 30 illustrates first (or minimum) level integration of the collaboration subsystem 2101 with a legacy system. First level integration requires no change to the legacy system. A repository 2812 in the information access tier 2952 is developed to provide access to the legacy data source 3000. This level of integration allows access and manipulation of domain data by the existing tools 2818 provided by the collaboration system 2101 infrastructure. It allows full access to query and create documents from new and legacy data sources and allows existing viewing tools 2818 (those provided with the collaboration subsystem 2101 infrastructure) to act on the data collaboratively without requiring changes to the legacy application 3002 software.

Figure 31:
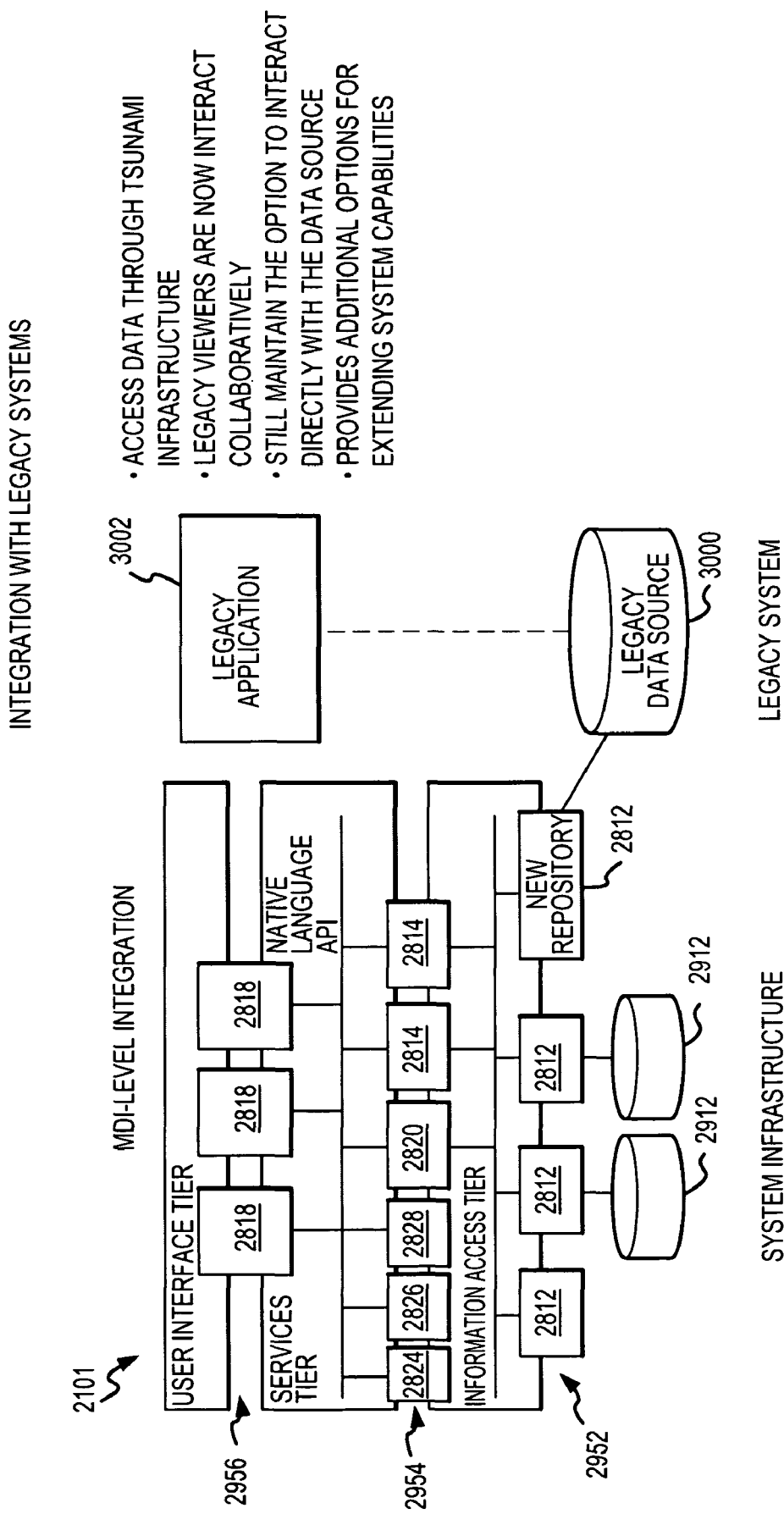
FIG. 31 is a flow chart of mid-level integration with legacy systems.

FIG. 31 illustrates second (or midlevel) level integration of the collaboration system 2101 with a legacy system. Second level integration involves modifying one or more of the legacy client viewers and/or processes to access the legacy data 3000 through the collaboration subsystem 2101 infrastructure. In addition to having a new repository server 2814 in the information access tier 2952 associated with the legacy data source 3000, the legacy application 3002 is connected through a native languages API to the services tier 2954. This enables selected portions of legacy applications 3002 (combined user interfaces and processing applications) to operate in a collaborative environment and to manipulate the legacy data source 3000 as well as all other data sources 2912 made available to the infrastructure, while still maintaining the ability to interact directly with the legacy data source 3000 using the legacy application 3002.

Figure 32:
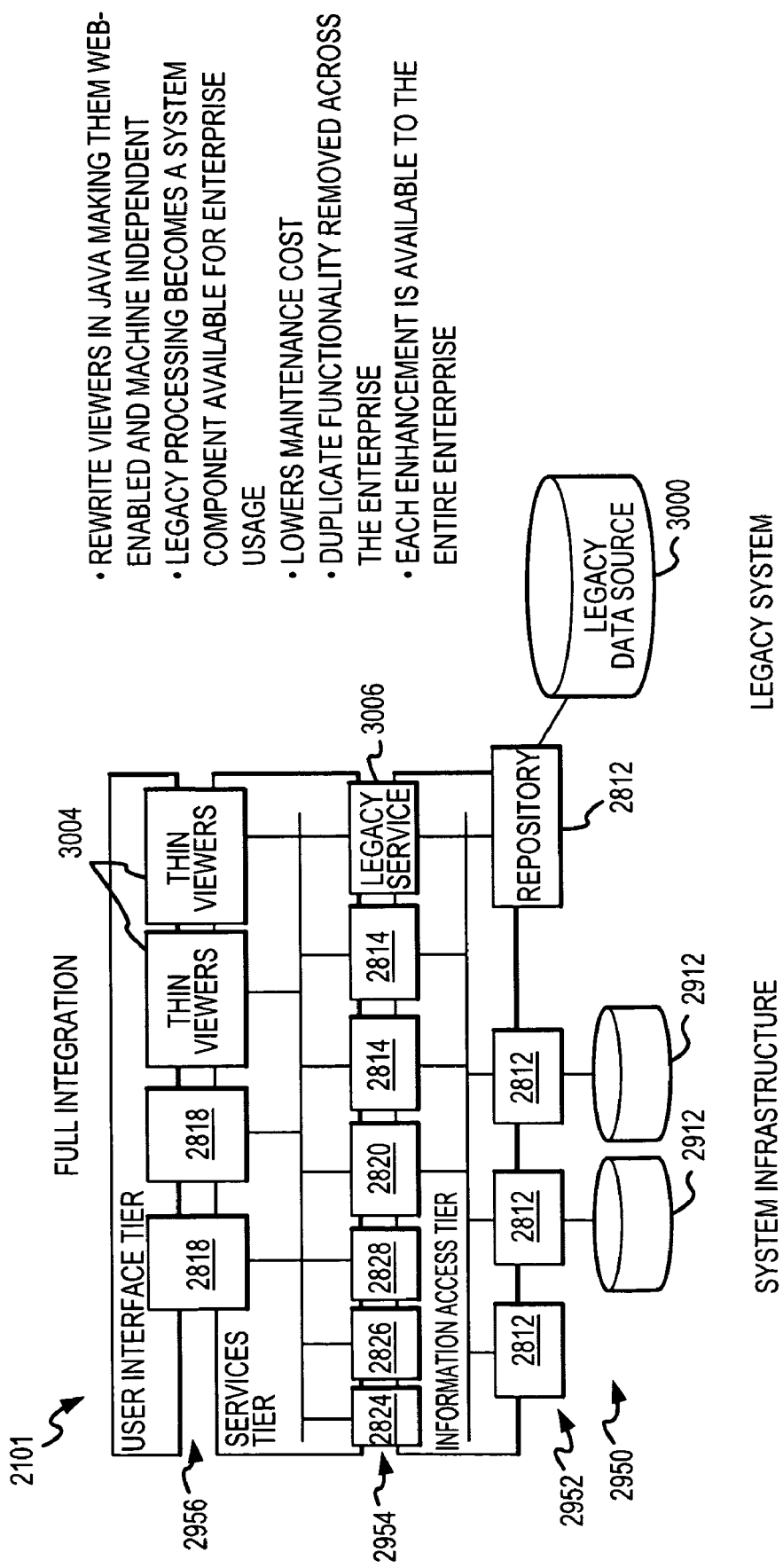
FIG. 32 is a flow chart of full integration with legacy systems.

FIG. 32 illustrates third (or full) level integration of the collaboration subsystem 2101 with a legacy system. Third level integration involves rewriting components (data viewers, processing) of the legacy system using the underlying component architecture of the collaboration system 2101. This provides the benefits of component distribution, system management, viewers that are Web enabled, and supports lifecycle management (activation, passivation, and persistence). As with first and second level integration, a new repository 2814 is provided in the information access tier 2952 that is associated with the legacy data source 3000. However, in the case of full integration, the legacy application is rewritten as one or more thin viewers 3004 included in the user interface tier 2956 and a legacy processing service 3006 included in the services tier 2954. The thin viewers 3004 may, for example, be rewritten in Java, making them Web enabled and machine independent. Incorporating the legacy user interface and processing services into the user interface tier 2956 and services tier 2954, respectively, makes them a system component available for enterprise usage. It will be appreciated that full integration of the collaboration subsystem 2101 with a legacy system lowers system maintenance costs, eliminates duplicate functionality across the enterprise, and makes each enhancement available to the entire enterprise. In addition, the integration technique chosen, and corresponding benefits, are managed stepwise with respect to both cost and risk, in accordance with project needs, using the present invention.

Referring to FIG. 33, the collaboration subsystem 2101 of the present invention moves the complexity of collaborative processing into the infrastructure. Visualization and control properties (color, selection, symbology, etc.) become an extended part of the data within the infrastructure rather than simply being a hard-coded characteristic of the client-viewing tool 2818. In this approach, client applications (user interfaces, processing agents) are simplified by removing the need for specialized data access methods or collaboration implementation logic. Viewing tools 2818 simply access the data through the infrastructure, display or manipulate the data as appropriate to the tool 2818, and provide any updates back to the infrastructure. Any interactions with the data, including manipulating visualization characteristics, are viewed collaboratively by all tools 2818 interacting within the same conference 2902. Because all of the visualization and control properties are treated as an extension of the domain data, the infrastructure provides a natural environment for software agent technology to be applied as "collaborative agents" working to solve a problem. Agents can monitor and act on actions performed by human participants or can be configured to perform actions based on control information.

Figure 34:
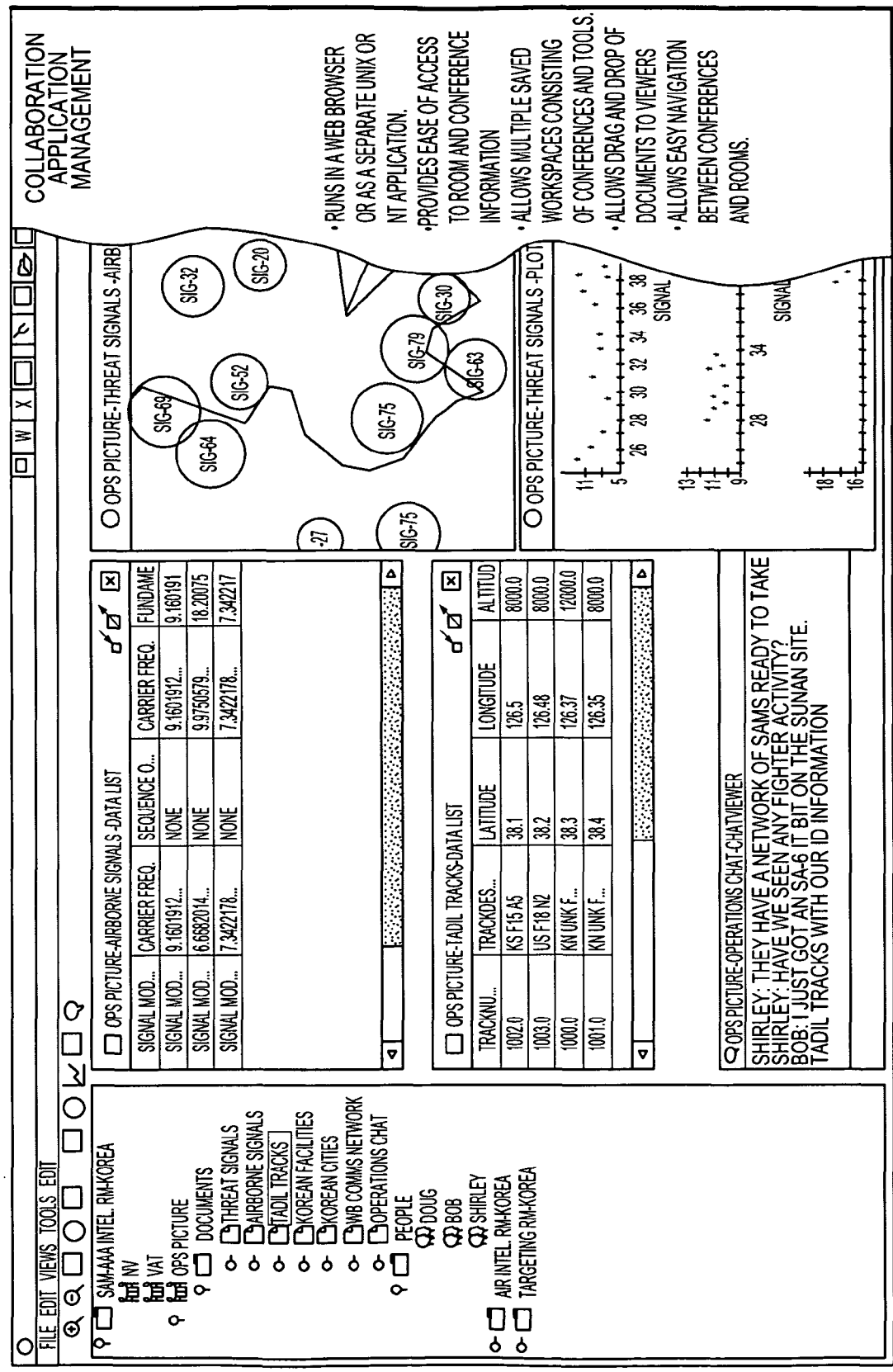
FIG. 34 is a first chart illustrating collaboration application management.
Figure 35:
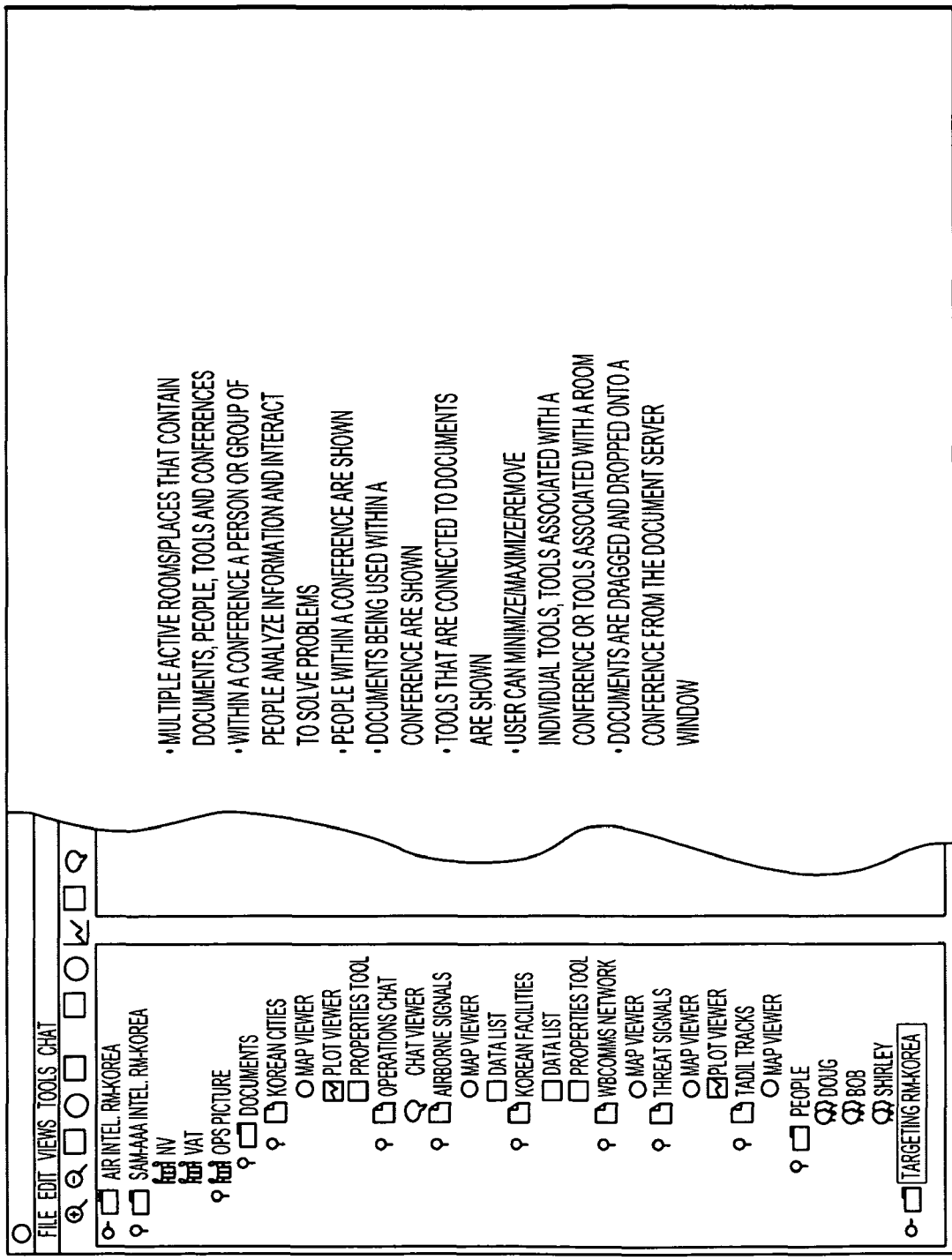
FIG. 35 is a second chart illustrating collaboration application management.

Referring now to FIGS. 34-41, exemplary user interfaces of the collaboration subsystem 2101 and several components thereof are shown. FIGS. 34-35 show an exemplary embodiment of a user interface 2860 of the collaboration subsystem 2101. The collaboration system user interface 2860 may be configured to run within another application, such as a Web browser, or as a separate application within the operating system environment of the user terminal 2906. The collaboration system user interface 2860 provides for ease of access to the conferences 2902 and information within a conference 2902. In this regard, the various conference rooms 2902 within a context 2900 may be displayed in a left hand side panel of the collaboration system user interface 2860. Windows associated with the various client tools 2818 are displayed within a right hand side panel of the collaboration system user interface 2860. The collaboration system user interface 2860 allows multiple saved workspaces consisting of conferences 2902 and tools 2818. It also allows for the dragging and dropping of documents 2910 into the various viewing tools 2818. Additionally, the collaboration system user interface 2860 permits easy navigation between conferences 2902. There may be multiple active conferences 2902 containing documents 2910, participants 2904, and tools 2818. Within a conference 2902, a participant or group of participants 2904 analyze information and interact to solve problems.

Figure 36:
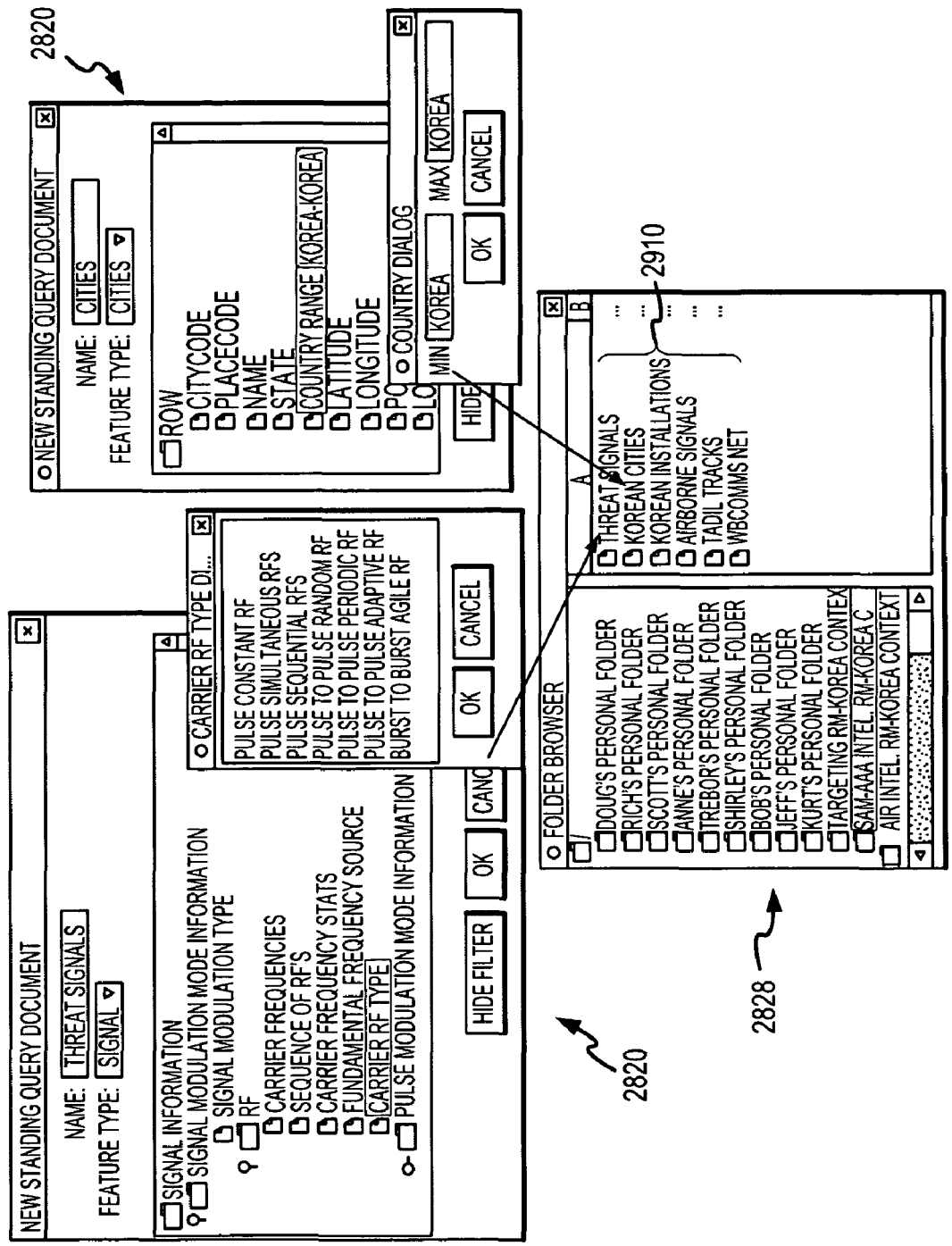
FIG. 36 is a flow chart of the repository query and document management.

FIG. 36 illustrates interfaces of the query viewing tool 2820 and view into JCS document server 2828. The query-viewing tool 2818 dynamically learns about the repositories 2812 and gets attribute metadata from the repositories 2812. It creates an agent representing the standing query. The results of the query become a document 2910 which may then be used for collaboration. The document itself is a token representing the results—no document data is conveyed to the user's viewer by this action. The documents 2910 created by the standing query agents are displayed within the JCS document server 2828 interface.

Figure 37:
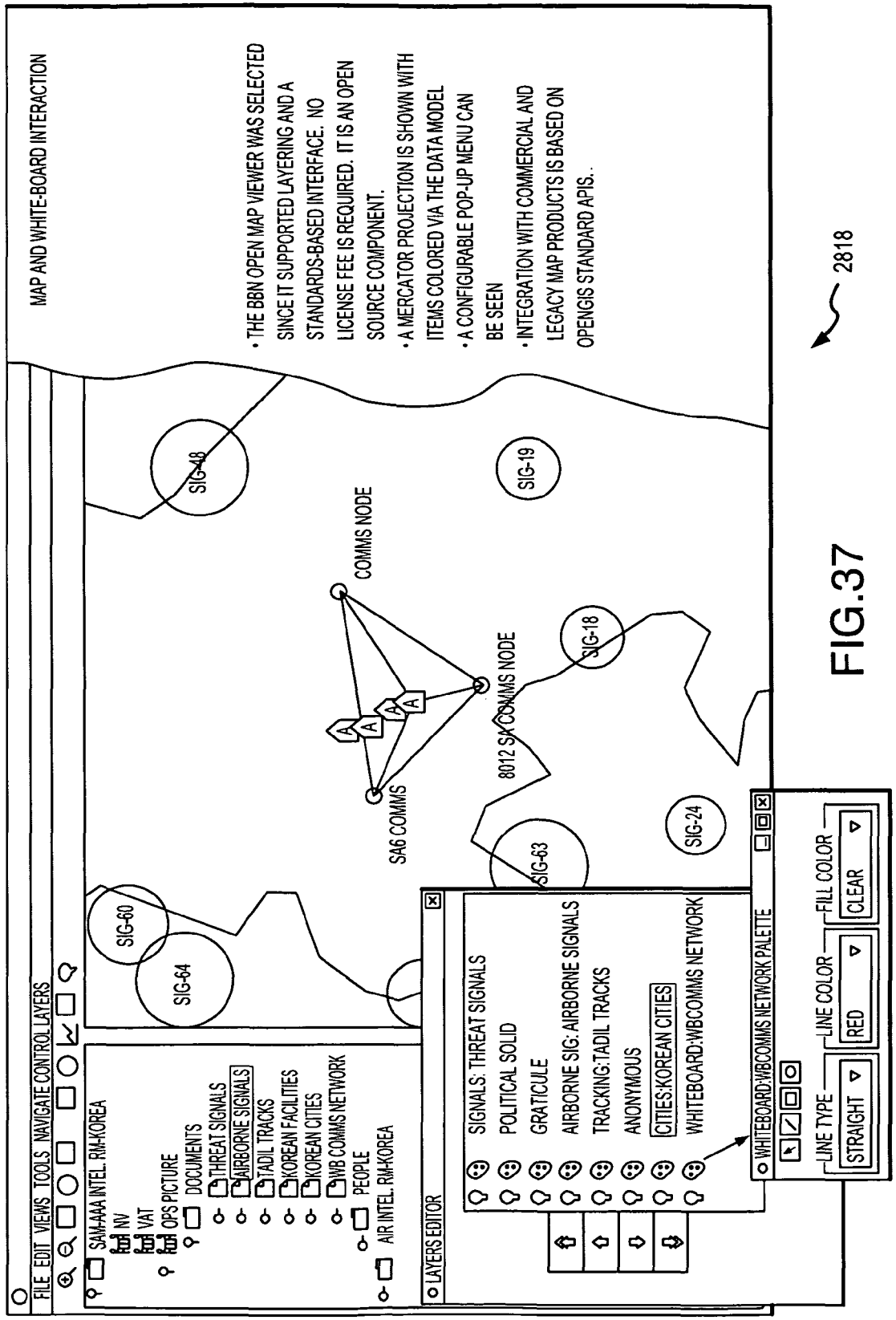
FIG. 37 is a map and white-board interaction.

FIG. 37 shows an interface of the map-viewing tool 2818. The map-viewing tool 2818 may comprise an open source component such as, for example, the BBNOpen Map Viewer, which supports layering and a standards-based interface. The map viewing tool 2818 displays a map in a chosen projection (e.g., a Mercator projection as is shown) with the data items overlaid on the map and colored in accordance with their extended properties in the data model. The map-viewing tool 2818 includes a configurable pop-up "layers editor" menu where the user may edit visualization attributes (e.g., line type, line color, fill color) for display of the data items.

Figure 38:
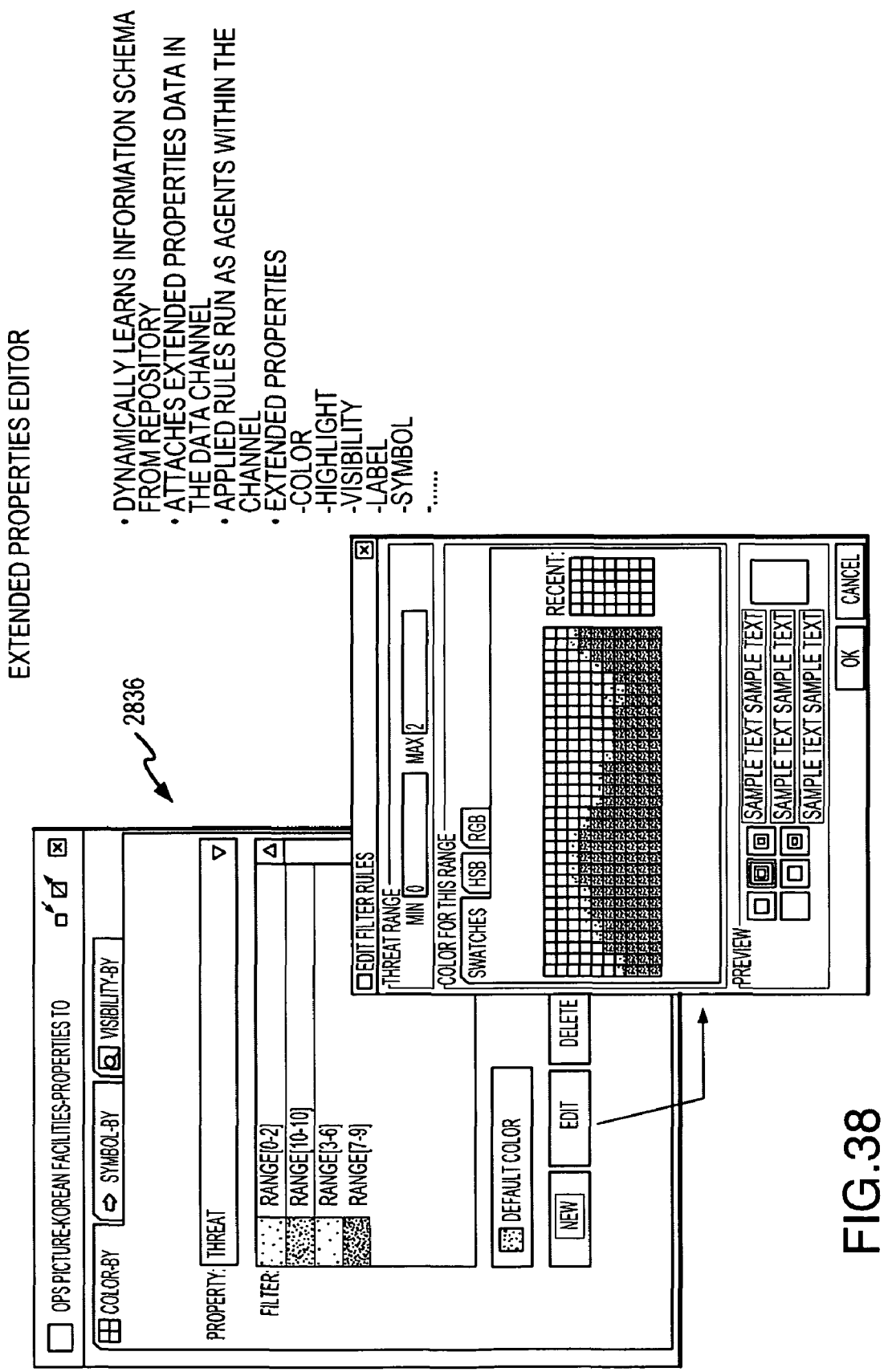
FIG. 38 illustrates the function of the extended properties editor.

FIG. 38 shows an interface of an extended properties editor 2836. The extended properties editor 2836 provides for attachment of extended properties (e.g., color, highlight, visibility, label, symbol, etc.) to data items in the data channel(s) 2814. The extended properties editor 2836 dynamically learns the information schema from the repositories 2812. The rules applied through the extended properties editor 2836 run as agents within the data channel(s) 2814.

Figure 39:
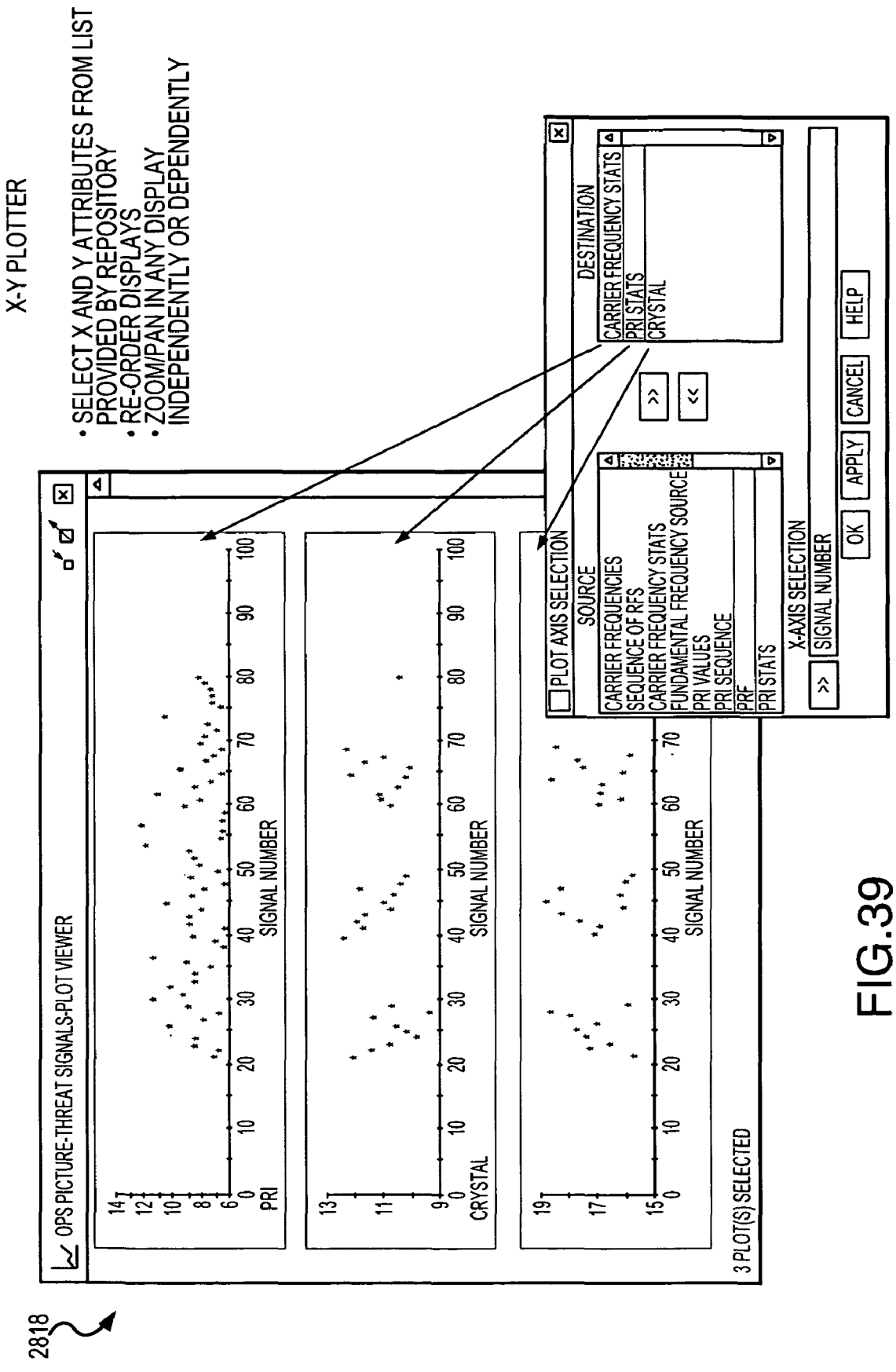
FIG. 39 illustrates the output from an X-Y plotter.

FIG. 39 shows an interface of the X-Y data-viewing tool 2818. The X-Y data viewing tool 2818 allows the users to select X and Y attributes from the list provided by the repositories 2812 for display within one or more plots, provides for reordering of the plots, and permits zooming and panning in any plot independently or independently.

FIG. 40 shows an interface of the list viewer tool 2818. The interface of the list viewer tool 2818 provides for viewing and manipulation of data items from the data sources 2912 in a table format. In this regard, the data items may be sorted. Specific rows within the data table may be selected, colored, and hidden. Additionally, the participants 2904 may select various attributes of the data items for viewing.

Figure 41:
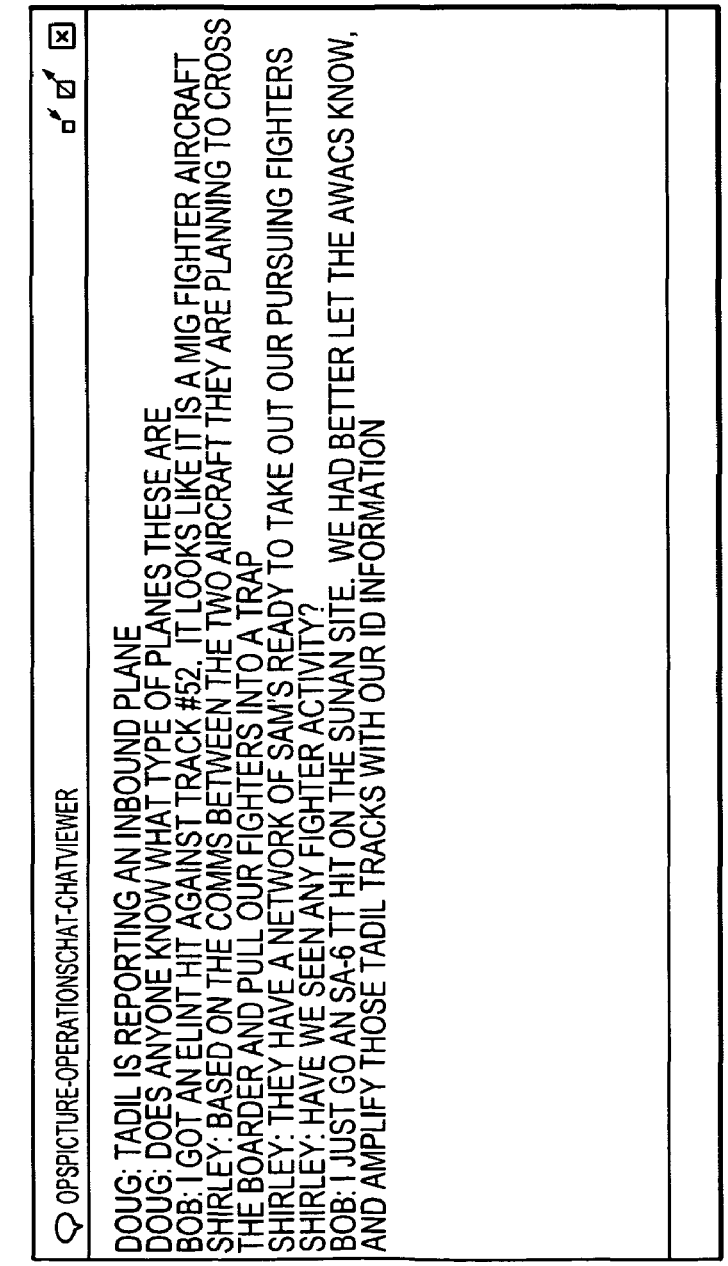
FIG. 41 illustrates the chat tool capability.
Figure 42:
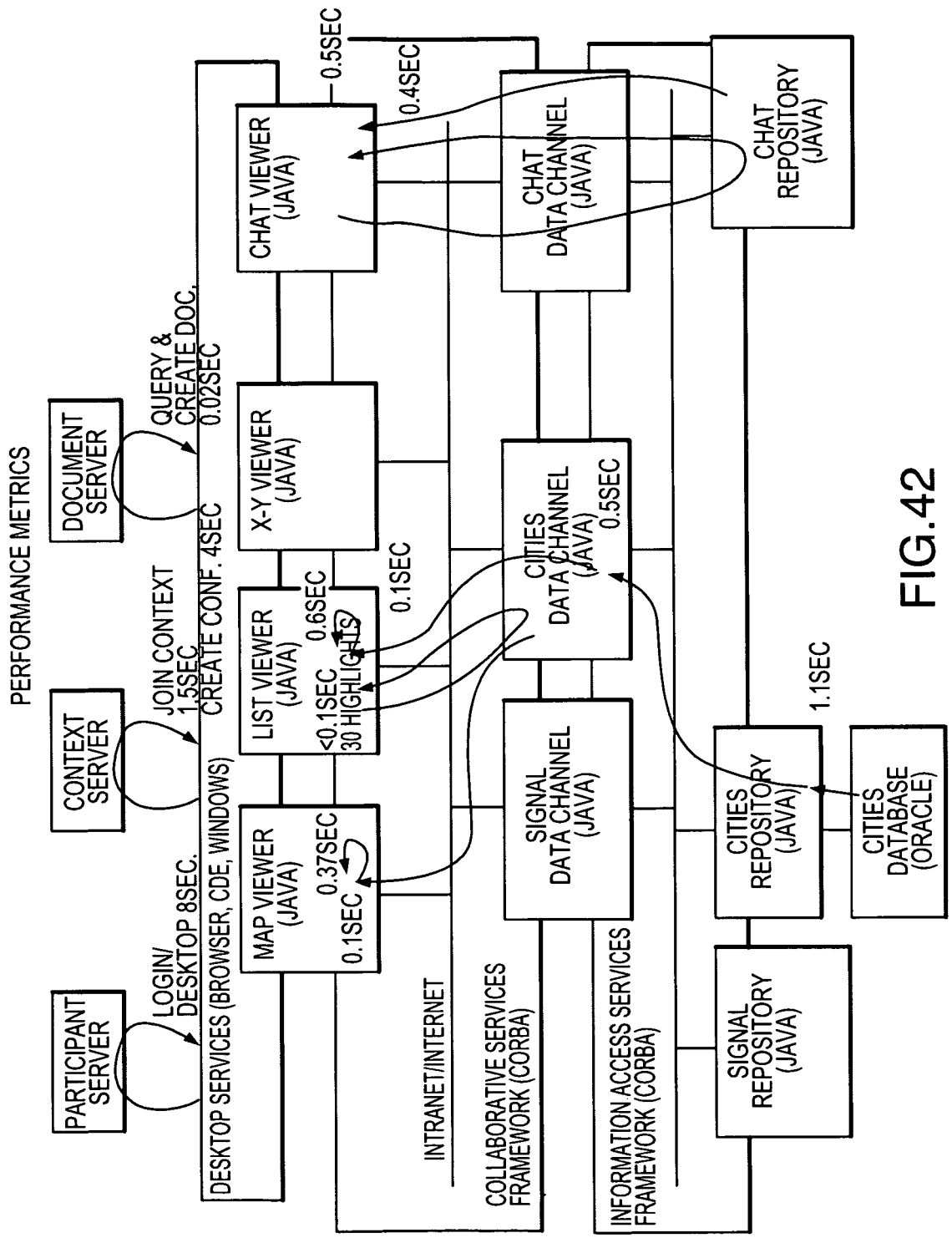
FIG. 42 is a flow chart illustrating the performance metrics.

FIG. 41 shows an interface of the chat tool 2818. The chat tool 2818 supports multi-user conversations from multiple conferences 2902 in multiple contexts 2900. As shown by the example text within the chat tool 2818 interface, participants 2904 connect to a document 2910 and communicate with one another. Participants 2904 in the same conference 2902 see the same visualization properties such as color and visibility of participant inputs.

It will be appreciated that the previously described collaboration subsystem 2101 infrastructure provides a change to the way systems are built and enhanced. Using the collaboration subsystem 2101 infrastructure, new capabilities can be added to the system as small client applications that interact through the infrastructure. The resulting system is constructed of many small applications providing unique capabilities that work together to form the entire system. Each client user interface, processing component, or data repository interacts in a data centric collaborative environment where each component capability extends the capabilities of the other components. The result is a system whose overall capability grows exponentially with every added capability. With the collaboration subsystem 2101 infrastructure, each user is free to select the appropriate tools 2818 to be most effective at analyzing and manipulating data no matter what the data source 2912. This allows human resources with varying backgrounds (engineering, analytical, mathematical, operational, etc.) to use specialized tools that enable the most effective application of their diverse skills to solve problems. In this regard, the performance metrics of one embodiment of a computer implemented collaboration subsystem 2101 in accordance with the present invention are summarized in FIG. 42.

Figure 43:
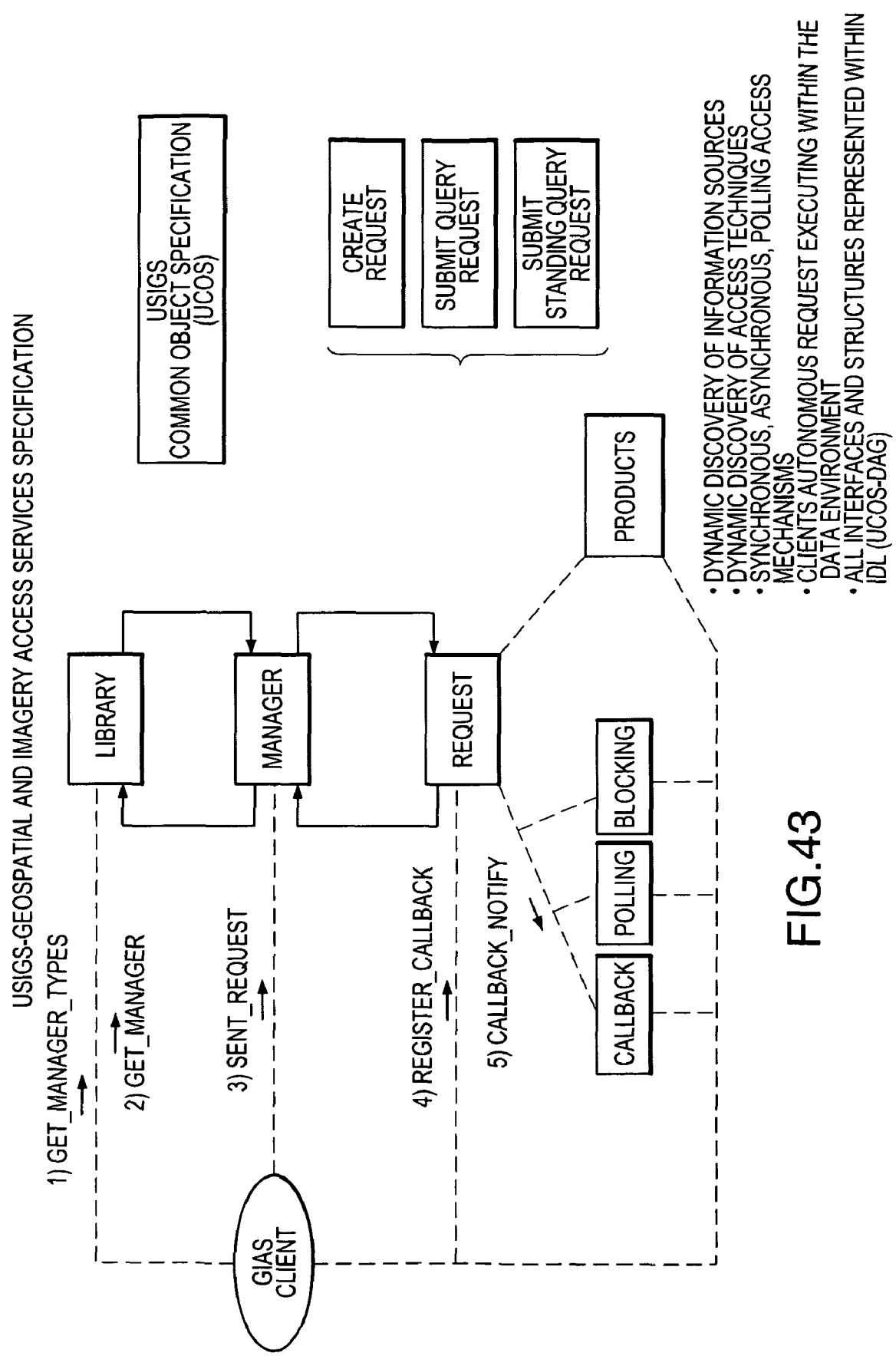
FIG. 43 illustrates the high level interaction between various Information Access Service (IAS) components in accordance with the USGIS.
Figure 44:
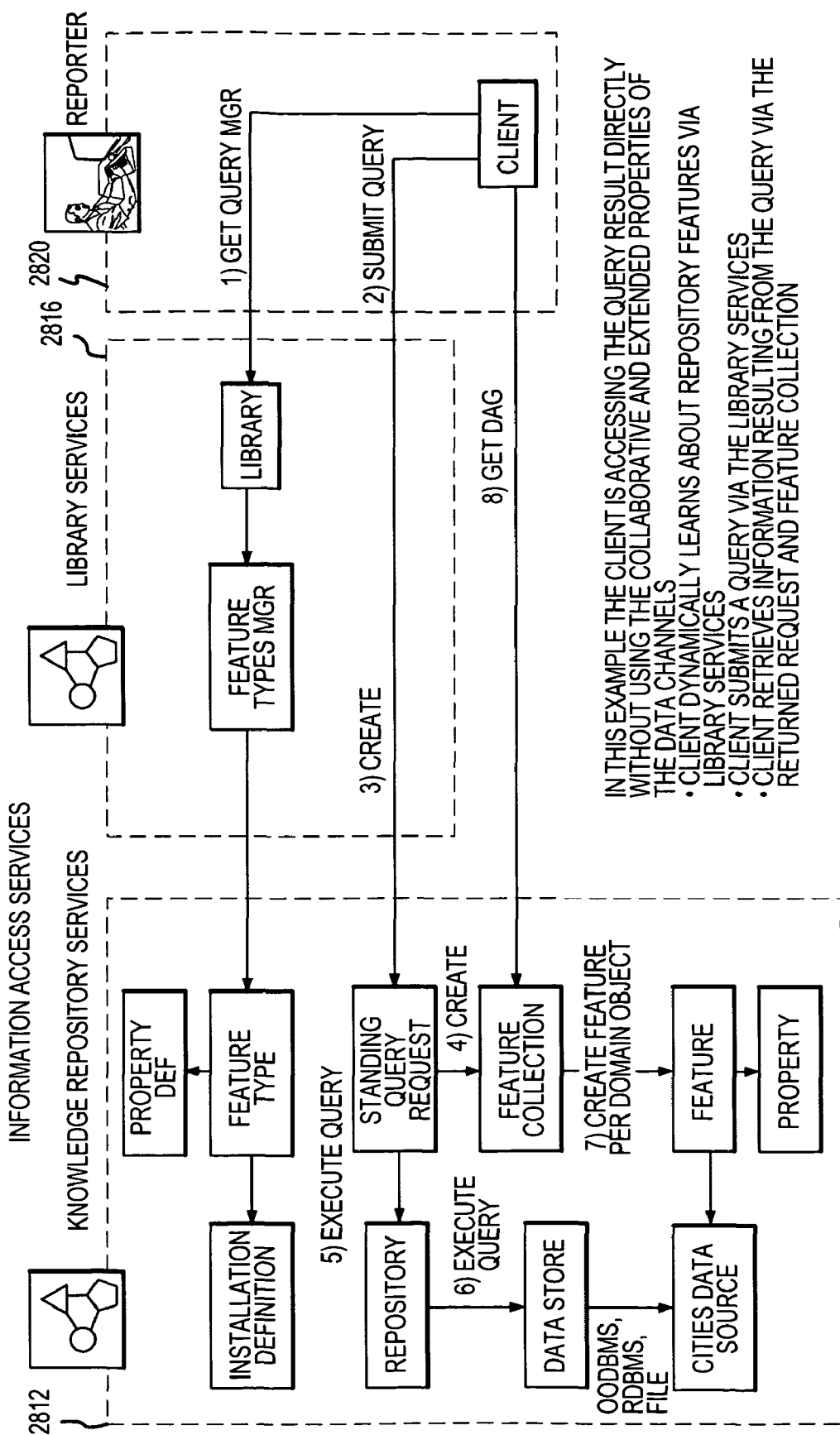
FIGS. 44-46 illustrate the lower level interaction between IAS components.
Figure 45:
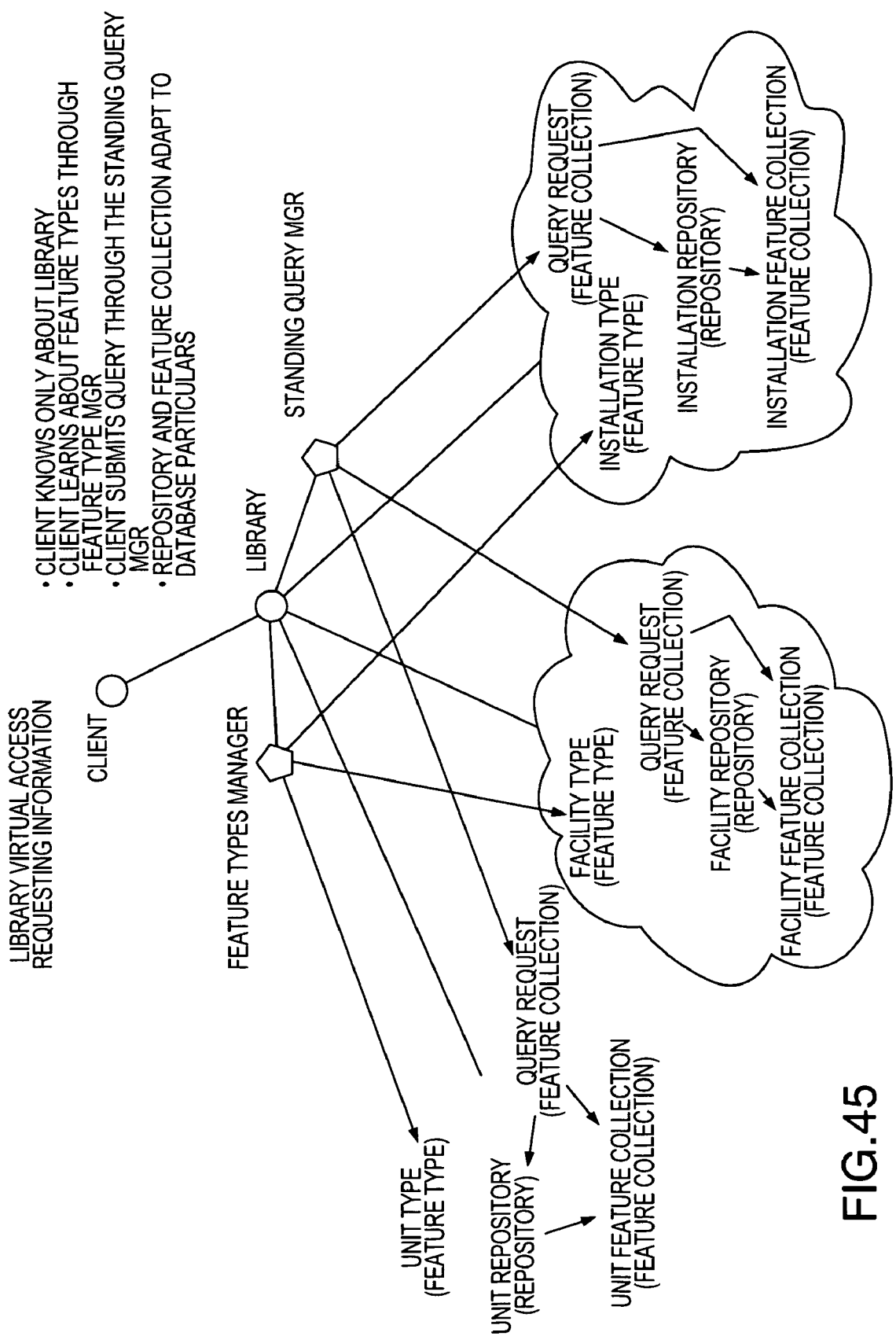
Figure 46:
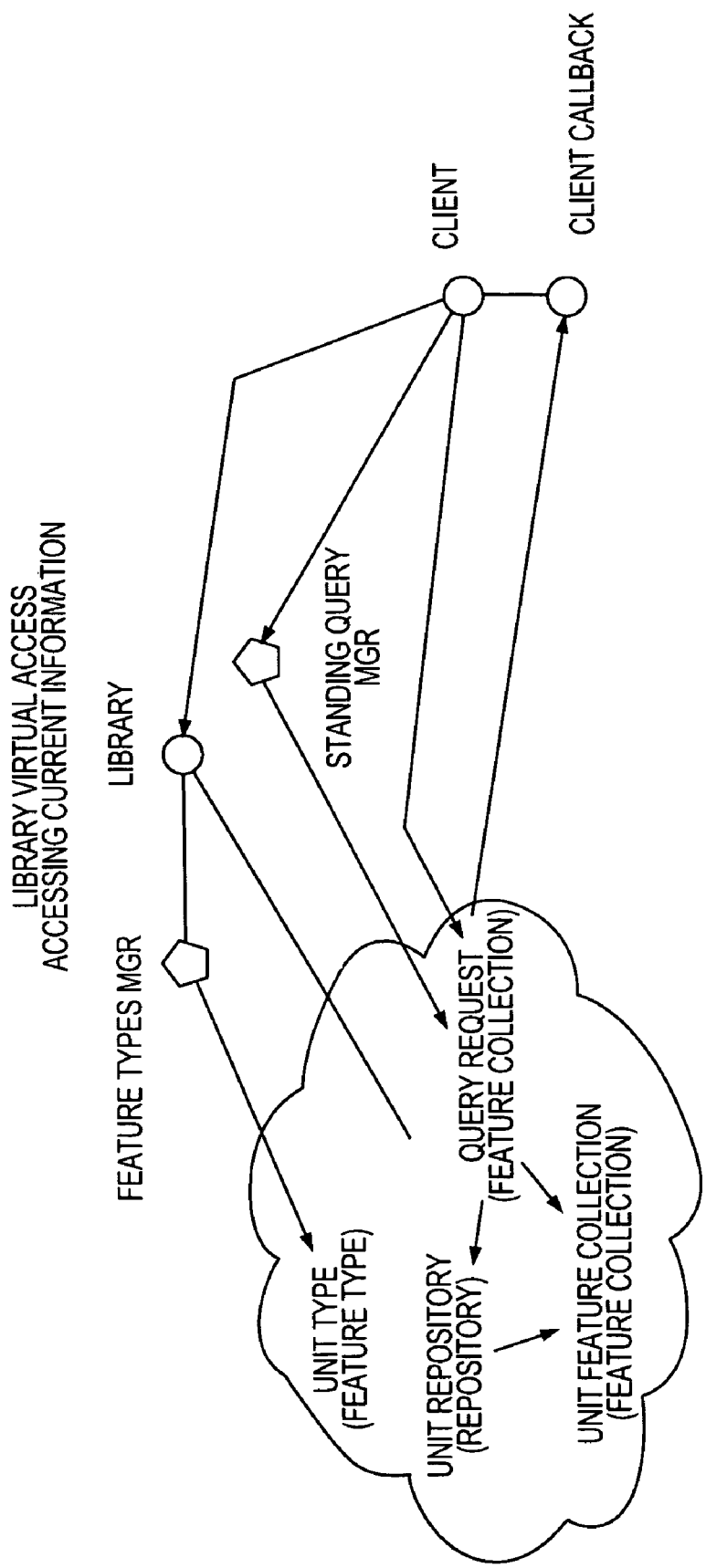
Figure 47:
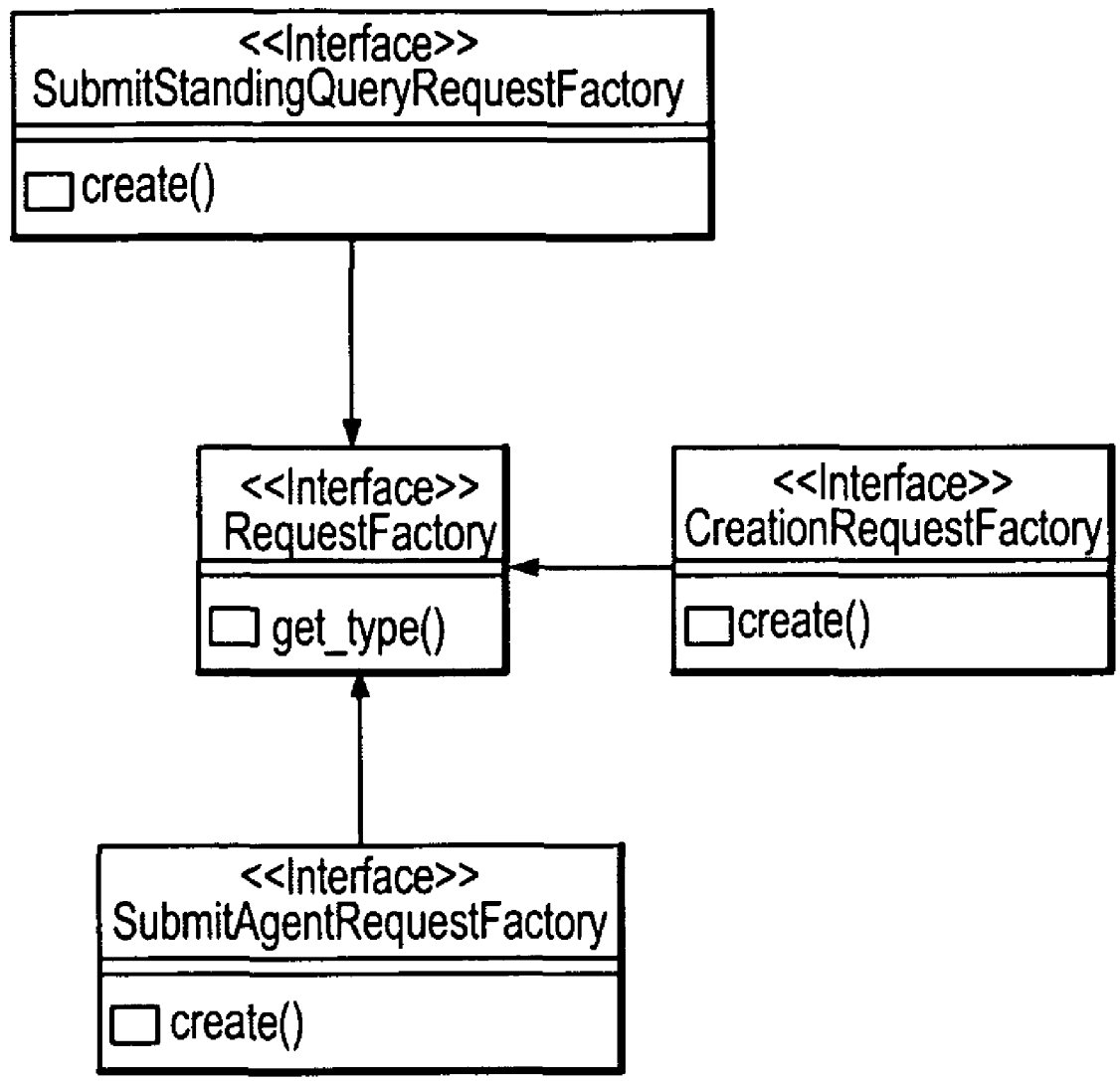
FIGS. 47-51 illustrate the inheritance structure of the various IAS components illustrated in FIGS. 43-46 is illustrated in FIGS. 47-51.
Figure 48:
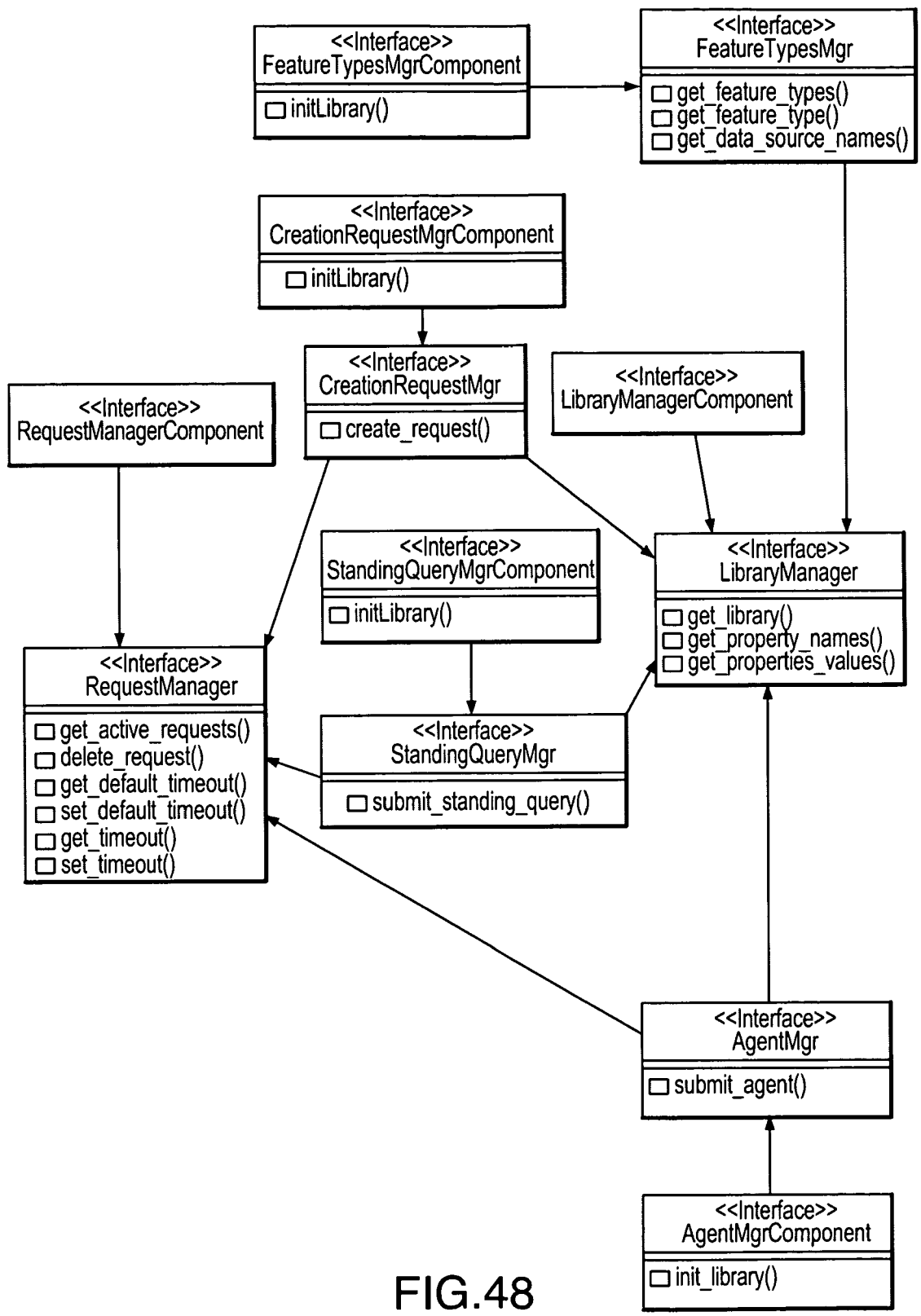
Figure 49:
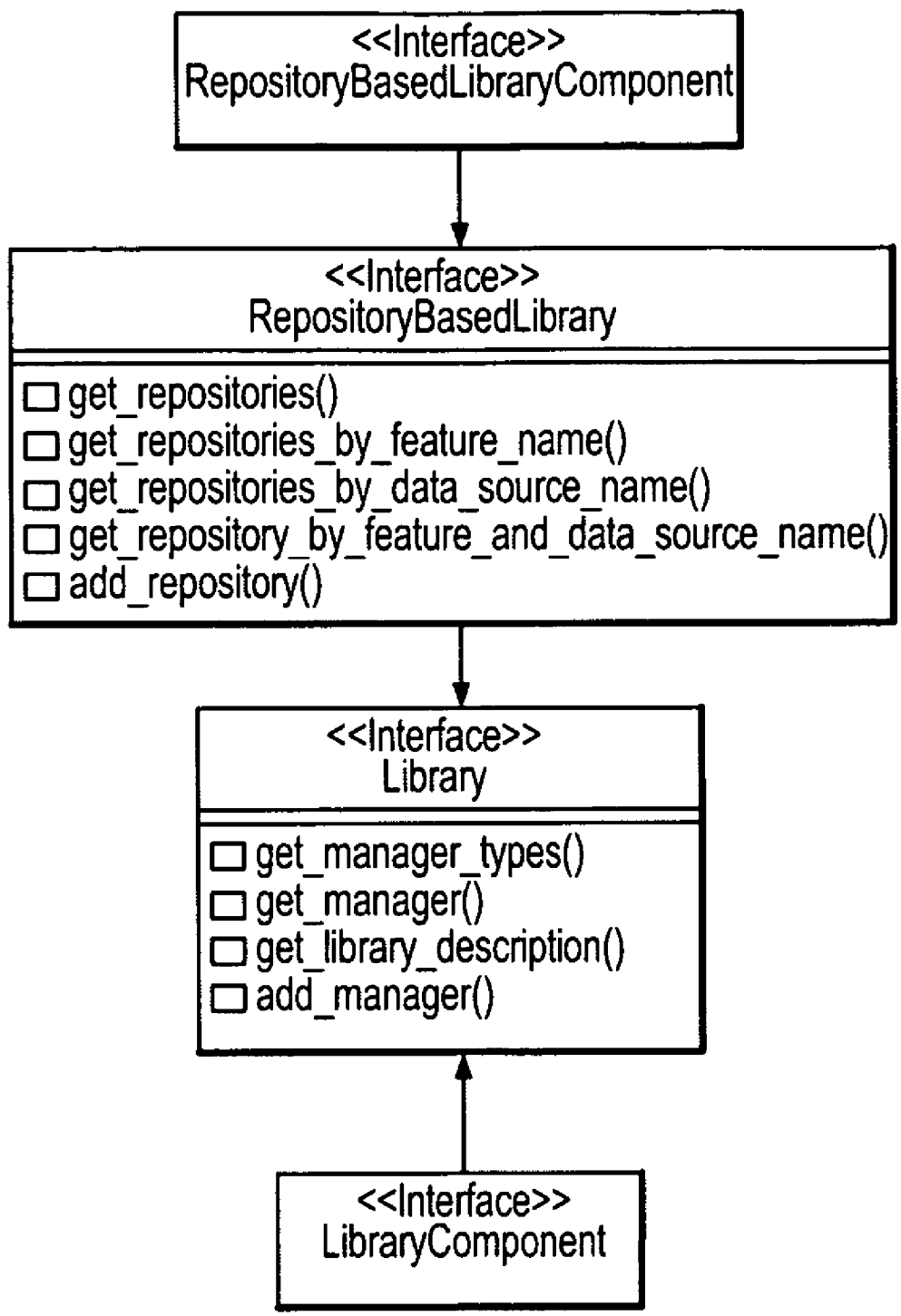
Figure 50:
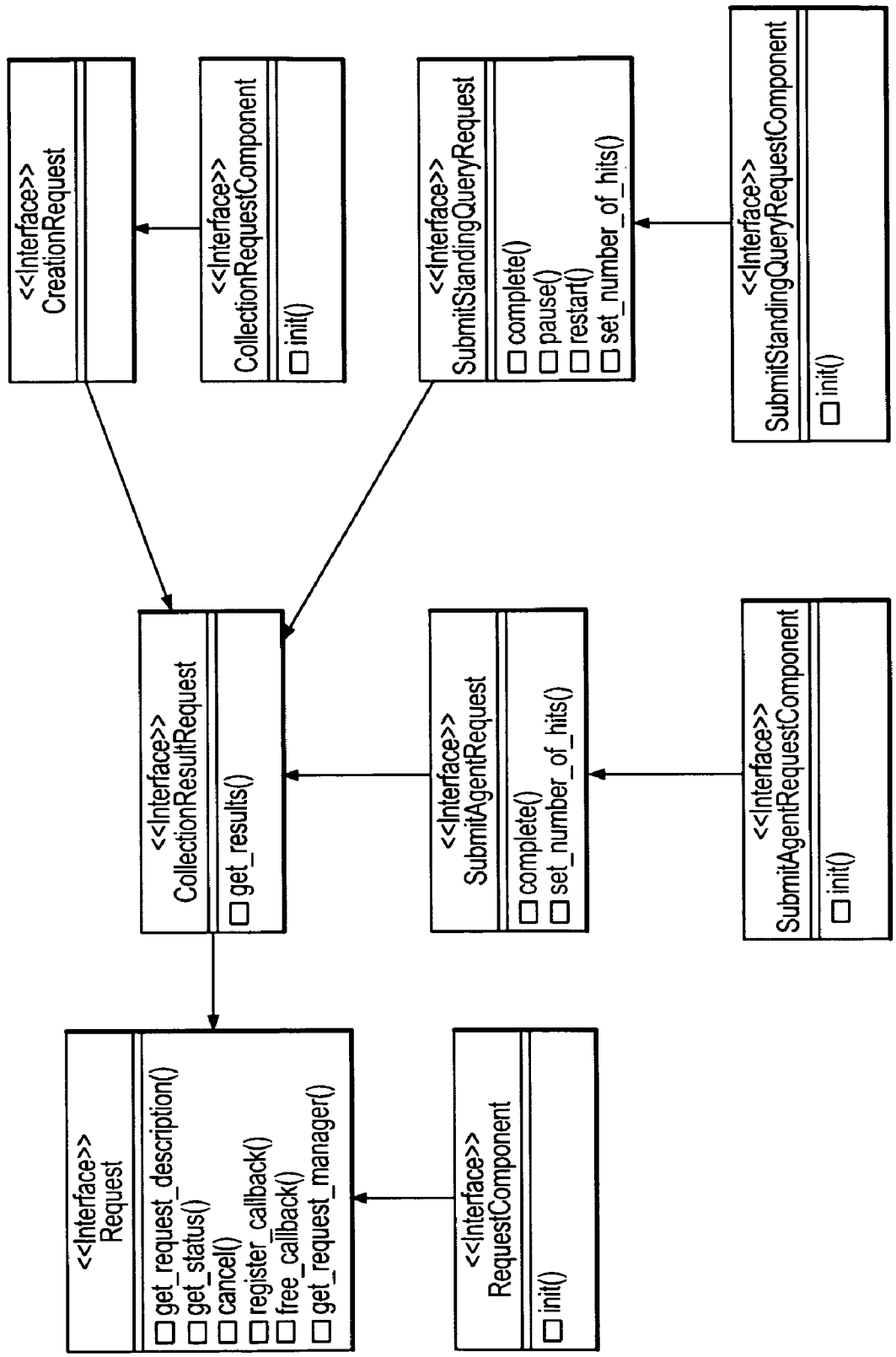
Figure 51:
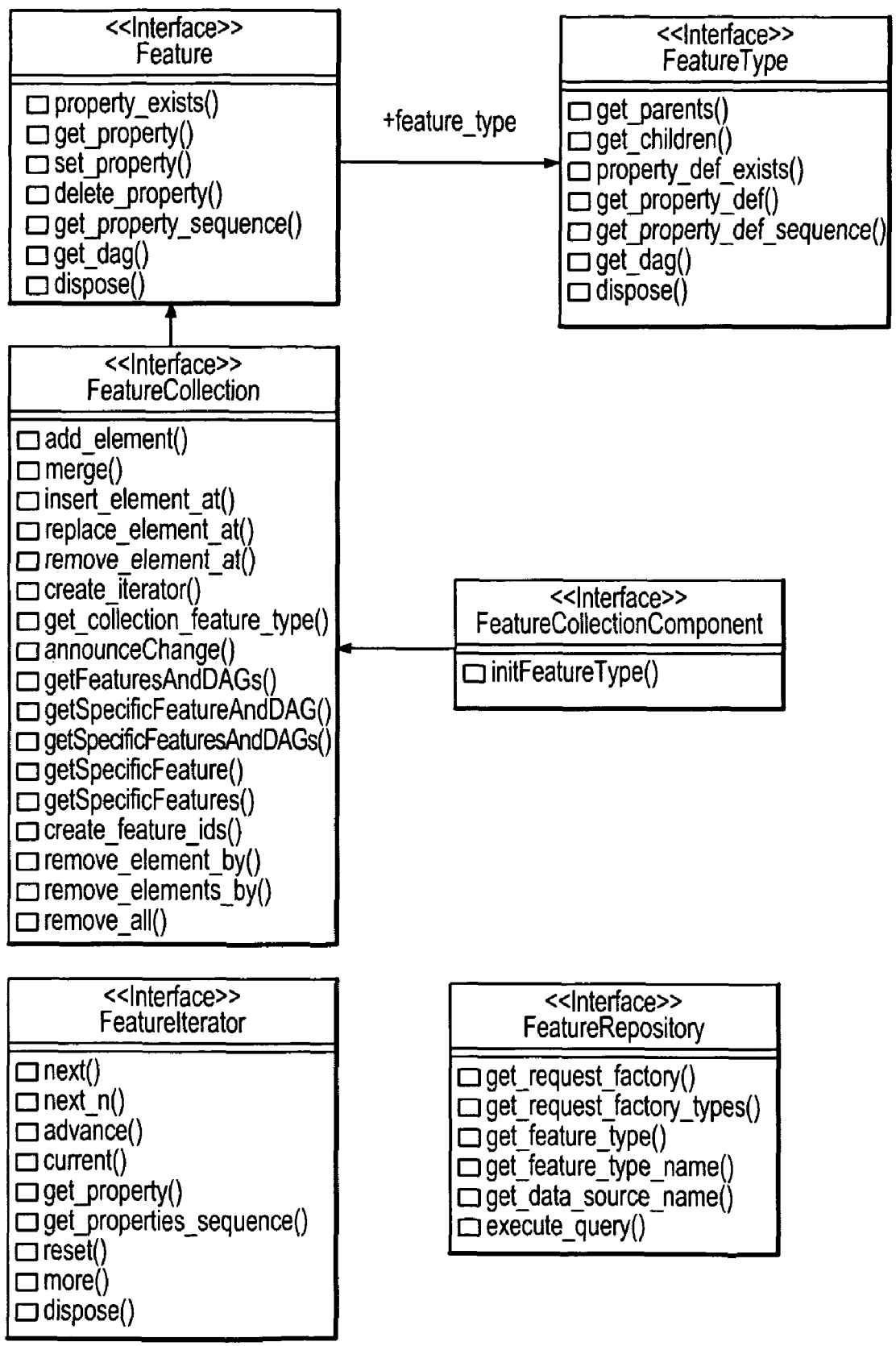

Referring now to FIGS. 43-46, the collaboration subsystem 2101 of the present invention provides information access services (also referred to as library services). The information access services (IAS) are composed of a set of factory components, management components, library components, and request components that provide methods for discovery of available data sources 2912 and the creation of requests for information from those data sources 2912. These components are based on the United States Imagery and Geospatial Services (USIGS) Geospatial and Imagery Access Services (GIAS) Specification. FIG. 43 illustrates the high level interaction between libraries, managers and requests. FIGS. 44-46 illustrate the lower level interaction between the (IAS) components in performing a query on a data source 2912 and subsequently retrieving data to be used by a client tool 2818.

Features of the various interface components in FIGS. 43-46 are summarized in the table below.

- Library: "Named" Object within the production domain that supports information access capabilities. All IAS services accessible through the Library Object. Database location, data representation (schema, object model), and type (RDBMS, OODBMS, file) are transparent to users of IAS.
- Standing Query Manager: Is responsible for initiating the client request and then managing the request objects over the duration of the transactions. Other types of Managers (Query Manager, Agent Manager, etc.) support different forms of information access.
- Standing Query Request: Client query transactions result in the creation of a Request Object. The Request provides the client visibility into the information access process. The client has three methods of being notified when information is available: Post a callback for a-synchronous notification; Synchronously block until information is available; or Poll for Request status periodically.
- Feature: Provides a common adapter (interface) to a domain object. Through the Feature, a client can access a domain object's information. The Feature and Repository Objects provide an adapter layer that shield client programs from the difference database storage and access mechanisms.
- Property: A Directed Acyclic Graph (DAG) of Properties is used to retrieve/update the information on a particular Domain Object. Associations between two Features (Facility->Equipment) is represented as a DAG property that contains a sequence of feature association structures. From this property (within Facility) a client can create a second collection of Features (Equipment) that can be displayed.
- Feature Type: The SIGINT Object Model (SOM) and Fusion Object Model (FOM) have identified a set of core classes (Features—Installation, Facility, Equipment, Unit, Signal, etc) that make up a domain. Through the Feature Type a client can obtain retrieve meta-data that is used to construct a query.
- Property Def: A Directed Acyclic Graph of Property Def's (DAG Def.) is used to pass the definition of a particular Domain Object.
- Repository: Provides a common interface to a storage server for query evaluation and management. Each Feature Type within a database will have an associated Repository Object. The Query Request created by the Query Manager goes to the Repository for evaluation. The Repository is responsible for converting the query, which is in the domain terms, into the specific language and schema of the database. The Repository performs the query and populates the Feature Collection with feature objects.
- Factory: Provides services for construction of instance objects. There is a specific factory for each class. Multiple construction methods may be provided depending on the factory.

The inheritance structure of the various IAS components is illustrated in FIGS. 47-51.

Referring more particularly to FIG. 44, when a user of the collaboration subsystem 2101 activates the query viewer client tool 2820, the query viewer client tool 2820 dynamically learns about repository features via the library server 2816. In this regard, the query viewer client tool 2820 gets the query manager from the library server 2816, which includes a library and a feature types manager. The feature types manager in turn accesses a feature type within the repository server 2812. The feature type includes a property definition and an installation definition. Using the query viewer client tool 2820, a query is submitted via the library server 2816 to the repository server 2812. In this regard, when the repository server 2812 receives a query request created through the library server 2816, the repository server 2812 creates a standing query request. The repository server 2812 then creates a document 2910 (also referred to herein as a feature collection) and also executes the query. The standing query request is executed through a repository and a data store to access data within a data source 2912 associated with the repository server 2812. The repository server 2812 creates a feature for each domain data item meeting the specified query criteria. Each feature created includes an extended property. The document 2910 created in response to the query is returned in the form of a Directed Acyclic Graph (DAG) to the query viewer client tool 2820.

Figure 52:
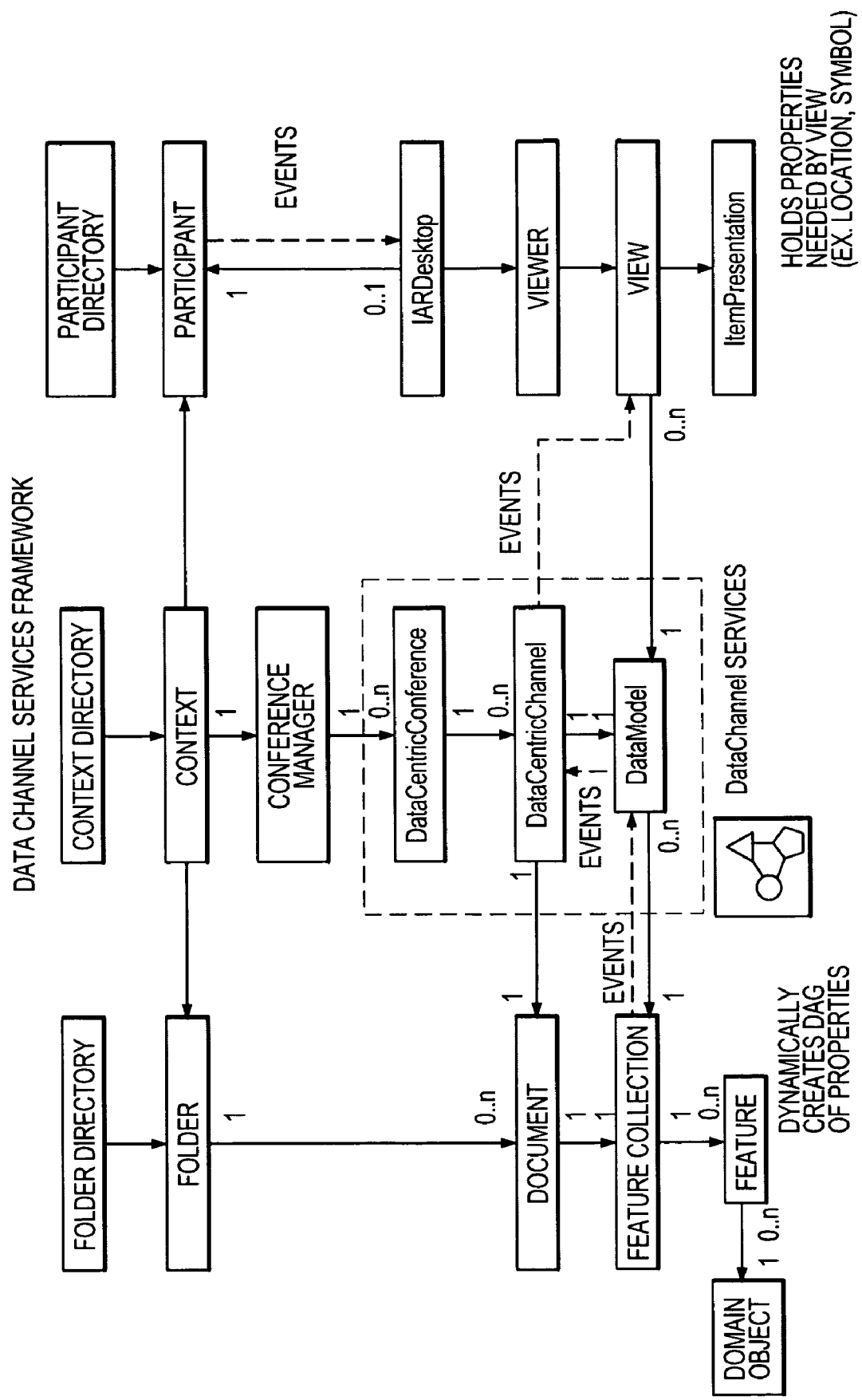
FIG. 52 illustrates the data channel services framework.
Figure 53:
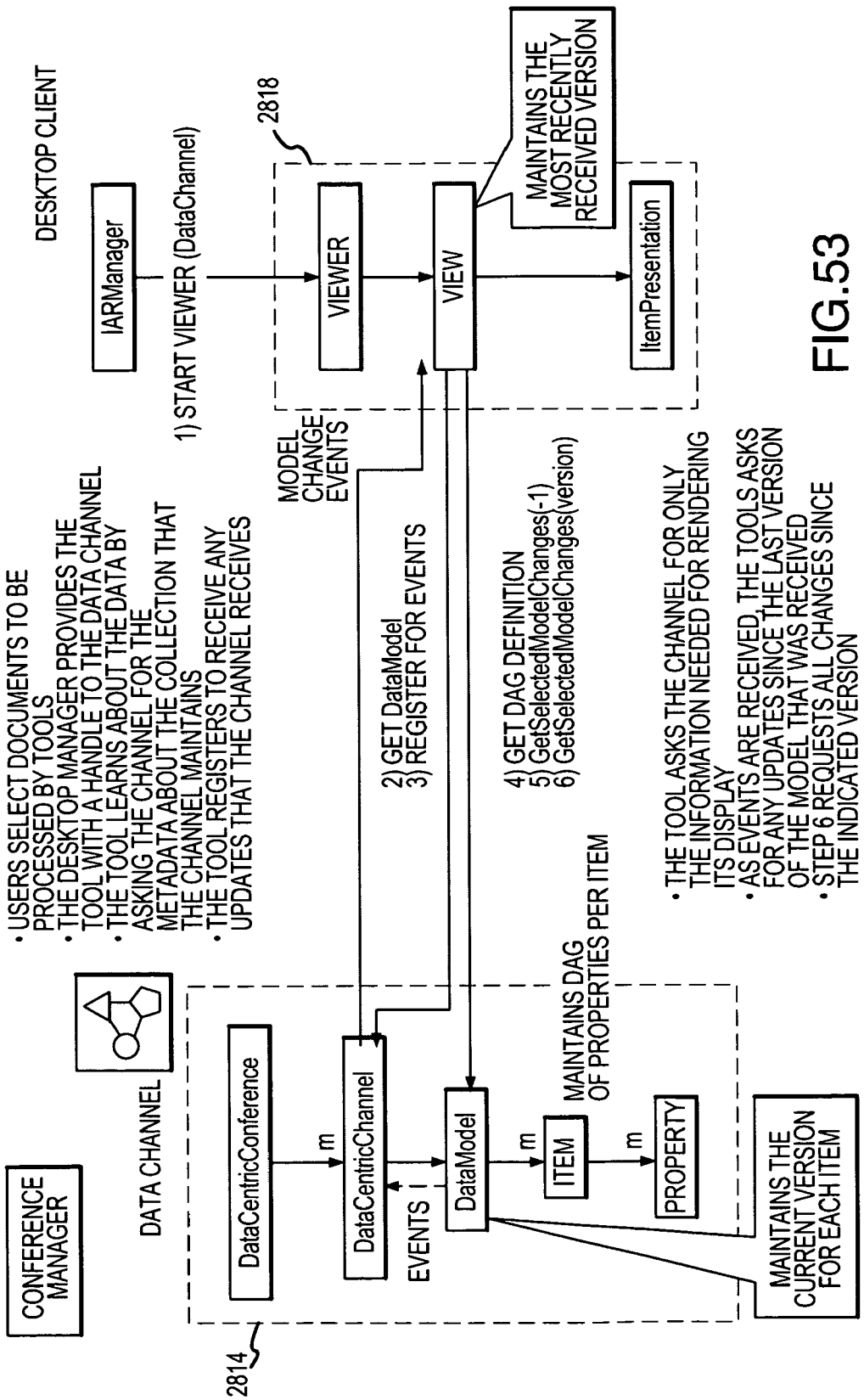
FIG. 53 illustrates the versioning of data changes in the data channel.

Referring now to FIGS. 52-53, the data channel is the collaborative interface to the data provided by a document 2910. A data channel server 2814 is created when a document 2910 is placed into a conference 2902. Upon initialization, the data channel server 2814 is extended to provide visualization and control properties such as highlight, visibility, and color. The data channel server 2814 is extendable from client applications or agents in real-time by calling methods on the extended properties manager to teach the data model additional collaborative attributes. FIG. 52 shows the data channel services framework in relation to other component interfaces within the collaboration subsystem 2101 architecture.

FIG. 53 illustrates the components that make up a data channel server 2814 and describes the interactions between a client and the data channel sever 2814 to learn about the data referenced by a document 2910 and to extract the information through the data channel server 2814 interface, as well as register for updates that the data channel server 2814 may receive. As is shown in FIG. 53, the data channel server 2814 includes a conference 2902. Within each conference 2902 there are multiple data channels. Each data channel includes a data model. Each data model represents multiple data items having multiple extended properties. Each data model maintains the current version of each of its data items. When a client data-viewing tool 2818 is started, the desktop manager provides a handle to the viewer within the client data viewing tool 2818. The viewer includes a view that includes an item presentation. The view maintains the most recently received version of the data model obtained by the client data-viewing tool 2818 from the data channel server 2814. In this regard, the client data-viewing tool 2818 gets the data model from the data channel server 2814 and registers with the data channel server 2814 to be informed of events that the data channel receives from the data model. The next step undertaken by the client data-viewing tool 2818 is to get the DAG definition of the properties of each data item. In this regard, the client data-viewing tool 2818 asks the data channel server 2814 for only the information needed for rendering its display. Next the client data-viewing tool 2818 gets all of the changes to the data model. Then, as events are received, the client data-viewing tool 2818 asks for any updates to the data model since the last version of the data model was obtained from the data channel server 2814.

Several features of the present invention are applied to reduce a required network bandwidth for collaboration and to reduce data copying across the network. These mechanisms avoid some known performance problems with distributed object systems.

First, the repository sets policies to access the data it manages. This allows "lazy evaluation" of queries, postponing actual querying until the data is needed. The repository also has control of how many queries are supported, the ability to bundle updates, and the ability to limit the amount of data retrieved in a collection. Typically, the repository is placed topologically and computationally close to the data source to minimize network usage between the data source in the repository.

The feature collection is implemented as a CORBA proxy, that is, a token, so that no matter how many users and conferences the data is represented in, the collection itself is created and managed exactly once. The feature collection may be located topologically and computationally near the repository where creation and updates of collections minimize network communications bandwidth and latency.

The data channel is selected via a "finder" service, which has the ability to find the best data channel manager for the particular collection and conference. The data channel uses two mechanisms to optimize its performance vis-a-vis the viewers: first, viewers receive only the features that they request, and secondly, the data changes are not sent to all subscribers immediately. Instead, version change events are sent, which viewers can manage in the best way suited to their behavioral use (e.g., ignoring events altogether, responding to, at most, one event every 10 seconds, displaying the availability of an update but requiring a user to take action to receive the update).

The Radiant Trust System is capable of receiving inputs from a variety of sources that may be associated with a variety of different formats, data structures and messaging protocol. The modern repository-based approach of the Radiant Trust System supports the ability to learn about such input information. In this regard, the input information can be synthesized and is made self-describing by using standards such as DLM and XML. In this manner, interoperability between systems that are not designed to be interoperable is supported. The repository layer also eliminates the need for knowledge of particular data space management system and storage methods, as well as the location of the data. The data, which was in the data sources, is accessed using native access methods and legacy systems. The Radiant Trust System thereby seamlessly supports agent-based data acquisitions.

While various embodiments of the present invention have been described in detail, further modifications and adaptations of the invention may occur to those skilled in the art. However, it is to be expressly understood that such modifications and adaptations are within the spirit and scope of the present invention.

What is claimed:

1. A method for use in enabling collaboration among multiple network users and protecting sensitive information of one or more of the users, comprising the steps of:

establishing a collaborative environment for collaboration among said multiple network users, said collaborative environment including network structure for use in enabling a collaboration with respect to collaboration subject matter including sensitive information subject to a policy regarding handling thereof relative to said network users, wherein said sensitive information includes multiple items of sensitive information associated with multiple network users, and wherein said multiple items of sensitive information are associated with multiple rule sets regarding dissemination thereof, said collaborative environment further including a computer-based tool for automatic enforcement of said policy, wherein said computer-based tool includes a database storing content-based rules related to specific information sources and intended recipients and a processor operable to apply the content-based rules to the information to construct a recipient-specific output in compliance with the content-based rules; and using said computer-based tool to manage said collaboration by monitoring activities relating to said collaboration subject matter using said network structure, identifying an activity concerning a portion of said sensitive information and controlling said identified activity based on said policy.

2. A method as set forth in claim 1, wherein said computer based tool is operative for processing an item of said collaboration including a portion of said sensitive information in accordance with said policy so as to provide multiple, different presentations of said item to multiple ones of said network users.

3. A method as set forth in claim 1, wherein said multiple network users include users associated with government entities and users associated with private-sector entities, and said policy includes first rules governing dissemination of information as between the users associated with government entities and the users associated with private-sector entities.

4. A method as set forth in claim 1, wherein said sensitive information includes personal information and said policy includes first rules for protecting the privacy of said information.

5. A method for use in enabling collaboration among multiple network users and protecting sensitive information of one or more of the users, comprising the steps of:
  establishing a collaborative environment for collaboration among said multiple network users, said collaborative environment including network structure for use in enabling a collaboration with respect to collaboration subject matter including sensitive information subject to a policy regarding handling thereof relative to said network users, said collaborative environment further including a computer-based tool for automatic enforcement of said policy, wherein said computer-based tool includes a database storing content-based rules related to specific information sources and intended recipients and a processor operable to apply the content-based rules to the information to construct a recipient-specific output in compliance with the content-based rules; and
  using said computer-based tool to manage said collaboration by monitoring activities relating to said collaboration subject matter using said network structure, identifying an activity concerning a portion of said sensitive information and controlling said identified activity based on said policy, wherein said computer-based tool is further operative for compiling a log of activities involving said sensitive information so that a party can review said log to verify compliance with said policy.

6. A method as set forth in claim 5, wherein said computer-based tool is further operative for automated processing of said log for auditing compliance with said policy in accordance with pre-established audit rules.

7. A method for use in enabling collaboration among multiple network users and protecting sensitive information of one or more of the users, comprising the steps of:
  establishing a collaborative environment for collaboration among said multiple network users, said collaborative environment including network structure for use in enabling a collaboration with respect to collaboration subject matter including sensitive information subject to a policy regarding handling thereof relative to said network users, said collaborative environment further including a computer-based tool for automatic enforcement of said policy, wherein said computer-based tool includes a database storing content-based rules related to specific information sources and intended recipients and a processor operable to apply the content-based rules to the information to construct a recipient-specific output in compliance with the content-based rules; and
  using said computer-based tool to manage said collaboration by monitoring activities relating to said collaboration subject matter using said network structure, identifying an activity concerning a portion of said sensitive information, controlling said identified activity based on said policy, associating a classification with said portion of said sensitive information, and using said classification to enforce said policy.

8. A method as set forth in claim 7, wherein said classification determines which ones of said multiple network users are entitled to use said portion of said sensitive information.

9. A method as set forth in claim 7, wherein said classification determines what kinds of activities a particular one of said users is entitled to perform involving said sensitive information.

10. A method as set forth in claim 7, wherein said classification is part of a classification system defining multiple classes associated with multiple rule sets governing use of said sensitive information.

11. A method for use in enabling collaboration among multiple network users and protecting sensitive information of one or more of the users, comprising the steps of:
  establishing a collaborative environment for collaboration among said multiple network users, said collaborative environment including network structure for use in enabling a collaboration with respect to collaboration subject matter including sensitive information subject to a policy regarding handling thereof relative to said network users, said collaborative environment further including a computer-based tool for automatic enforcement of said policy, wherein said computer-based tool includes a database storing content-based rules related to specific information sources and intended recipients and a processor operable to apply the content-based rules to the information to construct a recipient-specific output in compliance with the content-based rules; and
  using said computer-based tool to manage said collaboration by monitoring activities relating to said collaboration subject matter using said network structure, identifying an activity concerning a portion of said sensitive information and controlling said identified activity based on said policy, wherein said collaborative environment involves multiple groups of network users where each group is associated with a policy governing activities involving sensitive information within said group, and wherein said computer-based tool is further operative for automatically executing rules controlling activities involving sensitive information as between a first one of said groups and a second one of said groups.

12. A method for use in sharing information between at least one source system and multiple recipient systems, comprising the steps of:
  providing a collaboration system interposed between said source system and said recipient systems for facilitating sharing of information between said source system and said recipient systems, said collaboration system configured for communication with each of said source system and said recipient system using a defined network interface, wherein said collaboration system includes a database storing content-based rules related to specific information sources and intended recipients and a processor operable to apply the content-based rules to the information to construct a recipient-specific output in compliance with the content-based rules;
  accessing first input information from said source system by said collaboration system;

accessing a first instruction set related to a first recipient system by said collaboration system;

accessing a second instruction set related to a second recipient system by said collaboration system;

first operating said collaboration system to provide a first output to said first recipient system based on said first input information and said first instruction set; and second operating said collaboration system to provide a second output to said second recipient system based on said first input information and said second instruction set, where said second output has a content different than said first output.

* * * * *